United States Patent
Park et al.

(10) Patent No.: US 11,678,327 B2
(45) Date of Patent: Jun. 13, 2023

(54) SIDELINK COMMUNICATIONS

(71) Applicant: Comcast Cable Communications, LLC, Philadelphia, PA (US)

(72) Inventors: Kyungmin Park, Herndon, VA (US); Esmael Dinan, McLean, VA (US); Hyukjin Chae, Reston, VA (US); Taehun Kim, Reston, VA (US); Jinsook Ryu, Herndon, VA (US); Yunjung Yi, Vienna, VA (US); Hua Zhou, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/993,855

(22) Filed: Aug. 14, 2020

(65) Prior Publication Data
US 2021/0051653 A1  Feb. 18, 2021

Related U.S. Application Data

(60) Provisional application No. 62/887,549, filed on Aug. 15, 2019.

(51) Int. Cl.
*H04W 72/04* (2023.01)
*H04W 8/22* (2009.01)
*H04W 76/14* (2018.01)
*H04W 72/21* (2023.01)

(52) U.S. Cl.
CPC ............ *H04W 72/21* (2023.01); *H04W 8/22* (2013.01)

(58) Field of Classification Search
CPC . H04W 72/0413; H04W 8/22; H04W 72/048; H04W 76/14

USPC ........................................................ 370/329
See application file for complete search history.

(56) References Cited

U.S. PATENT DOCUMENTS

| | | | |
|---|---|---|---|
| 2016/0338095 A1* | 11/2016 | Faurie ............... | H04W 28/0278 |
| 2018/0035278 A1* | 2/2018 | Aminaka ............. | H04W 76/14 |
| 2018/0092067 A1 | 3/2018 | Liu et al. | |
| 2018/0202798 A1* | 7/2018 | Hernández Serrano ..................... | |
| | | | G01N 29/225 |
| 2019/0150164 A1* | 5/2019 | Nam ................. | H04L 1/1896 |
| | | | 370/329 |
| 2019/0159150 A1* | 5/2019 | Nguyen ............. | H04W 56/002 |
| 2020/0022089 A1* | 1/2020 | Guo ................... | H04W 52/383 |
| 2020/0359445 A1* | 11/2020 | Wu ................... | H04B 7/0626 |

FOREIGN PATENT DOCUMENTS

| | | |
|---|---|---|
| EP | 3386258 A1 | 10/2018 |
| WO | 2015152797 A1 | 10/2015 |

(Continued)

OTHER PUBLICATIONS

3rd Generation Partnership Project Technical Specification Group Services and Systems Aspects; Architecture enhancements of 5G System (5GS) to support Vehicle-to-Everything (V2X) services (Release 16).

(Continued)

*Primary Examiner* — Inder P Mehra
(74) *Attorney, Agent, or Firm* — Banner & Witcoff, Ltd.

(57) ABSTRACT

Wireless devices may communicate with each other via a sidelink. Sidelink capability information may be sent and/or used to determine configuration parameters for sidelink communications between wireless devices.

24 Claims, 39 Drawing Sheets

(56) References Cited

FOREIGN PATENT DOCUMENTS

| WO | WO2018020 2798 | * | 11/2018 | ............ | H04W 4/08 |
| WO | 2019023857 A1 | | 2/2019 | | |

OTHER PUBLICATIONS

3GPP TS 38.300 V15.6.0 (Jun. 2019) 3rd Generation Partnership Project; Technical Specification Group Radio Access Network; NR; NR and NG-RAN Overall Description; Stage 2 (Release 15).
3GPP TR 38.885 V1.1.0 (Mar. 2019) 3rd Generation Partnership Project; Technical Specification Group Radio Access Network; NR; Study on Vehicle-to-Everything (Release 16).
R2-1905561 3GPP TSG-RAN WG2 Meeting #106 Source: OPPO, Title: Discussion on assistance information for interface selection.
R2-1905563 3GPP TSG-RAN WG2 Meeting #106, Reno, US, May 13-17, 2019, Source: OPPO, Title: Left issues on PC5-RRC for group cast.
R2-1905573 3GPP TSG-RAN WG2 Meeting #106, Reno, US, May 13-17, 2019, Source: OPPO, Title: Discussion RRM for V2X.
R2-1905574 3GPP TSG-RAN WG2 Meeting #106, Reno, US, May 13-17, 2019, Source: OPPO, Title: Discussion RLM for V2X.
R2-1905580 3GPP TSG-RAN WG2 Meeting #106, Reno, US, May 13-17, 2019, Source: OPPO, Title: Discussion on network involvements in unicast link establishment.
R2-1905584 3GPP TSG-RAN WG2 Meeting #106, Reno, US, May 13-17, 2019, Source: OPPO, Title: Left Issues on SLRB configuration for NR-V2X.
R2-1905585 3GPP TSG-RAN WG2 Meeting #106, Reno, US, May 13-17, 2019, Source: OPPOP (rapporteur), Title: Summary of [105bis#32] PC5-RRC signaling.
R2-1905843 3GPP TSG-RAN WG2 Meeting #106, Reno, US May 13-17, 2019, Source: vivo, Title: Remaining Issues on PC5-RRC message exchange.
R2-1906127 3GPP TSG-RAN WG2 Meeting #106, Reno, US, May 13-17, 2019, Source: Lenovo, Motorola Mobility, Title: Discussion on PC5 RRC state.
R2-1906296 3GPP TSG-RAN WG2 Meeting #106, Reno, US, May 13-17, 2019, Source: Intel Corporation, Title: PC5-RRC Consideration for NR V2X.
R2-1906387 3GPP TSG-RAN WG2 Meeting #106, Reno, US, May 13-17, 2019, Source : InterDigital Inc. Title: RLM/RLF for NR V2X.
R2-1906431 3GPP TSG-RAN WG2 Meeting #106, Reno, US, May 13-17, 2019, Source: Intel Corporation, Title: UE sidelink configuration for NR V2X.
R2-1907185 3GPP TSG-RAN WG2 Meeting #106, Reno US, May 13-17, 2019, Source: Convida Wireless, Title: AS Level Management for Unicast.
R2-1907210 3GPP TSG-RAN WG2 Meeting #106, Reno, US, May 13-17, 2019, Source: LG Electronics Inc., Source: LG Electronics Inc.
TDoc R2-1907357 3GPP TSG-RAN WG2 Meeting #106, Reno, US, May 13-17, 2019, Source: Ericsson, Title on PC5 interface availability.
R2-1907358 3GPP TSG-RAN WG2 Meeting #106, Reno, US, May 13-17, 2019, Source: Ericsson, Title: On UE capability exchange.
R2-1907359 3GPP TSG-RAN WG2 Meeting #106, Reno, US, May 13-17, 2019, Source: Ericsson, Title: on the sidelink unicast link management.
R2-1907419 3GPP TSG-RAN WG2 Meeting #106, Reno, US, May 13-17, 2019, Source: Huawei, HiSilicon, Title: Consideration on RLM for NR V2X unicast.
R2-1907451 3GPP TSG-RAN WG2 Meeting #106, Reno, US, May 13-17, 2019, Source: Huawei, HiSilicon, Title: On PC5 Availability for NR SL unicast.
R2-1907452 3GPP TSG-RAN WG2 Meeting #106, Reno, US, May 13-17, 2019, Source: Huawei, HiSilicon, Title: Relationship between PC5-S connection.
R2-1907629 3GPP TSG-RAN WG2 Meeting #106, Reno, US, May 13-17, 2019, Source: LG Electronics, Title: Discussion on transmitter UE side RLM and RLF in NR SL.
R2-1907643 3GPP TSG-RAN WG2 Meeting #106, Reno, US, May 13-17, 2019, Source: LG Electronics, Title: Discussion on RLF indication from UE to gNB in NR SL.
R2-1907644 3GPP TSG-RAN WG2 Meeting #106, Reno, US, May 13-17, 2019, Source: OPPO, Title: Discussion on bi-directional PC5-RRC procedure.
R2-1907658 3GPP TSG-RAN WG2 Meeting #106, Reno, US, May 13-17, 2019, Source: LG Electronics, Title: Discussion on RAN1 Reply LS on SL RLM_RLF for NR V2X.
R2-1907859 3GPP TSG RAN WG2 Meeting #106, Reno, US, May 13-17, 2019, 2019, Source: LG Electronics Inc., Title Discussion on coordination of measurement and report in NR SL.
R2-1907963 3GPP TSG-RAN WG2 Meeting #106, Reno, US, May 13-17, 2019, Source: Samsung, Title: Remaining Issues on SL RLM/RLF Declaration for NR V2X.
R2-1907968 3GPP TSG-RAN WG2 Meeting #106, Reno, US, May 13-17, 2019, Source: Samsung, Title: Discussion on SL AS-layer Configuration Failure.
CATT: "Discovery Procedure and Connection Setup Procedure in NR Sidelink", 3GPP Draft; Nov. 12, 2018.
Dec. 21, 2020—European Search Report—EP 20191058.5.
Dec. 19, 2022—EP Office Action—EP App No. 20191058.5.

* cited by examiner

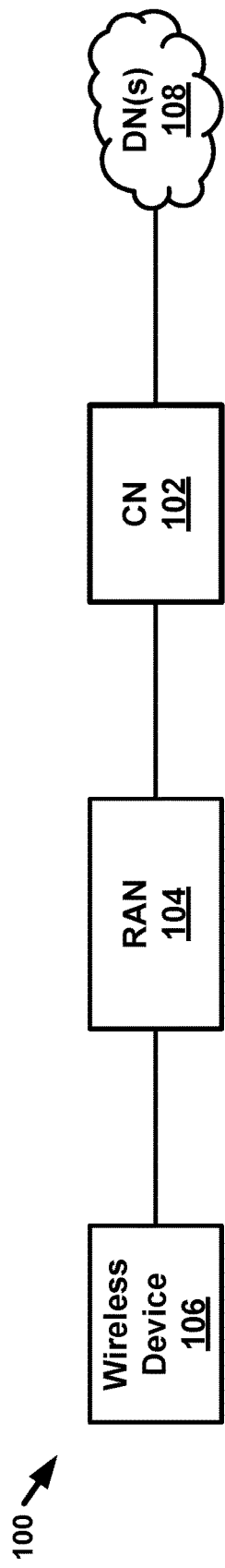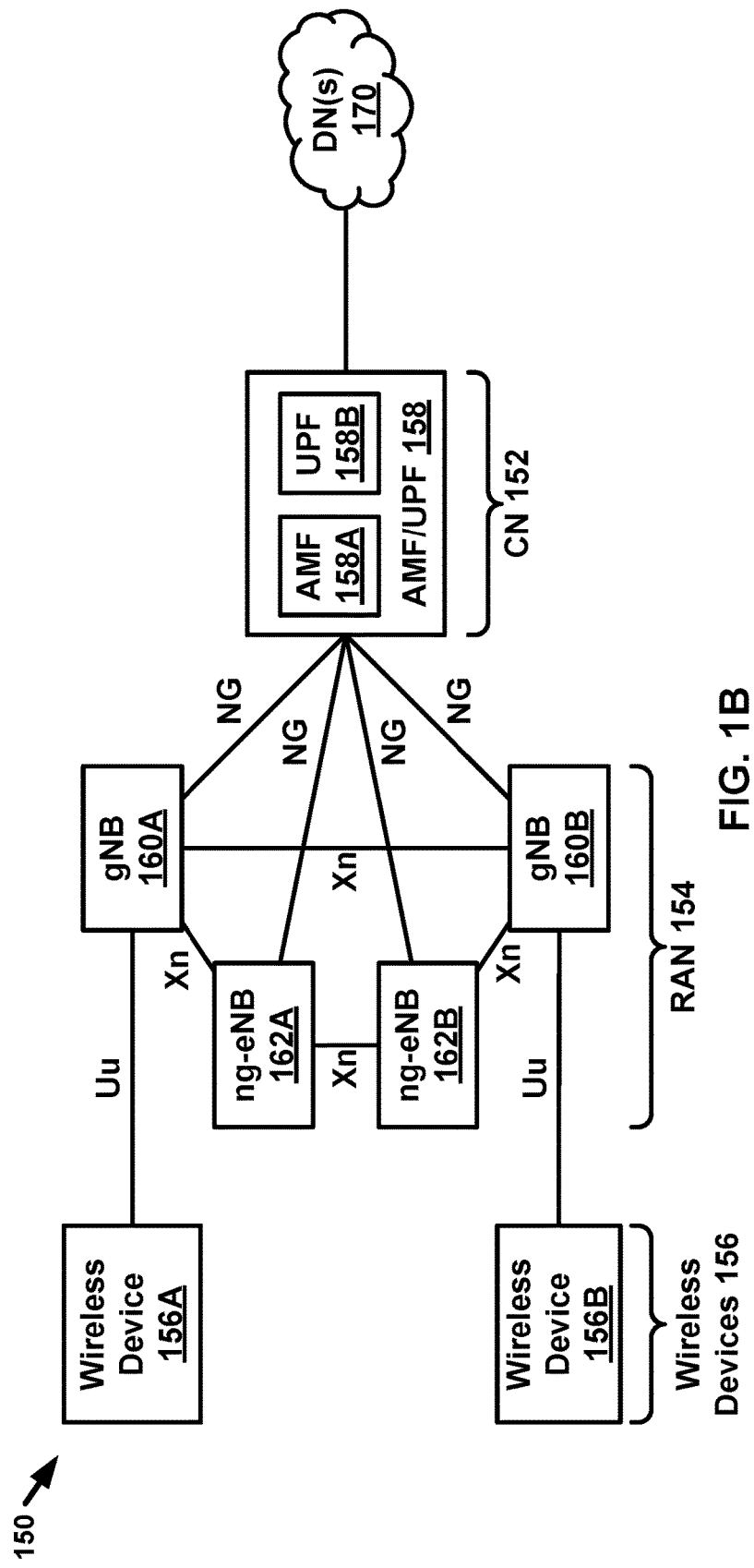
FIG. 1A
FIG. 1B

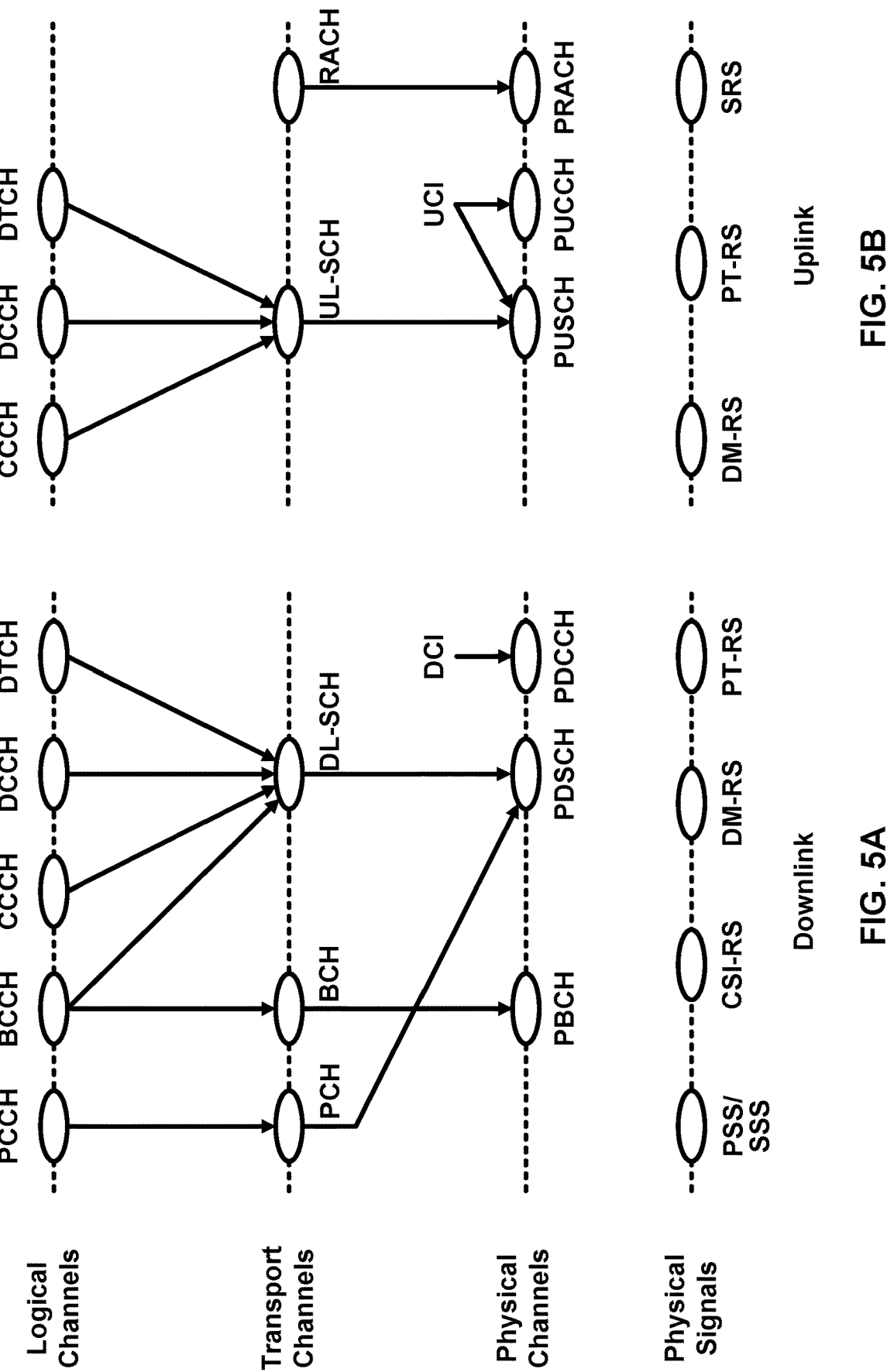

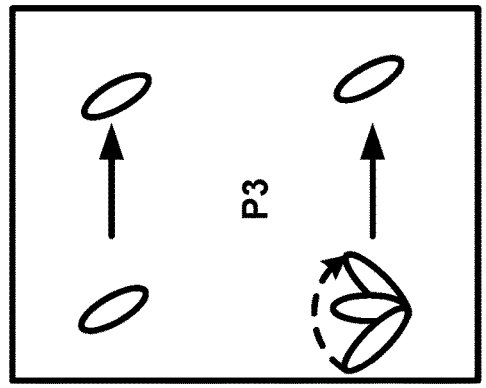
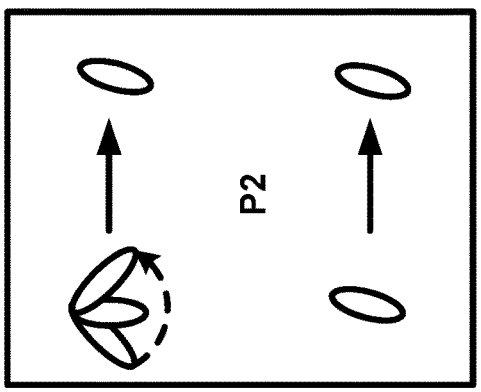
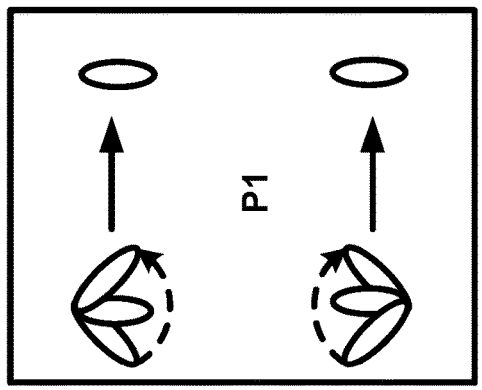
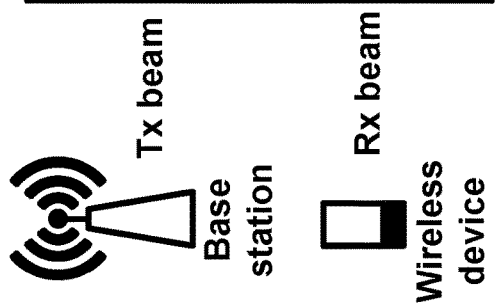
FIG. 12A
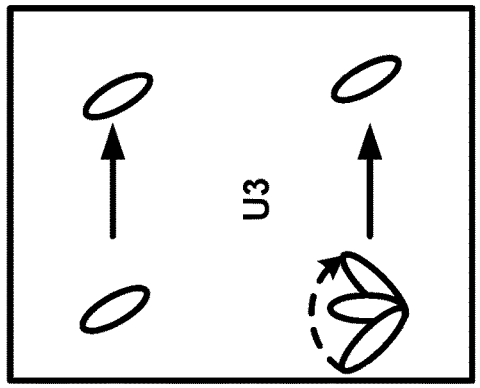
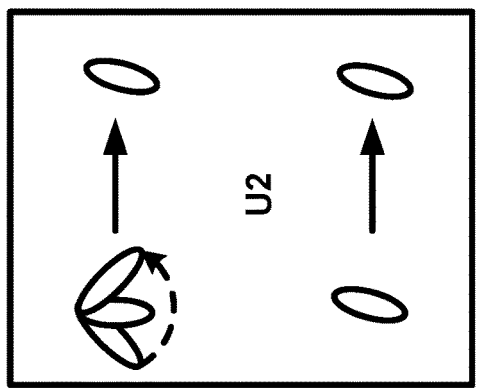
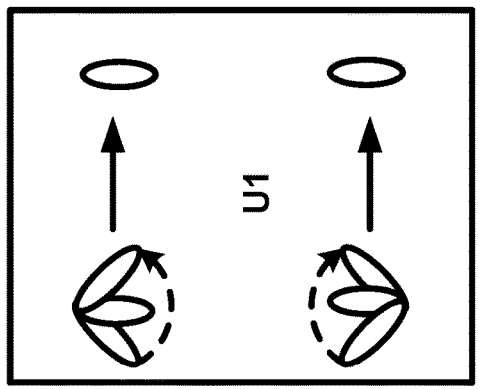
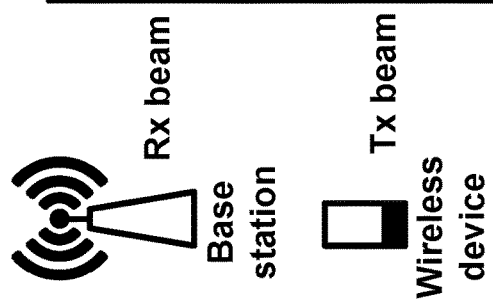
FIG. 12B

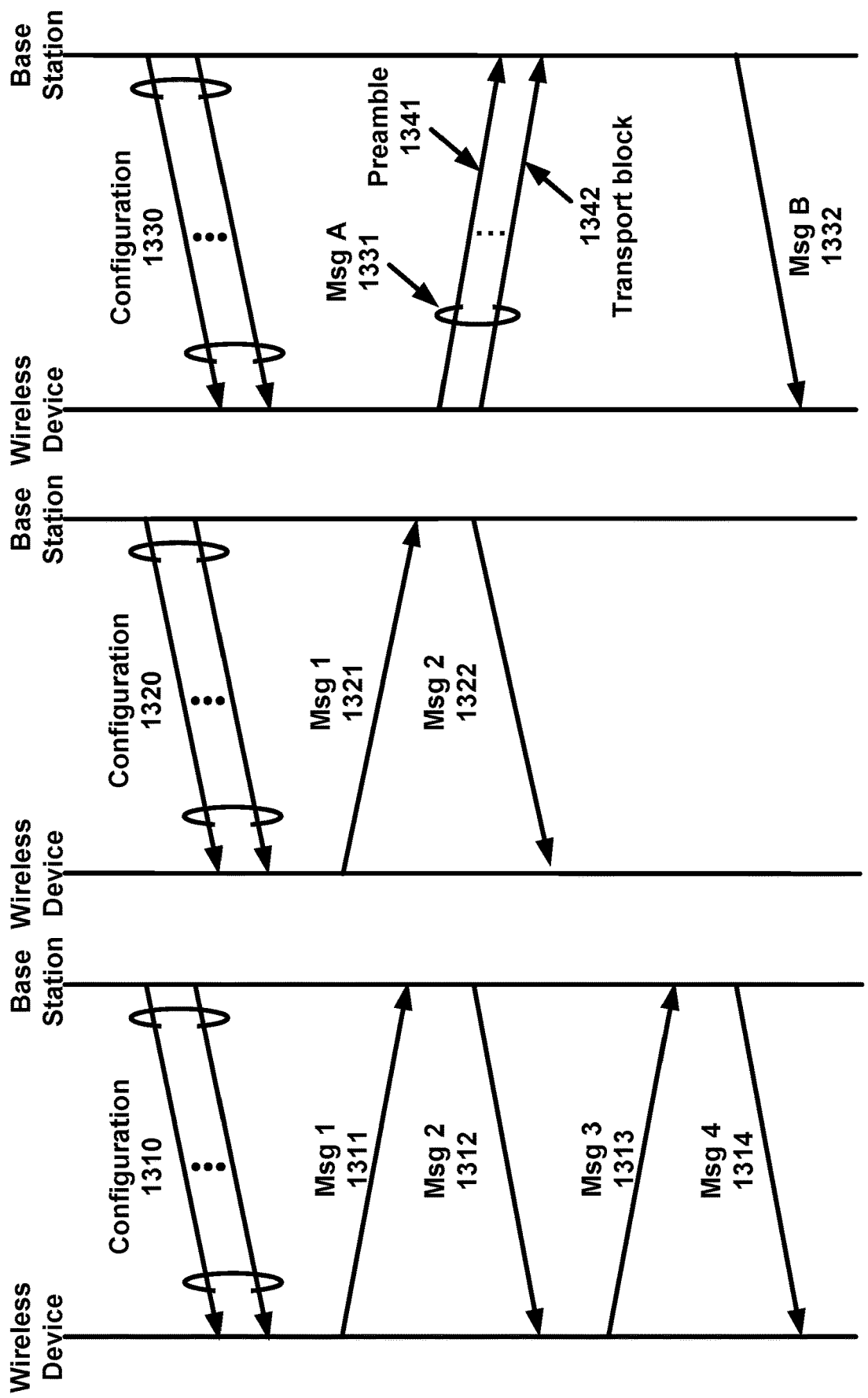

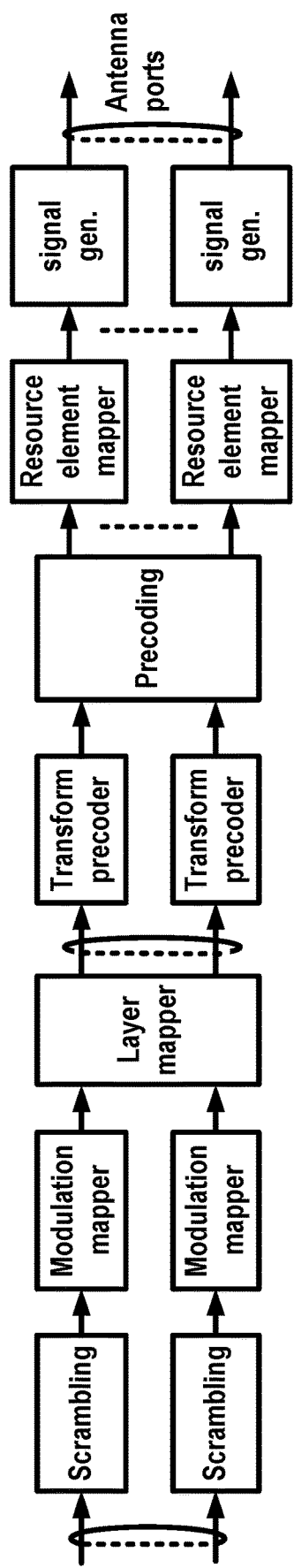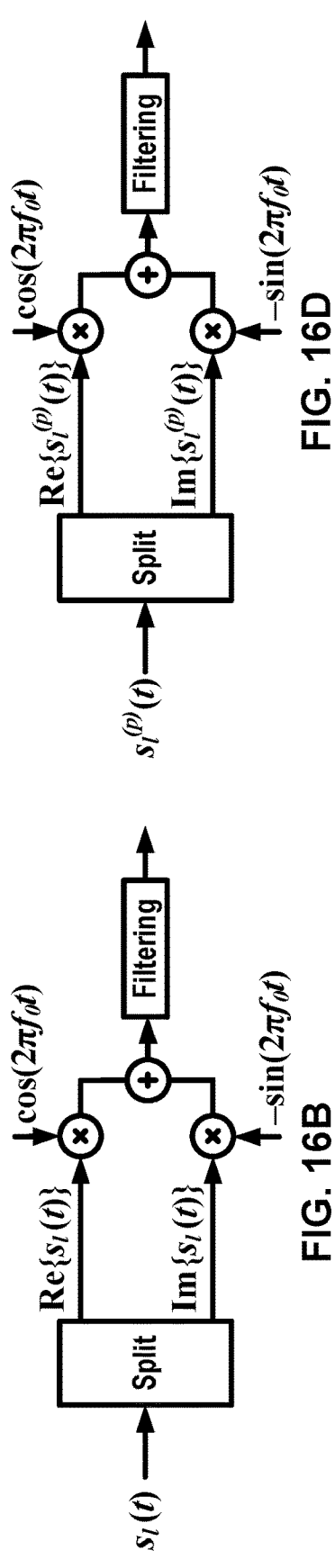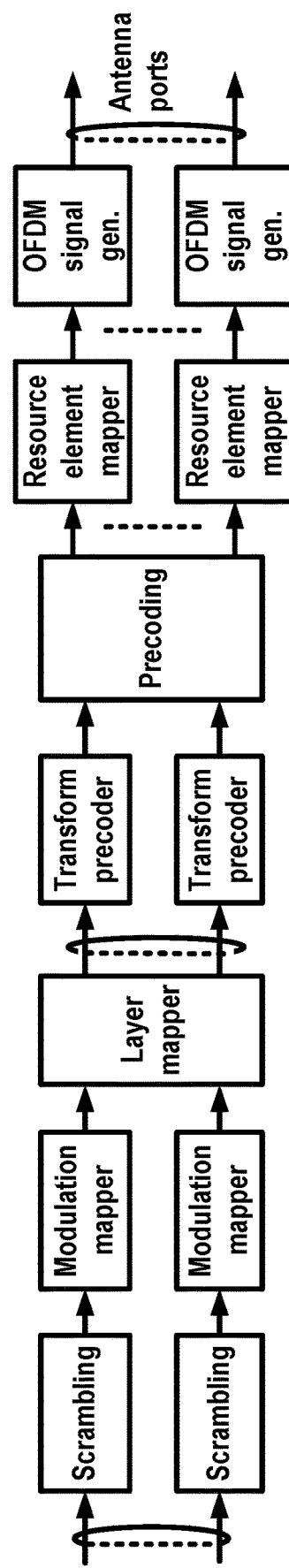
FIG. 16A
FIG. 16B
FIG. 16C
FIG. 16D

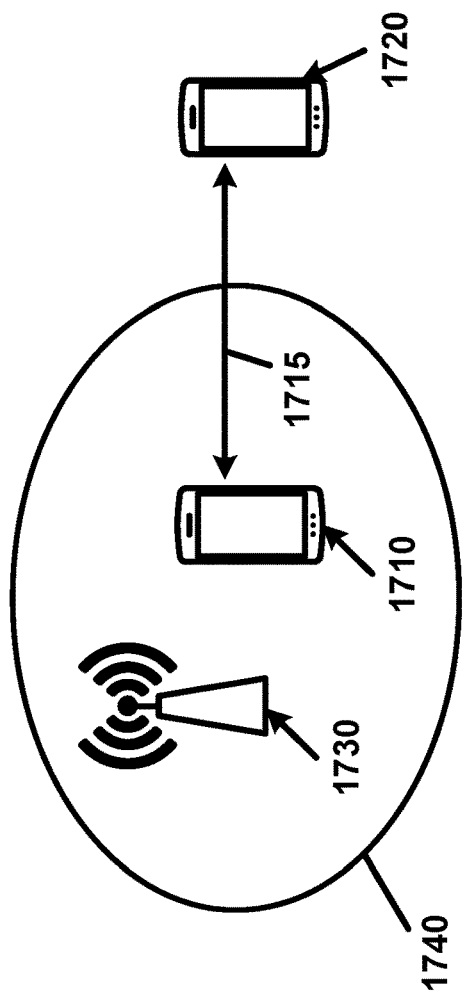
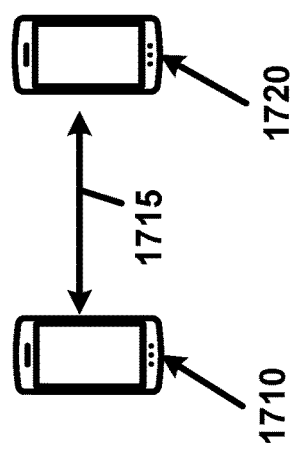
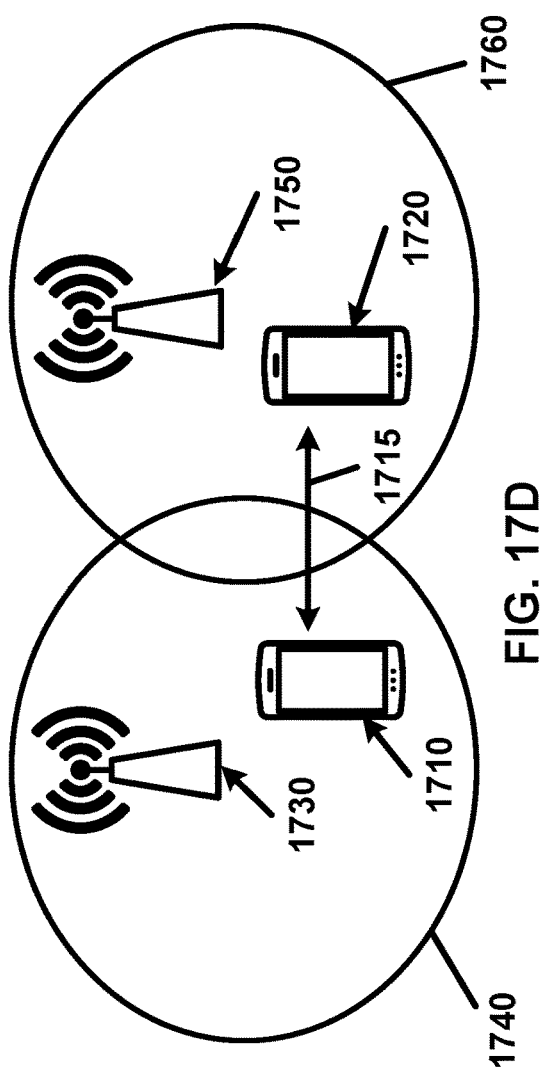
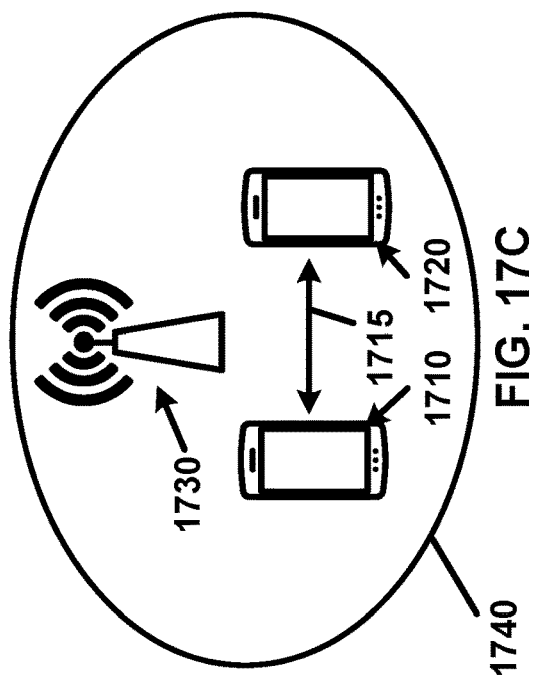
FIG. 17A
FIG. 17B
FIG. 17C
FIG. 17D

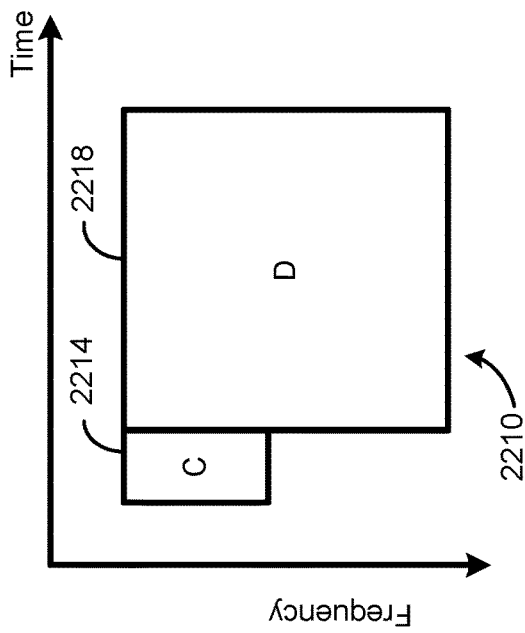
FIG. 22A
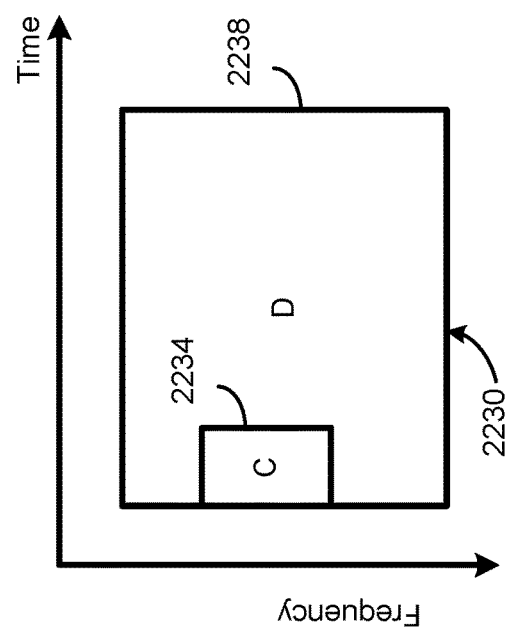
FIG. 22B
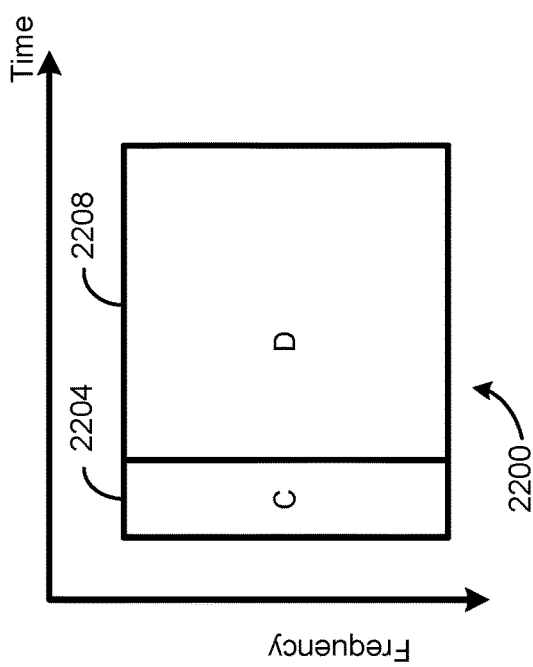
FIG. 22C
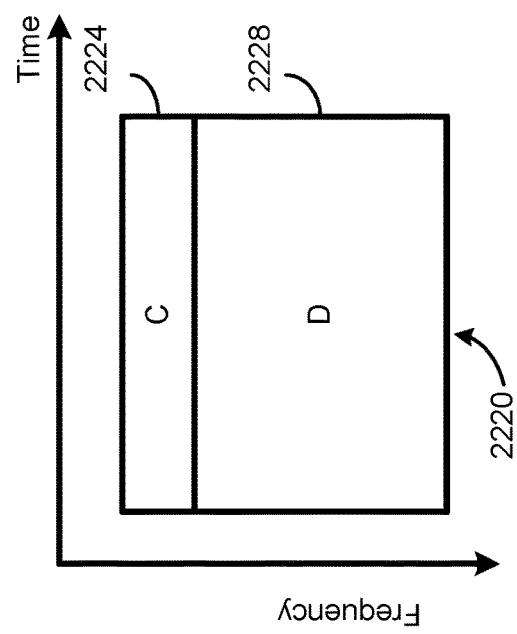
FIG. 22D
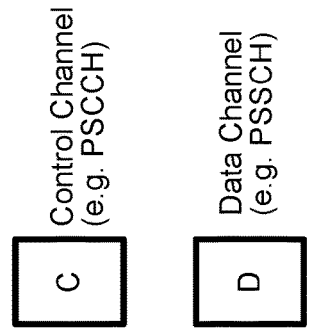

SIDELINK COMMUNICATIONS

CROSS-REFERENCE TO RELATED APPLICATIONS

This application claims the benefit of U.S. Provisional Application No. 62/887,549, filed on Aug. 15, 2019. The above-referenced application is hereby incorporated by reference in its entirety.

BACKGROUND

A base station and a wireless device communicate via uplink and/or downlink communication. A wireless device communicates with some devices (e.g., other wireless devices) via sidelink communications.

SUMMARY

The following summary presents a simplified summary of certain features. The summary is not an extensive overview and is not intended to identify key or critical elements.

Wireless devices may communicate with each other. Communications may be via a communication link, such as a sidelink. Sidelink communications between wireless devices may be established based on sidelink capabilities of at least one wireless device. Sidelink capabilities of a first wireless device (e.g., a receiving wireless device) may be indicated to at least one of: a second wireless device (e.g., a sending wireless device), a base station serving the first wireless device, a base station serving the second wireless device, and/or any other device. Configuration parameters for sidelink communication between wireless devices may be based on sidelink capabilities of at least one of the wireless devices (e.g., a receiving wireless device), which may help to ensure successful sidelink communications between the wireless devices.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 17A shows an example of wireless communications between wireless devices.

FIG. 17B shows an example of wireless communications between wireless devices with a wireless device having access to a base station of a wireless network.

FIG. 17C shows an example of intra-cell wireless communications between wireless devices having access to a same base station of a wireless network.

FIG. 17D shows an example of inter-cell wireless communications between wireless devices having accesses to different base stations of a wireless network.

FIGS. 22A-22D shows example resource configurations for control channels and data channels.

DETAILED DESCRIPTION

Figure 2A:
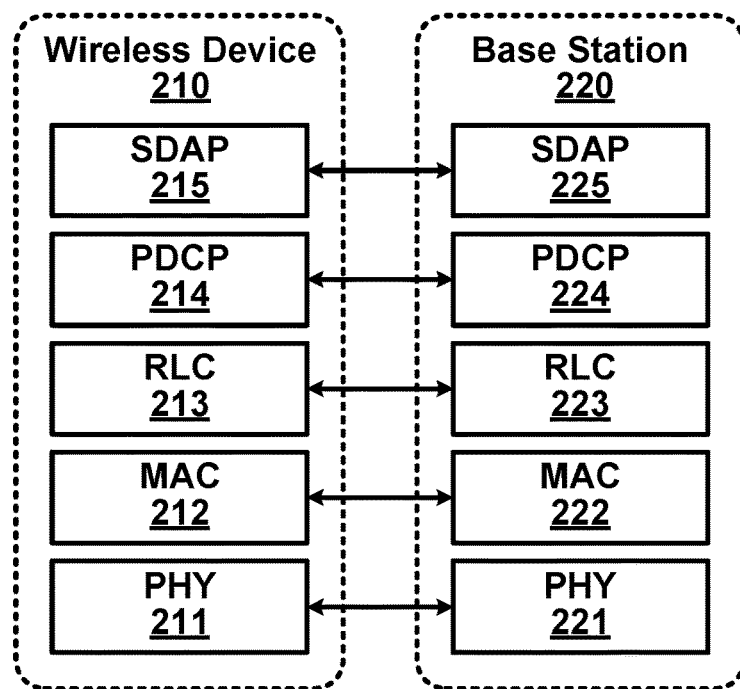
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to sidelink communications between two wireless devices.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/ UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/ perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
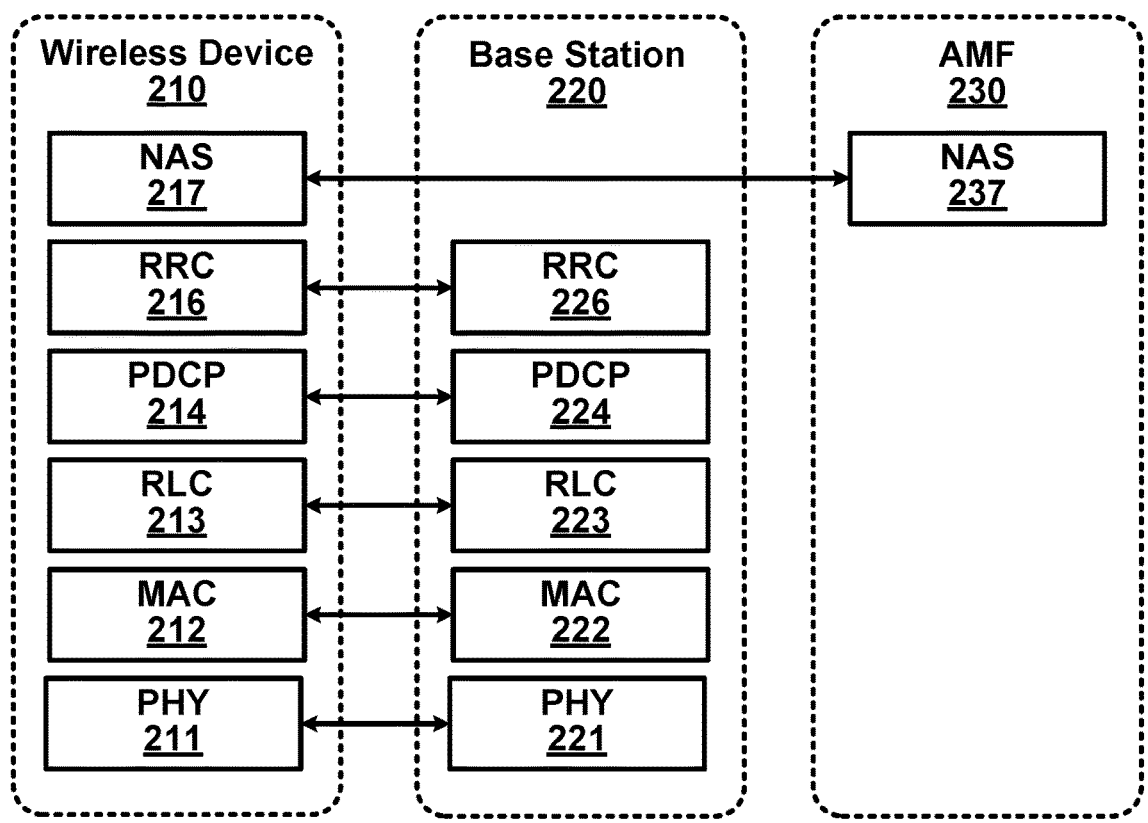
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
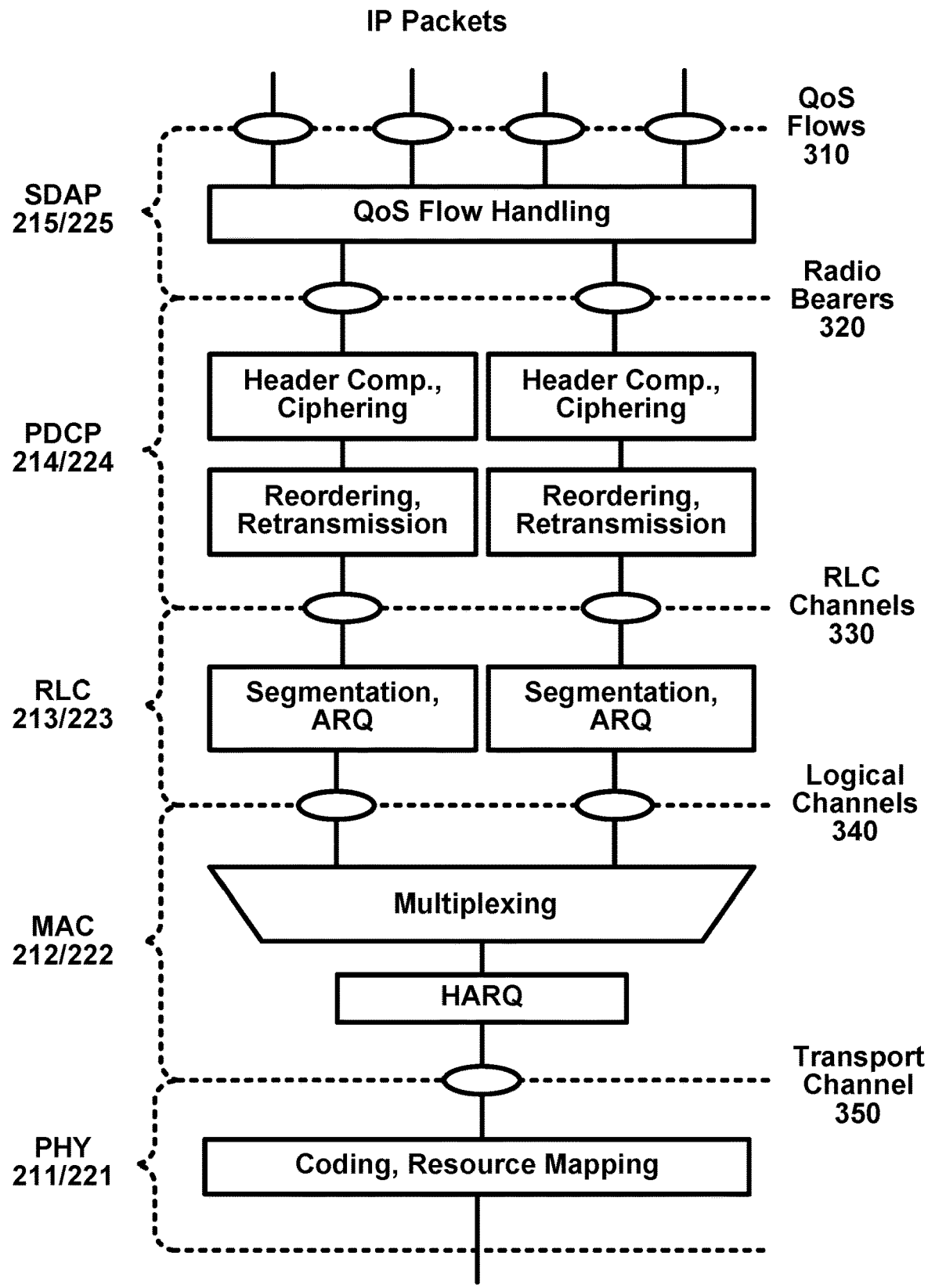
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
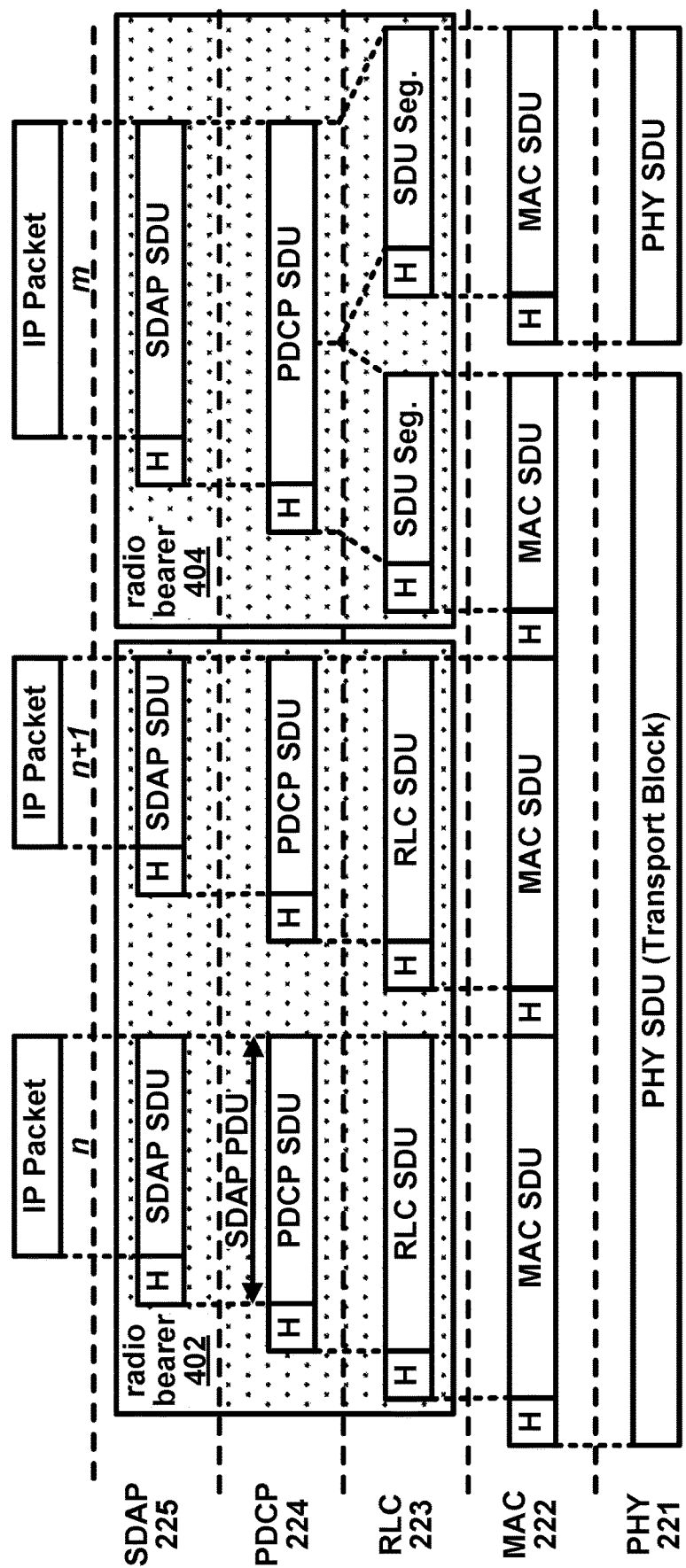
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol laters may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
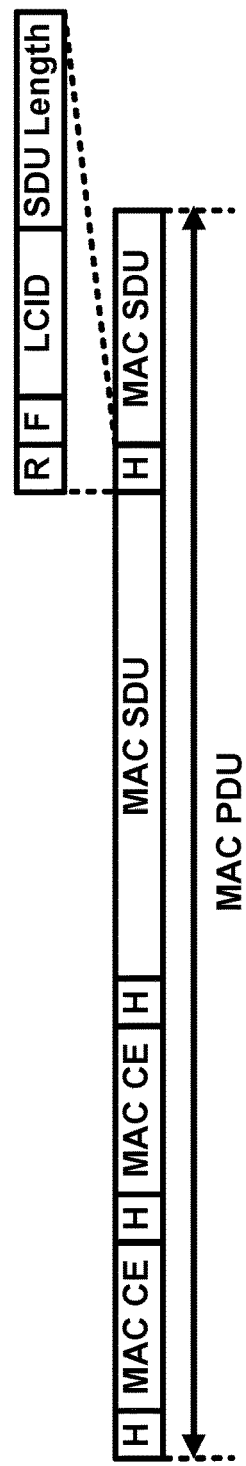
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
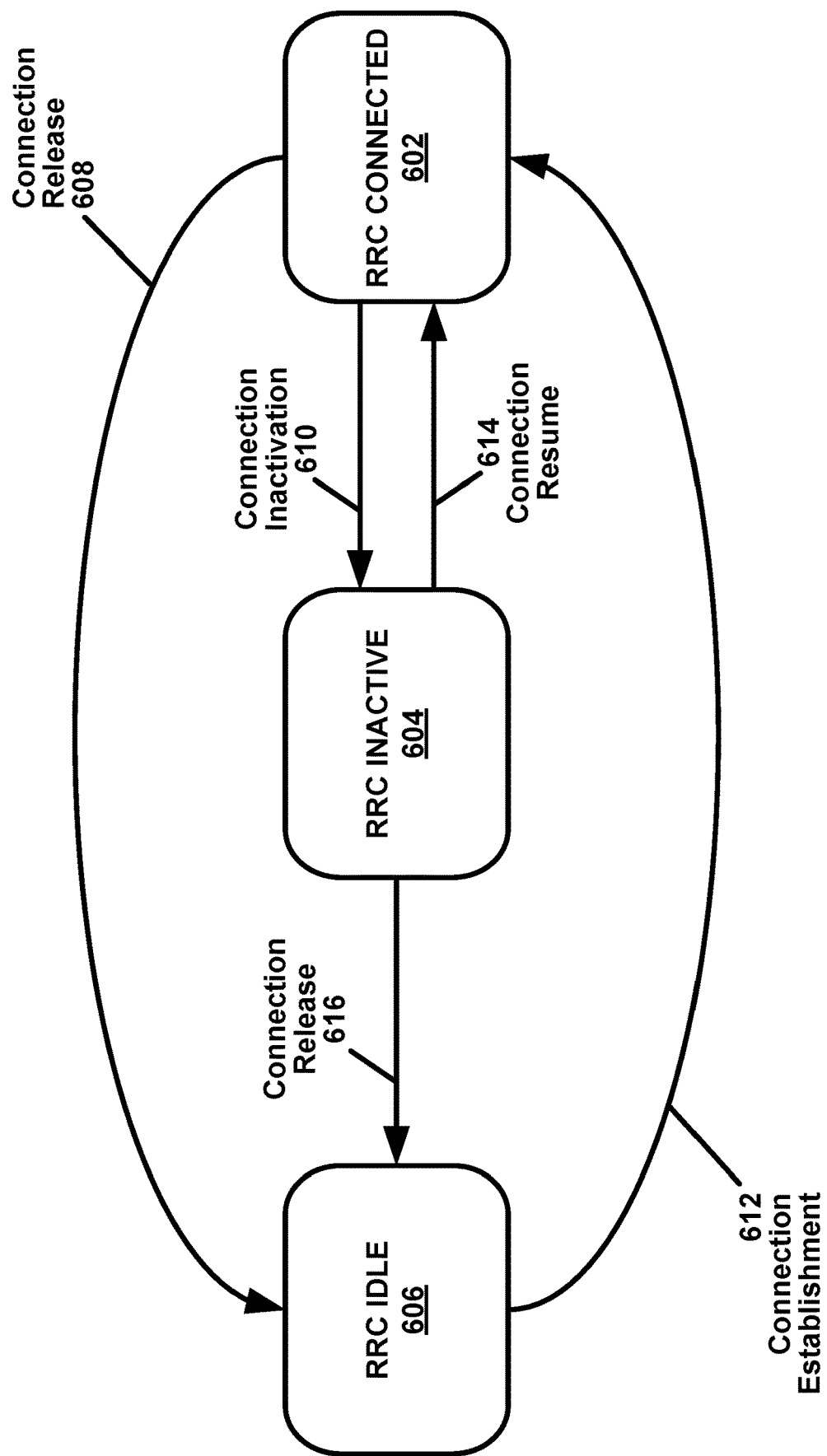
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M-PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
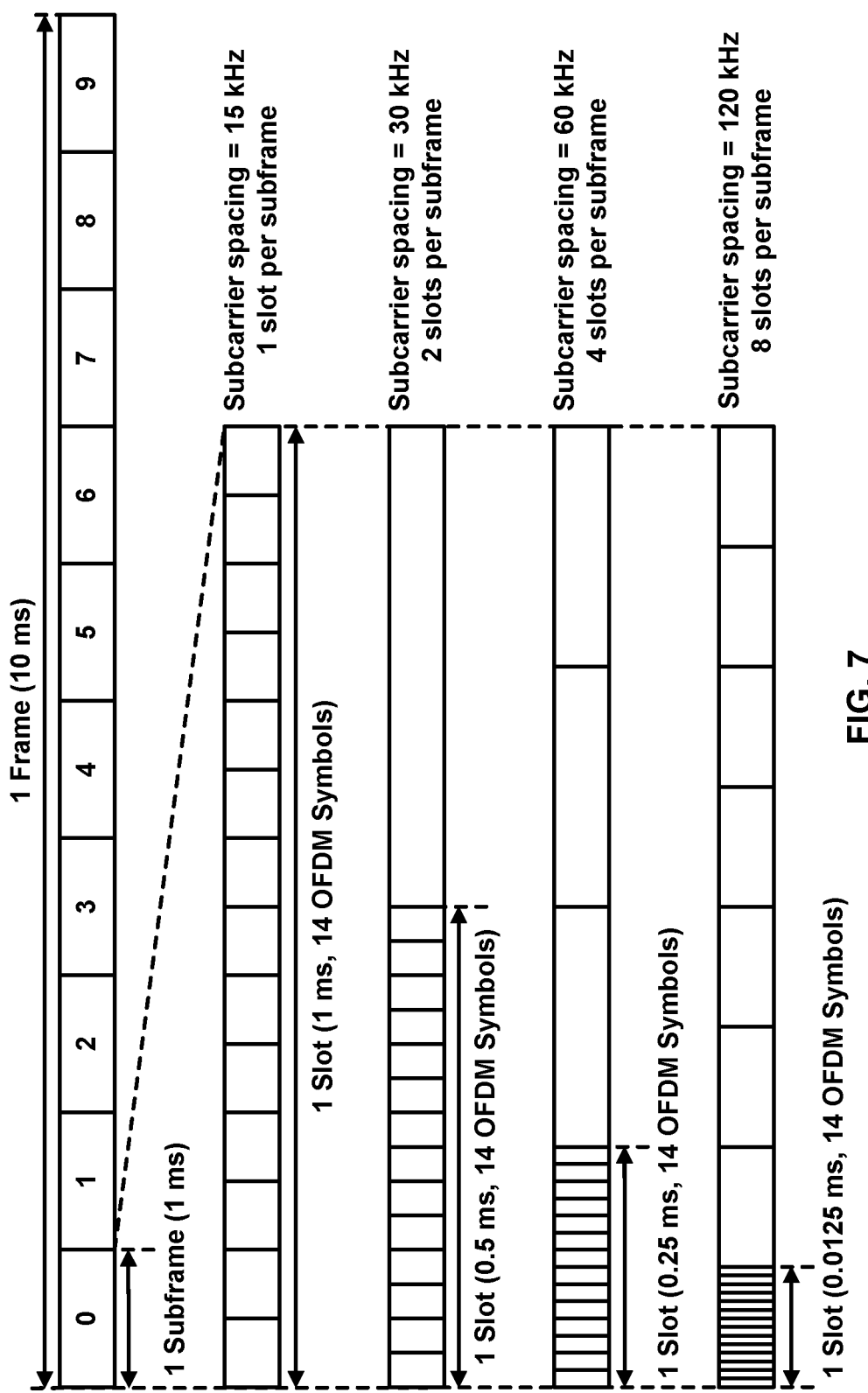
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
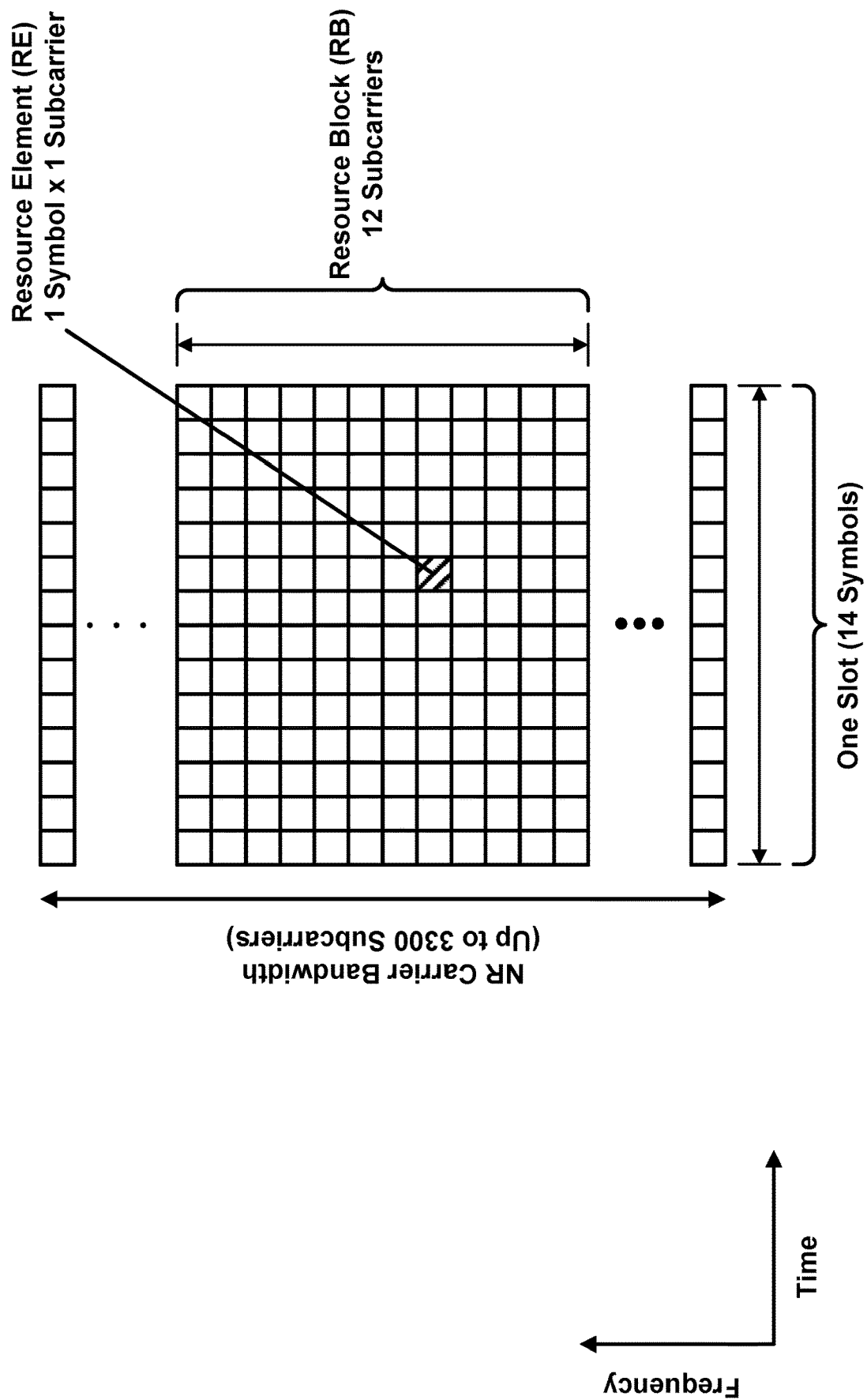
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESTS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
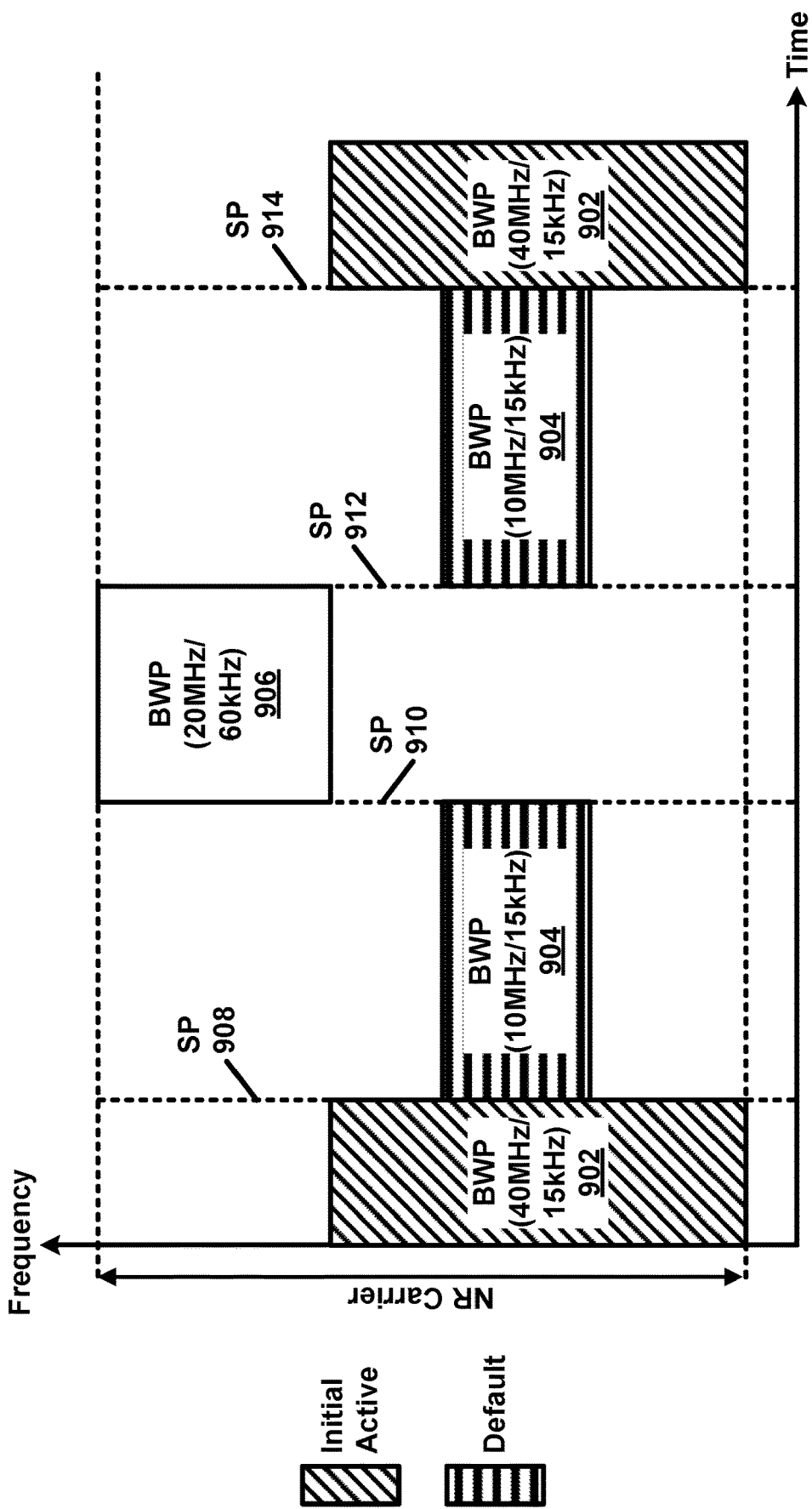
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
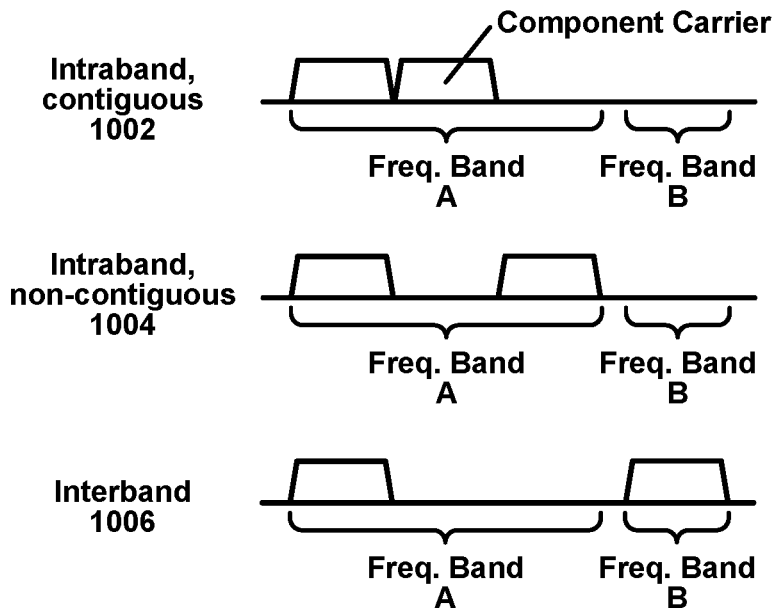
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
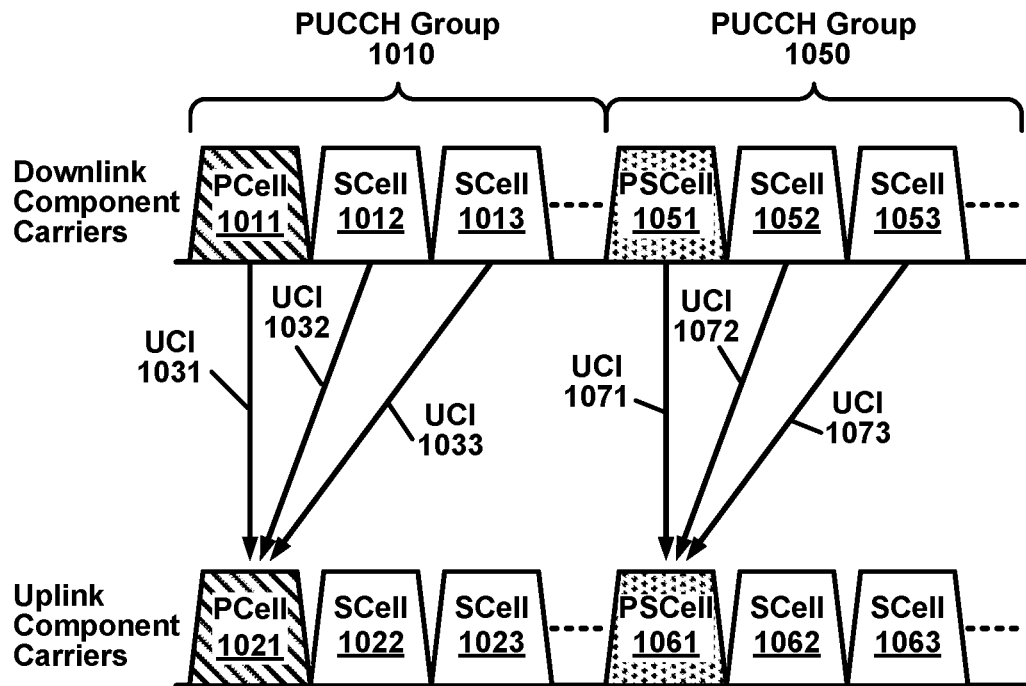
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
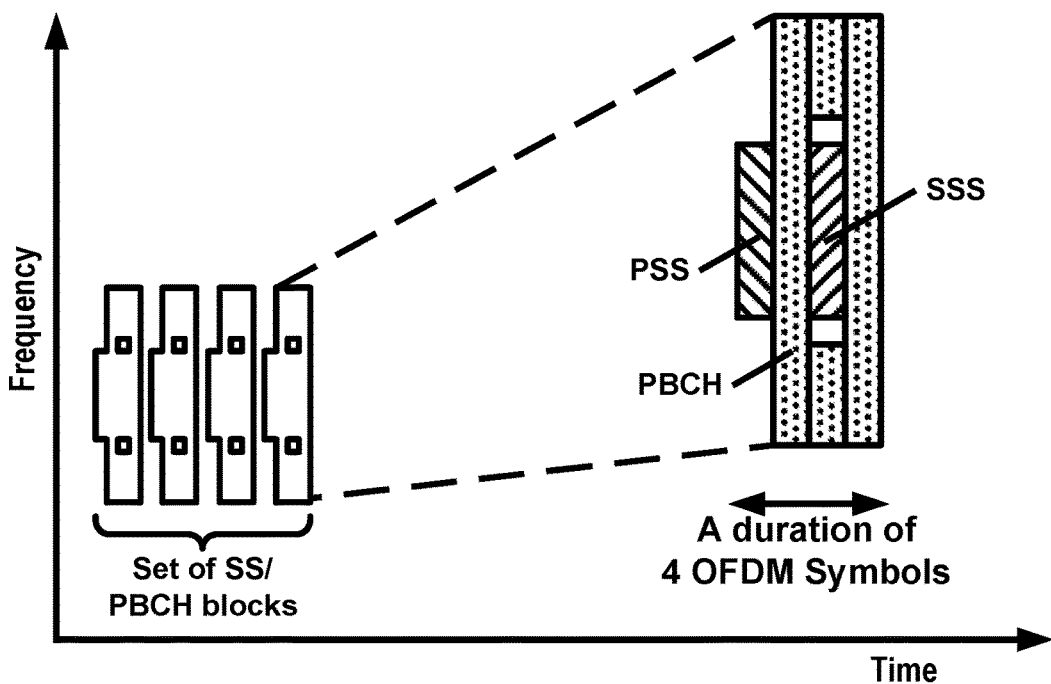
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell).

A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
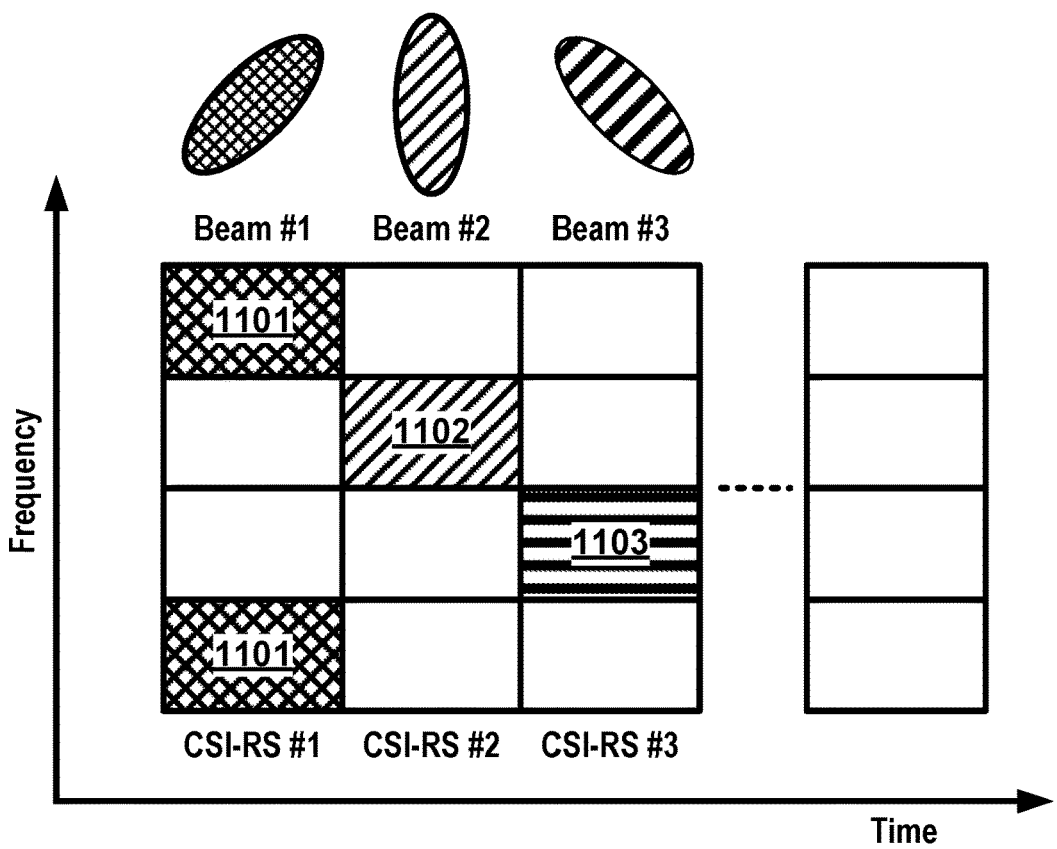
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332)

corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
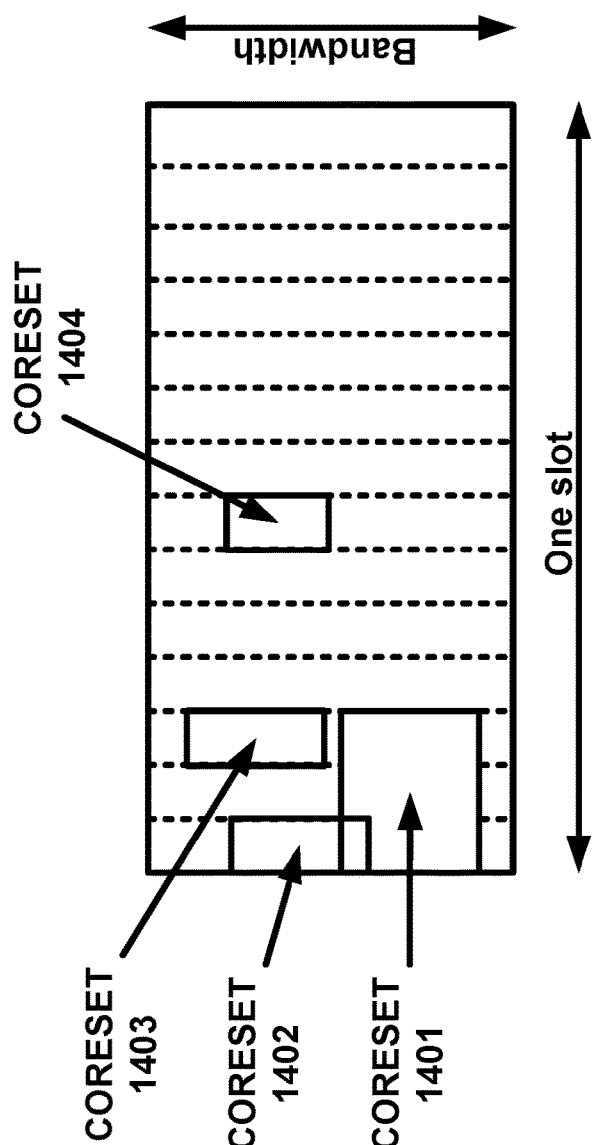
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
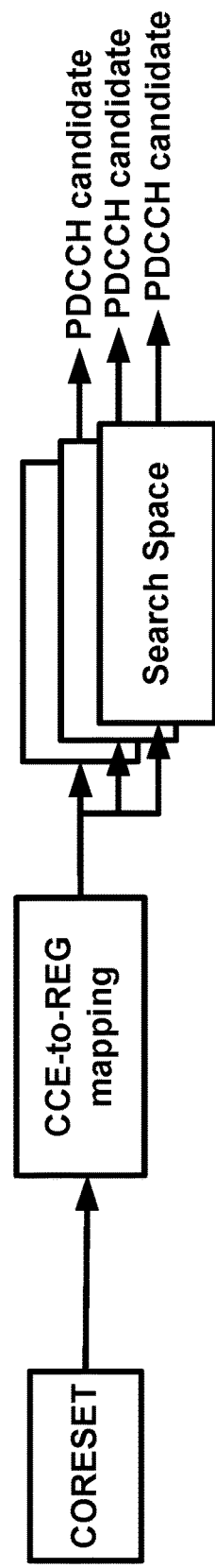
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
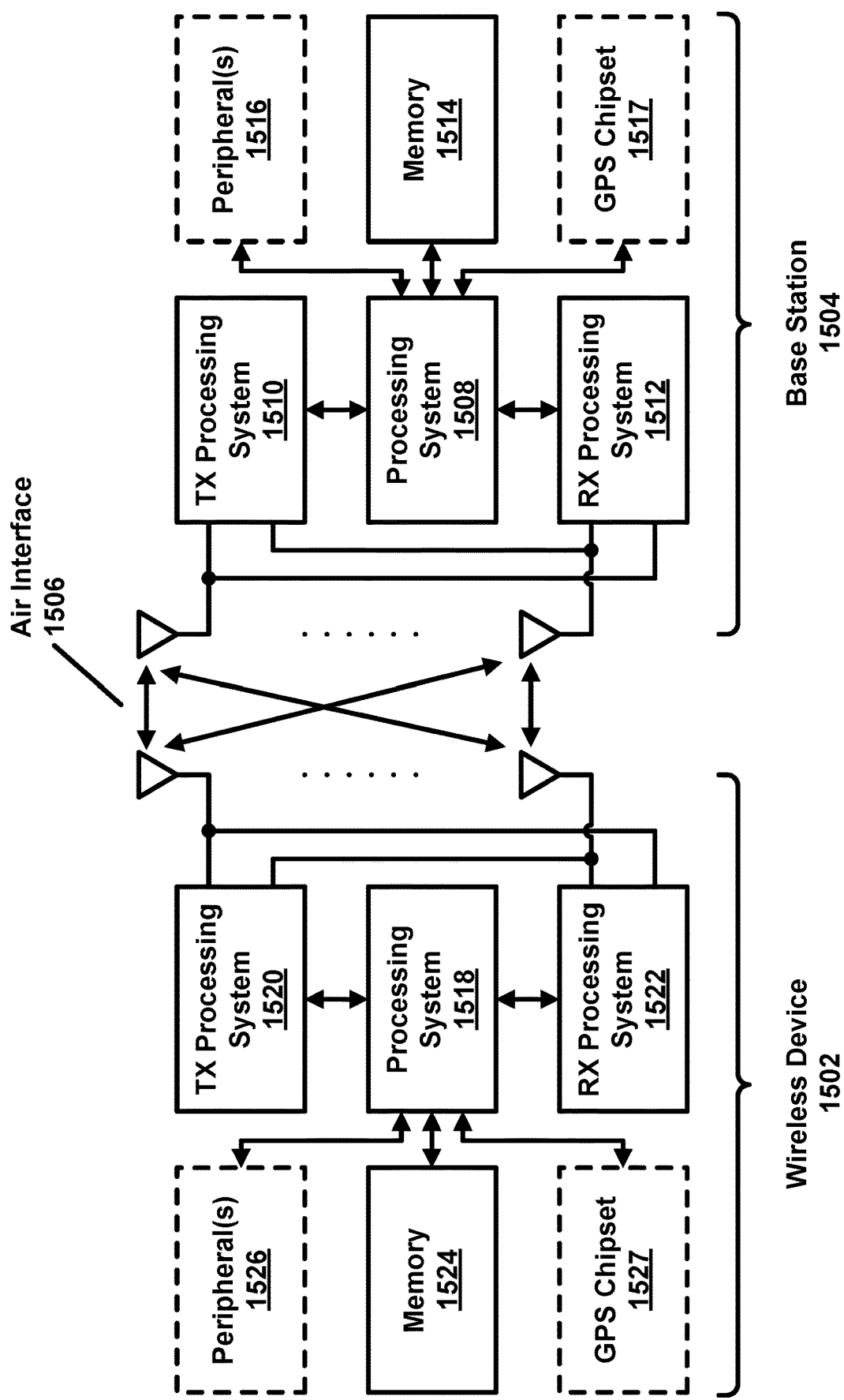
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
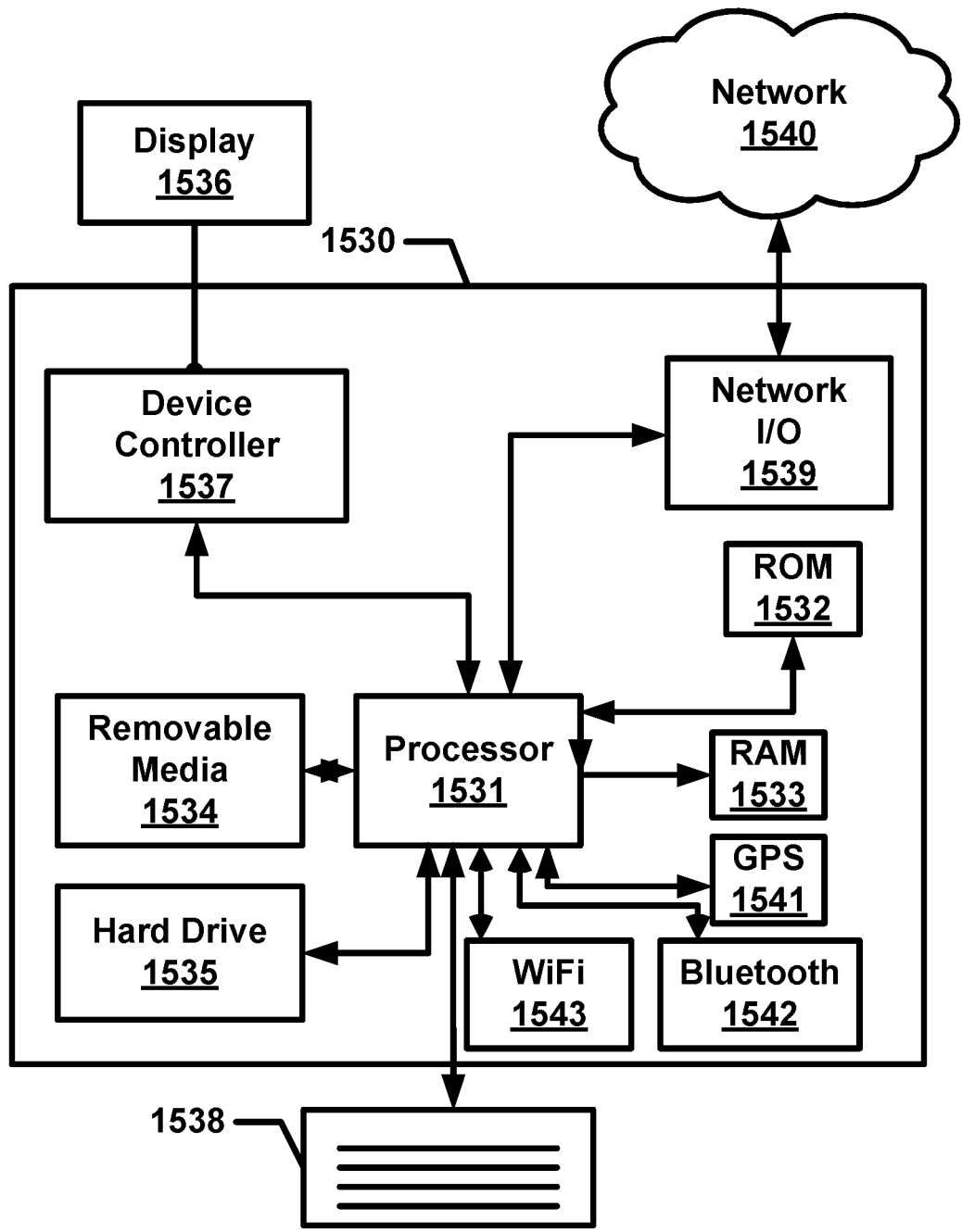
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless devices (e.g., UE, eNB, gNB) may communicate with each other directly via wireless communications, for example, device-to-device communications, vehicle-to-everything communications, vehicle-to-vehicle communications, vehicle-to-network communications, vehicle-to-roadside infrastructure communications, vehicle-to-pedestrian communications, and/or direct communications, with or without involving a base station as an intermediary. Wireless devices may exchange data without passing the data through a base station in a wireless communications scheme, for example, a direct wireless device-to-wireless device (e.g., UE-to-UE) communication scheme. Communications between wireless devices that establish a direct communication link (e.g., a sidelink) between each other may have reduced latency and/or may utilize fewer radio resources compared to communications established via a central base station.

FIGS. 17A-17D show examples of wireless communications between wireless devices 1710 and 1720. Referring to FIG. 17A, wireless device 1710 and wireless device 1720 may perform wireless communications 1715 while located outside of range of a wireless network cell coverage provided by, for example, a base station or TRP. Referring to FIG. 17B, wireless device 1710 and wireless device 1720 may perform wireless communications 1715 while the wireless device 1710 is located within range of a wireless network cell coverage 1740 provided by, for example, a base station or TRP 1730, and the wireless device 1720 is located outside of range of the wireless network cell coverage 1740. Referring to FIG. 17C, wireless device 1710 and wireless device 1720 may perform intra-cell wireless communications 1715 while located within range of the same wireless network cell coverage 1740 provided by, for example, a base station or TRP 1730. Referring to FIG. 17D, wireless device 1710 and wireless device 1720 may perform inter-cell wireless communications 1715 while the wireless device 1710 is located within a first wireless network cell coverage 1740 provided by, for example, a first base station or TRP 1730, and the wireless device 1720 is located within a second wireless network cell coverage 1760 provided by, for example, a second base station or TRP 1750.

A wireless device (e.g., the wireless device 1710, 1720) may send (e.g., transmit) a wireless communications signal via a sidelink to perform one or more of discovery or communications. The wireless device 1710, 1720 may send the wireless communications signal to discover (e.g., determine) at least one other wireless device 1720, 1710 adjacent (e.g., closer than a base station 1730, 1750) to the wireless device 1710, 1720. The wireless device 1710, 1720 may send (e.g., transmit) and/or receive a wireless communications signal via a physical sidelink discovery channel (PSDCH) to perform discovery of one or more other wireless devices. The wireless device 1710, 1720 may send (e.g., transmit) the wireless communications signal to send general data (e.g., voice data, image data, video data, safety information, etc.) directly to at least one other wireless device 1720, 1710. A physical sidelink broadcast channel (PSBCH), a physical sidelink shared channel (PSSCH), a physical sidelink control channel (PSCCH), or the like may send (e.g., transmitting) and/or receive a wireless communications signal between wireless devices.

Figure 18A:
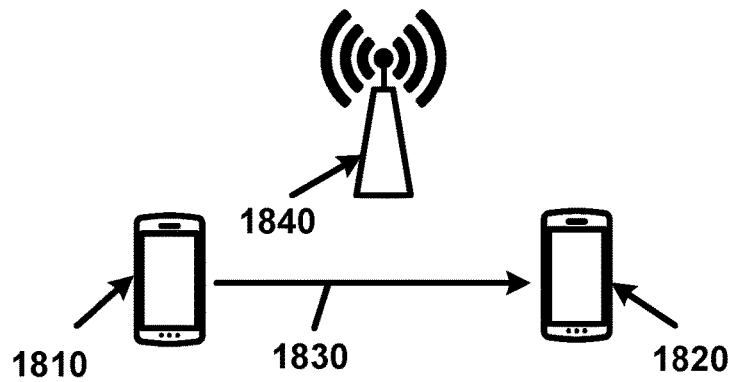
FIG. 18A shows an example of wireless communications between wireless devices having access to a base station of a wireless network.
Figure 18B:
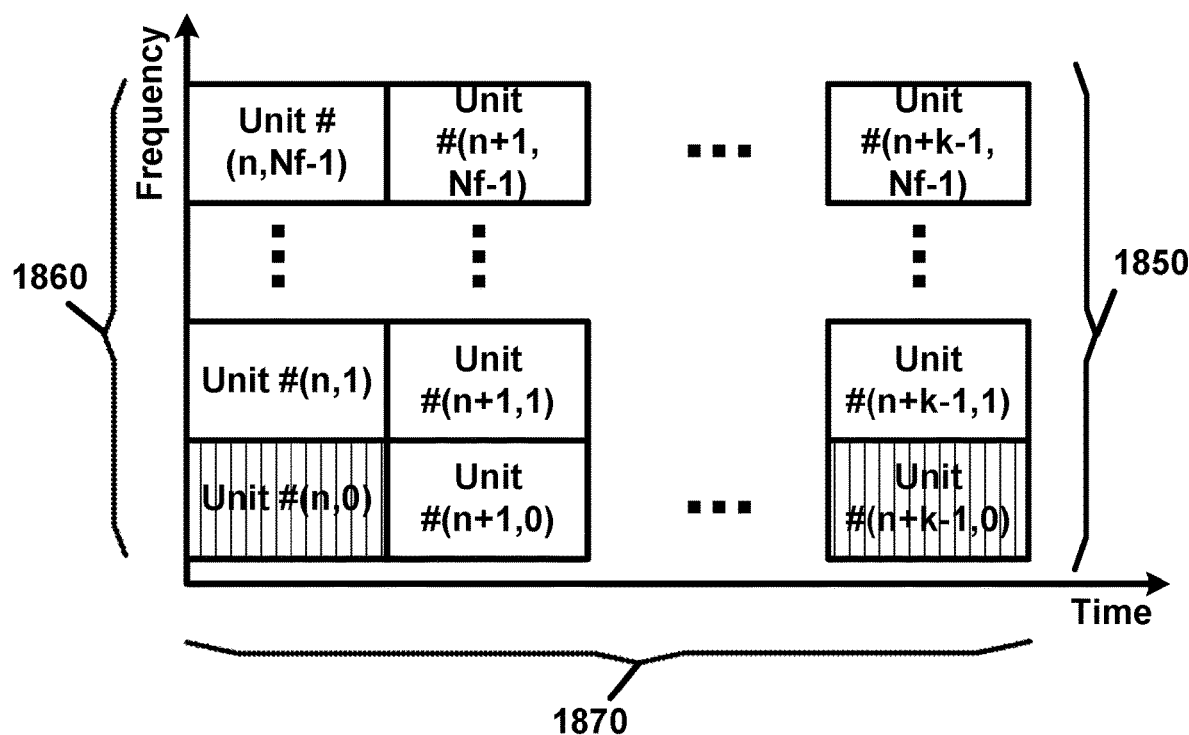
FIG. 18B shows an example of a resource pool for performing wireless communications.

FIG. 18A and FIG. 18B show examples of wireless communications. FIG. 18A shows an example of wireless communications between wireless devices having access to a base station of a wireless network. A wireless device 1810 may perform wireless communications with a wireless device 1820 by sending (e.g., transmitting) a wireless communications signal 1830 directly to the wireless device 1820. FIG. 18B shows an example of a resource pool 1850 for performing wireless communications. The resource pool 1850 may comprise radio resource units associated with the wireless devices 1810 and 1820 performing wireless communications. The wireless devices 1810 and 1820 may comprise a wireless terminal, access point (AP), or base station that sends (e.g., transmits) and/or receives a wireless signal for wireless communications. The wireless device 1810 may designate one or more radio resource unit(s) #(n . . . n+k−1, 0 . . . Nf−1) comprised by the resource pool 1850. The wireless device 1810 may send (e.g., transmit) the wireless communications signal 1830 based on or configured according to the designated one or more radio resource unit(s) #(n ... n+k−1, 0 ... Nf−1). The wireless device 1820 may receive a designation of one or more radio resource unit(s) #(n ... n+k−1, 0 ... Nf−1) comprised by the resource pool 1850 via which the wireless device 1810 may send (e.g., transmit) and the wireless device 1820 may receive the wireless communications signal 1830.

The base station 1840 may send (e.g., transmit) information regarding the resource pool 1850 to the wireless device 1810, for example, if the wireless device 1810 is located inside of a cell of network coverage provided by the base station 1840. The wireless device 1810 may receive the information regarding the resource pool 1850 from the wireless device 1820, for example, if the wireless device 1810 is located outside of a cell of network coverage provided by the base station 1840. The wireless device 1810 may access internally stored pre-configured information regarding the resource pool 1850, for example, if the wireless device 1810 is located outside of a cell of network coverage provided by any base station.

The resource pool 1850 may comprise a plurality of radio resource units #(n ... n+k−1, 0 ... Nf−1) indexed according to time slots (e.g., x axis) and frequency band slots (e.g., y axis). A radio resource unit may comprise one or more resource blocks (e.g., a frequency band slot, a subframe, K OFDM symbols) and a time duration. The wireless device 1810 may designate one or more radio resource unit(s) from a plurality of the radio resource units #(n ... n+k−1, 0 ... Nf−1) comprised by the resource pool 1850 and may send (e.g., transmit) a wireless communications signal 1830 according to the designated radio resource unit(s) for wireless communications with the wireless device 1820. A frequency band 1860 may be divided into a plurality of Nf frequency resource blocks. Each of the plurality of radio resource units #(n ... n+k−1, 0 ... Nf−1) may designate one (or more) of the Nf frequency resource blocks of the frequency band 1860. A time period 1870 may be divided into a plurality of k time resource blocks (e.g., time slot). Each of the plurality of radio resource units #(n ... n+k−1, 0 ... Nf−1) may designate one (or more) of the Nf frequency resource blocks of the frequency band 1860. The resource pool 1850 may be temporally repeated with a period of k time resource blocks. The resource pool 1850 may comprise a frequency band within a bandwidth part (BWP) for wireless communications or sidelink communications (e.g., a SL BWP). The given radio resource units #(n ... n+k−1, 0 ... Nf−1) may periodically and/or repeatedly appear over time. An index of a radio resource unit to which a logical resource unit is mapped may change with a predetermined pattern according to a value of time to generate a diversity gain in the time domain and/or the frequency domain. The resource pool 1850 may correspond to a set of radio resource units that the wireless devices 1810, 1820 may utilize for sending (e.g., transmitting) and/or receiving wireless communications signals 1830.

The resource pool 1850 may be classified according to contents of a wireless communications signal 1830 transmitted via the resource pool 1850. A plurality of wireless communications signals 1830 may be classified according to information content to be sent via the respective wireless communications signals 1830, and a separate resource pool 1850 may be allocated for each of the classifications of the wireless communications signals 1830. The resource pool 1850 may be allocated based on information content of the corresponding wireless communications signal 1830. The information contents of the wireless communications signal 1830 may include a control channel, a data channel, and/or a discovery channel. The control channel may correspond to a wireless communications signal 1830 that may comprise information indicating/specifying a radio resource position of a data channel, information indicating/specifying an MCS for modulating and demodulating a data channel, information indicating/specifying a MIMO transmission scheme, information specifying packet priority, information indicating/specifying target coverage, information specifying QoS requirements, or the like. The control channel may be multiplexed with and sent (e.g., transmitted) on a same radio resource unit as a data channel A control and data channel resource pool may correspond to a resource pool 1850 via which control information and data information are multiplexed and sent (e.g., transmitted). The control channel may comprise a physical sidelink control channel (PSCCH). The data channel may comprise a physical sidelink shared channel (PSSCH) corresponding to a resource pool 1850 via which the wireless device 1810 sends (e.g., transmits) user data to the wireless device 1820. A data channel excluding control information may be sent (e.g., transmitted) in a resource pool 1850 dedicated to the data channel, for example, if control information and data information are multiplexed in a same radio resource unit and sent (e.g., transmitted). The wireless devices 1810 and 1820 may send (e.g., transmit) control information in a designated resource unit of a control resource pool and data information in a data resource pool via the same resource elements (REs). The wireless device 1810 may send (e.g., transmit) one or more messages via a discovery channel corresponding to a resource pool 1850 dedicated to the discovery channel to facilitate neighboring wireless devices, for example, the wireless device 1820, to discover the wireless device 1810 sending (e.g., transmitting) information such as identification (ID) information pertaining to the wireless device 1810 and/or the like.

The resource pool 1850 may be classified according to QoS level and/or associated service. The base station 1840 may designate a priority level for each resource pool 1850. The resource pool 1850 may be configured differently for different associated services. A specific resource pool 1850 may be configured for use by only specific unicast or groupcast wireless devices. Different resource pools 1850 may be designated for different wireless communications signals 1830, for example, based on one or more transmission/reception attributes of the wireless communications signals 1830. Different resource pools 1850 may be designated for different wireless communications signals 1830, for example, regardless of whether or not information contents of the wireless communications signals 1830 are identical to each other.

Different instances of a same data channel or a same discovery signal/message may be associated with differently classified resource pools 1850. The resource pool 1850 may be classified according to contents of a data channel or a discovery signal/message based on a transmission timing determination scheme of a wireless communications signal 1830 (e.g., whether the wireless communications signal 1830 is sent (e.g., transmitted) at a time based on a time of receiving a synchronization reference signal, for example, at the time of receiving the synchronization reference signal or a different time based on the addition of a timing advance value). The resource pool 1850 may be classified according to contents of a data channel or a discovery signal/message based on a resource allocation scheme (e.g., whether a base station designates a transmission resource of an individual wireless communications signal 1830 or a wireless device designates the transmission resource of the individual wireless communications signal 1830 from a resource pool 1850). The resource pool 1850 may be classified according to contents of a data channel or a discovery signal/message based on a signal format of a wireless communications signal 1830 (e.g., a number of symbols occupied by a wireless communications signal 1830 in a subframe, or a number of subframes used for sending (e.g., transmitting) a wireless communications signal 1830). The resource pool 1850 may be classified according to contents of a data channel or a discovery signal/message based on signal strength from a base station (e.g., the base station 1840), transmit power level of a wireless device (e.g., wireless device 1810) sending (e.g., transmitting) the wireless communications signal 1830, and/or the like.

Transmission resource designation methods may be categorized as different modes and/or types. A base station (e.g., base station 1840) may designate (e.g., directly designate) a transmission resource to be used by a wireless device (e.g., the wireless device 1810) for sending (e.g., transmitting) a wireless communications signal using a mode 1. The base station (e.g., eNB, gNB, etc.) may send (e.g., transmit) DCI to schedule a transmission of a wireless communications signal 1830 according to mode 1. A wireless device (e.g., wireless device 1810) may directly designate a transmission resource from a pre-configured transmission resource region or resource pool 1850 or from a transmission resource region or resource pool 1850 designated by a base station (e.g., base station 1840) using a mode 2. A base station (e.g., base station 1840) may designate (e.g., directly designate) a transmission resource to be used by a wireless device (e.g., the wireless device 1810) for performing a Type 2 discovery. A wireless device (e.g., wireless device 1810) may designate (e.g., directly designate) a transmission resource from a pre-configured transmission resource region or resource pool 1850 or from a transmission resource region or resource pool 1850 designated by a base station (e.g., base station 1840) for performing a Type 1 discovery.

The wireless device 1810 and the wireless device 1820 may perform time synchronization and/or frequency synchronization with one another, for example, to perform wireless communications with one another. The base station 1840 may synchronize the time and frequency references of the wireless devices 1810 and 1820 (e.g., by PSSs/SSSs of a cell provided by the base station 1840, other reference signals (e.g., CSI-RSs), and/or the like transmitted by the base station 1840), if the wireless devices 1810 and 1820 both are located within the network coverage of the cell. The wireless devices 1810 and 1820 may maintain time/frequency synchronization in a level that the wireless devices 1810 and 1820 are capable of directly sending (e.g., transmitting) and receiving a signal. The wireless device 1810 may send (e.g., transmit) a synchronization signal (e.g., a sidelink synchronization signal (SLSS)) and the wireless device 1820 may receive and synchronize with the synchronization signal. The SLSS may comprise a sidelink primary synchronization signal (S-PSS) and/or a sidelink secondary synchronization signal (S-SSS). The wireless device 1810 may send (e.g., transmit) the SLSS with a physical sidelink broadcast channel (PSBCH) to convey some basic or initial system information. The wireless devices 1810, 1820 may synchronize or derive a timing of transmission time intervals (e.g., frames, subframes, slots, and/or the like) using global navigation satellite system (GNSS) timing. S-PSS, S-SSS and PSBCH may be structured in a block format (e.g., sidelink synchronization signal block (S-SSB)) and may support periodic transmission. The S-SSB may use a same numerology (e.g., SCS and CP length) as a sidelink data channel and a sidelink control channel in a carrier. The S-SSB's transmission bandwidth may be within the pre-configured sidelink BWP. The S-SSB's frequency location may be pre-configured. The wireless device (e.g., the wireless device 1810) may forego performing hypothesis detection in frequency to find S-SSB in a carrier, if the S-SSB's frequency location is pre-configured. Sidelink synchronization sources may include GNSS, gNB, eNB, and/or NR UE. Each sidelink synchronization source may be associated with a synchronization priority level A priority order of the sidelink synchronization sources and/or synchronization priority levels may be pre-configured.

Each of a plurality of neighboring wireless devices 1810, 1820 may designate one or more subchannels of a resource pool 1850 for sending (e.g., transmitting) a wireless communications signal 1830. A frequency bandwidth of the resource pool 1850 may be divided into multiple subchannels. A wireless device 1810, 1820 may designate a subchannel, for example, based on received energy measurements and/or control channel decoding. A wireless device 1810, 1820 may determine a subchannel that another wireless device 1810, 1820 is designating for use, for example, based on control channel decoding and/or an energy measurement for each subchannel. In-band emissions (IBEs) may effectively impose a limit on system performance. An in-band emission may comprise interference caused by one transmitter transmitting on one subchannel and imposed on another transmitter transmitting to a receiver on another subchannel.

Figure 19:
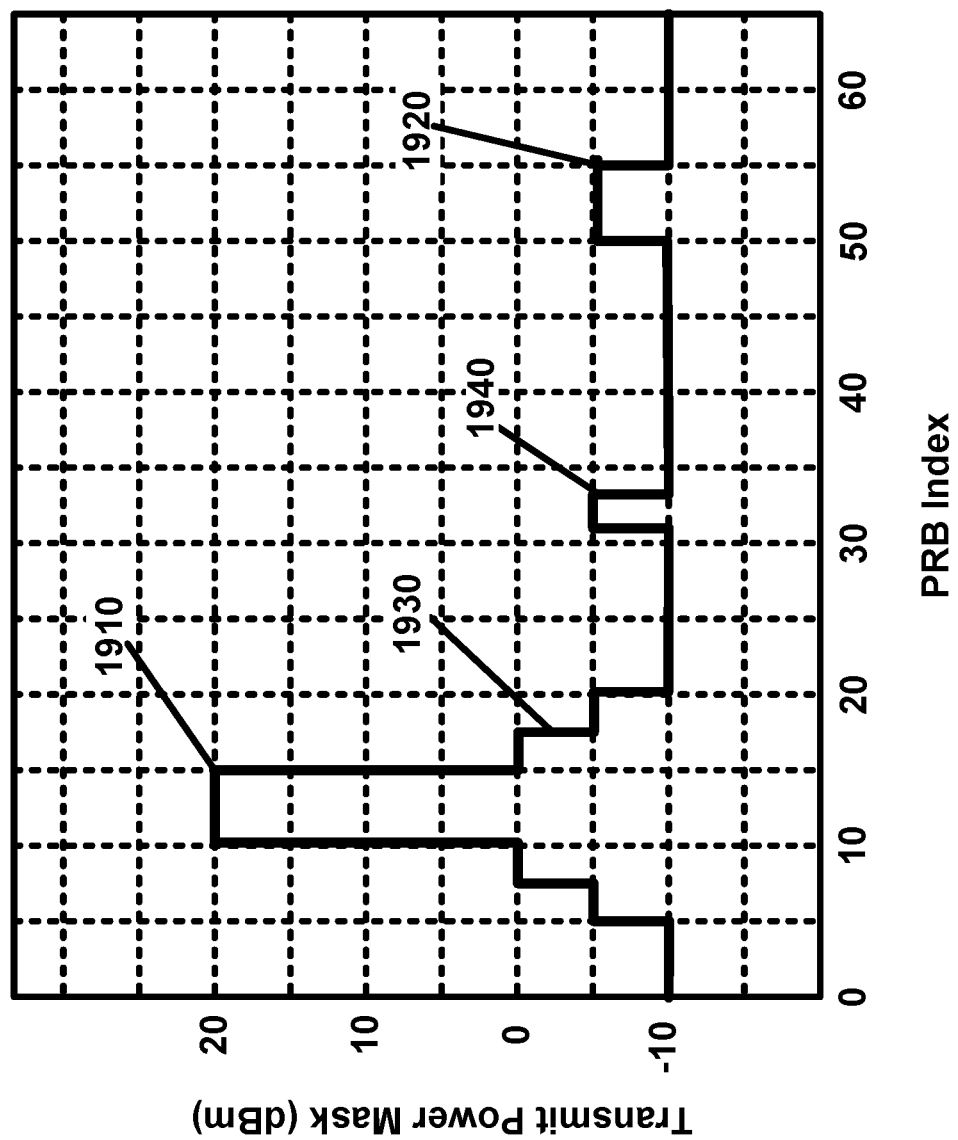
FIG. 19 shows an example of an in-band emissions (IBE) model.

FIG. 19 shows an example of an in-band emissions (IBE) model. Subchannels nearby to a desired transmitted signal 1910, as well as other subchannels (e.g., I/Q image subchannels 1920) may experience more interference, as shown in FIG. 19. General in-band emissions 1930 tend to be stronger close in frequency to the desired transmitted signal 1910. Carrier leakage 1940 tends to be generated around a direct current or direct conversion (DC) subcarrier. The I/Q image subchannels 1920 may be located in symmetrical subchannels of the desired transmitted signal around the DC subcarrier.

A wireless device 1810 radiating power in association with performing wireless communications within a cell of a wireless network provided by a base station 1840 may cause serious interference to the cellular communications of the cell. If the wireless device 1810 performing wireless communications uses only some frequency resources in a particular slot or subframe, the in-band emission of the power radiated by the wireless device 1810 may cause serious interference to the frequency resources used by the cellular communications network. The wireless device 1810 performing wireless communications may perform cellular pathloss-based power control to prevent excess interference that causes these problems. The base station 1840 may configure parameters used for power control (e.g., target power level (P0) and/or pathloss scaling factor (alpha)).

A wireless device 1810 that sends (e.g., transmits) a wireless communications signal 1830 may correspond to a half-duplex wireless device, which may not be capable of receiving a signal at a same time of sending a signal (e.g., performing transmission). The wireless device 1810 may fail to receive a signal sent (e.g., transmitted) by another wireless device 1820 due to the half-duplex problem. Different wireless devices 1810, 1820 performing wireless communications may send (e.g., transmit) signals via one or more different time resources to mitigate the half-duplex problem.

Direct wireless communications between wireless devices in proximity to each other (e.g., closer to each other than the wireless devices are to a base station or sufficiently close to each other for the wireless devices to establish a reliable communication link with each other) may have various advantages. For example, the wireless devices participating in direct wireless communications with each other may have a high data transfer rate with low latency for data communications. Wireless devices performing wireless communications between each other in a wireless network cell may reduce network traffic concentration on a base station of the cell, for example, by distributing network traffic among direct connections between wireless devices in the cell. A wireless device, in a cell of a wireless network, performing wireless communications with another wireless device outside the cell, may perform a communications relay role and thereby effectively extend the communications reach and/or cell coverage of a base station that provides the cell's network communications.

Figure 20:
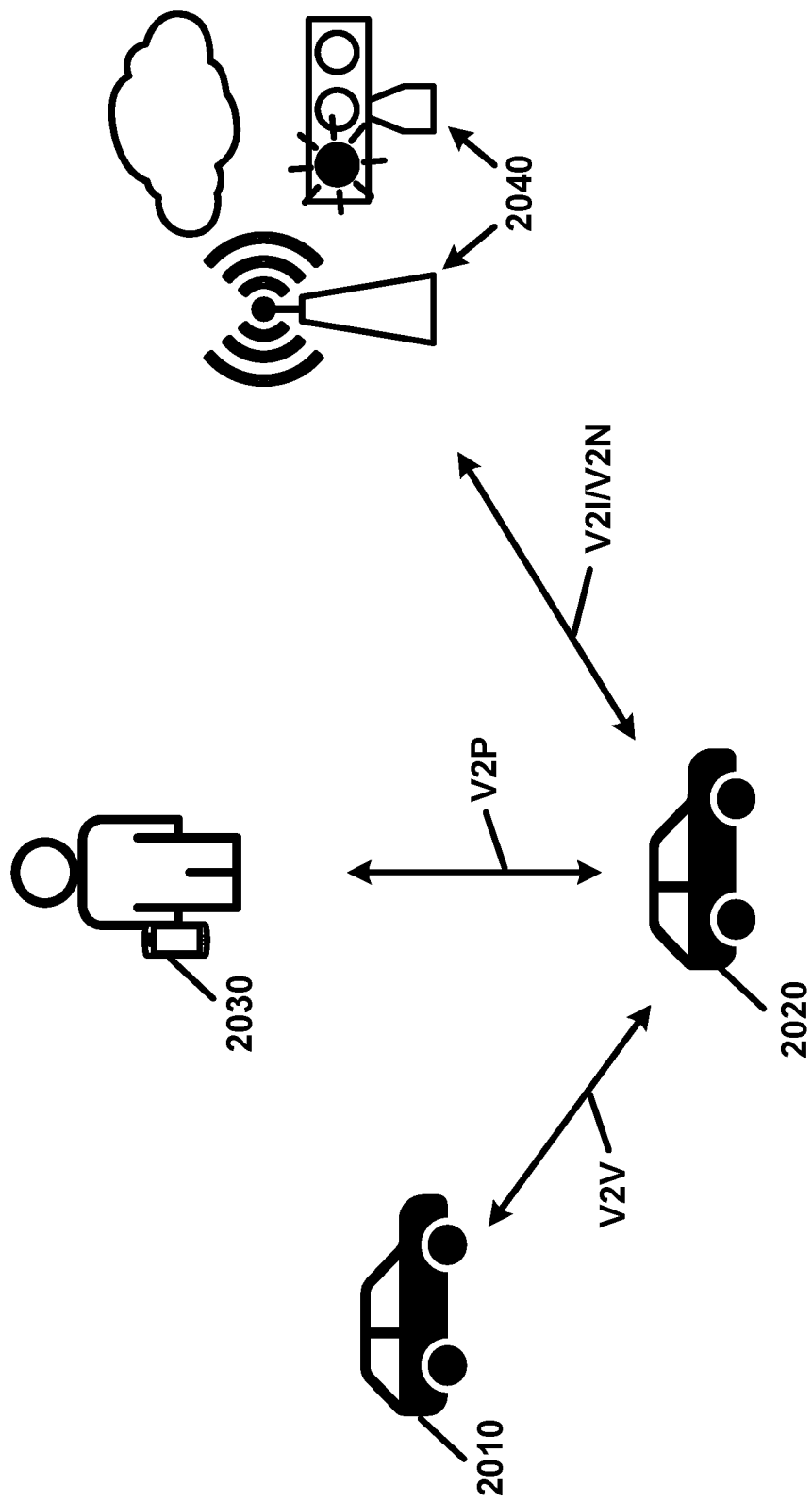
FIG. 20 shows an example of wireless communications between various vehicles and devices.

FIG. 20 shows an example of wireless communications between various vehicles and wireless devices. At least one automotive vehicle 2010, 2020 may apply the wireless communications methods described herein for sending and/or receiving communications signals and messages to and/or from an automotive vehicle (e.g., vehicle-to-everything (V2X) communications). V2X communications may include wireless communications between a vehicle and another vehicle, for example, vehicle-to-vehicle (V2V) wireless communications. V2X communications may include wireless communications between a vehicle and a portable wireless device 2030 carried by an individual (e.g., handheld wireless terminal carried by a pedestrian, cyclist, driver, or passenger), for example, vehicle-to-pedestrian (V2P) wireless communications. V2X communications may include wireless communications between a vehicle and an infrastructure/network and/or roadside unit (RSU)/network 2040 (e.g., traffic light and/or signal), for example, vehicle-to-infrastructure/network (V2I/N) wireless communications. An RSU 2040 may include a transportation infrastructure entity implemented in a base station or a stationary wireless device proximate a road or highway. The RSU may comprise, for example, an entity sending (e.g., transmitting) speed notifications to vehicles and/or wireless devices in the vicinity of a road or highway. A vehicle, an RSU, a stationary wireless device, and/or a portable wireless device may comprise a transceiver configured to perform V2X communications.

A vehicle 2010, 2020, a portable wireless device 2030, and/or an RSU 2040 may perform V2X communications to indicate warnings for various safety-related events and the like. The vehicle 2010 may perform V2X communications to send information regarding an event occurring on the vehicle 2010 or road via which the vehicle 2010 is traveling to another vehicle 2020, the RSU 2040, and/or a pedestrian's portable wireless device 2030. The information regarding the event may comprise a warning of a traffic accident on the road, a change of a road situation, and/or occurrence of an accident involving the vehicle 2010. The vehicle 2010 may perform V2X communications to send information regarding the event to a pedestrian adjacent to or crossing a road via the pedestrian's portable wireless device 2030, for example, as the vehicle 2010 approaches the pedestrian.

At least one vehicle 2010, 2020, portable wireless device 2030, and/or RSU 2040 may be configured for performing V2X communications, for example, to prevent and/or reduce vehicle collisions and/or improve communications quality of service in geographic locations having a high density of wireless devices 2030, for example, in city downtowns. At least one vehicle 2010, 2020, portable wireless device 2030, and/or RSU 2040 may be configured for performing wireless congestion control, for example, in conjunction with V2X communications, to mitigate collisions by adjusting one or more communications parameters to control a congestion level on the wireless channel(s) used by the at least one vehicle 2010, 2020 and improve reliability of V2X communications.

In some types of wireless communications, a wireless device may measure a channel busy ratio (CBR) and/or a channel occupancy ratio (CR). The wireless device may measure the CBR and/or CR, for example, to determine (e.g., characterize) the channel state, and/or allow/facilitate the wireless device to determine and/or take corrective actions. The CBR may be determined based on a portion (or quantity) of subchannels in a radio resource pool having measured received signal strength indicators (RSSIs) exceeding a threshold (e.g., a configured threshold, or a pre-configured threshold such as may be pre-configured by a base station). The total frequency resources of the radio resource pool may be divided into a quantity (e.g., a given number) of subchannels. The CBR may be sensed over, for example, the last 100 subframes (e.g., with subframes determined according to LTE or other standard or access technology), or any other duration or period (e.g., slots determined based on NR or any other access technology). The CBR may determine an estimate of a state of the channel. The CR may be determined at subframe n as a sum of the total number/quantity of subchannels used for sidelink transmissions in subframes ([n−a, n−1] subchannels) and granted in subframes ([n, n+b] subchannels), divided by a total number of subchannels ([n−a, n+b] subchannels). Values for the variables a and b may be determined by the wireless device based on the conditions a+b+1=1000, a≥500. The CR may provide an indication of the channel utilization by the transmitter of the wireless device. A wireless device's CR limit, for each interval of CBR values, may represent a maximum footprint for the transmitter of the wireless device. A base station may establish the CR limit based on a CBR range and packet priority. The base station may establish a low CR limit, for example, if a high CBR is observed. The base station may establish a low CR limit, for example, based on a low packet priority level. The base station may map its CBR value to the correct interval to determine the corresponding CR limit value, for example, if transmitting a data packet. The wireless device may decrease its CR below the CR limit, for example, if the wireless device's CR is higher/greater than the CR limit. Various methods may be practiced to reduce the CR, for example. A base station may disable packet retransmission, for example, via a drop packet retransmission procedure. A base station may disable packet transmission and retransmission, for example, via a drop packet transmission procedure. A wireless device may reduce CR by augmenting the utilized MCS index, for example, via a procedure for adapting the MCS. The wireless device adapting the MCS may reduce the quantity of subchannels used for transmission. The wireless device increasing the MCS may reduce robustness of the message that the wireless device sends, and may consequently reduce a range of the message. A wireless device may reduce transmission power, for example, via a procedure for adapting the transmission power. The wireless device reducing transmission power may reduce overall CBR in the area, and may increase the value of the CR limit.

A PMI (e.g., a preferred PMI) may or may not be indicated by a receiver wireless device, for example, in open-loop MIMO. A cyclic delay diversity (CDD) may be used/considered to enhance decoding performance. CDD may comprise using a different time delay, from a set of delays, for sending/transmitting signals via a corresponding antenna in a set of antennas. A time delay may be applied before a cyclic prefix (CP) is added. Applying the delay before adding the cyclic prefix may enable the delay to be cyclic over the FFT size. Applying a time delay may correspond to (e.g., may be equivalent to/identical to) applying a phase shift in frequency domain A same time delay may be applied to all subcarriers. The phase shift may increase linearly across the subcarriers with increasing subcarrier frequency as the same time delay may be applied to all subcarriers. Each subcarrier may correspond to a different beamforming pattern as a non-delayed subcarrier from one antenna may interfere constructively (or destructively) with a delayed version from other antenna(s). Different subcarriers may pick out different spatial paths in a propagation channel, which may increase frequency-selectivity of the channel Channel coding, may be applied to a whole transport block across the subcarriers. The channel coding ensures that the whole transport block may benefit from the diversity of spatial paths.

Figure 21:
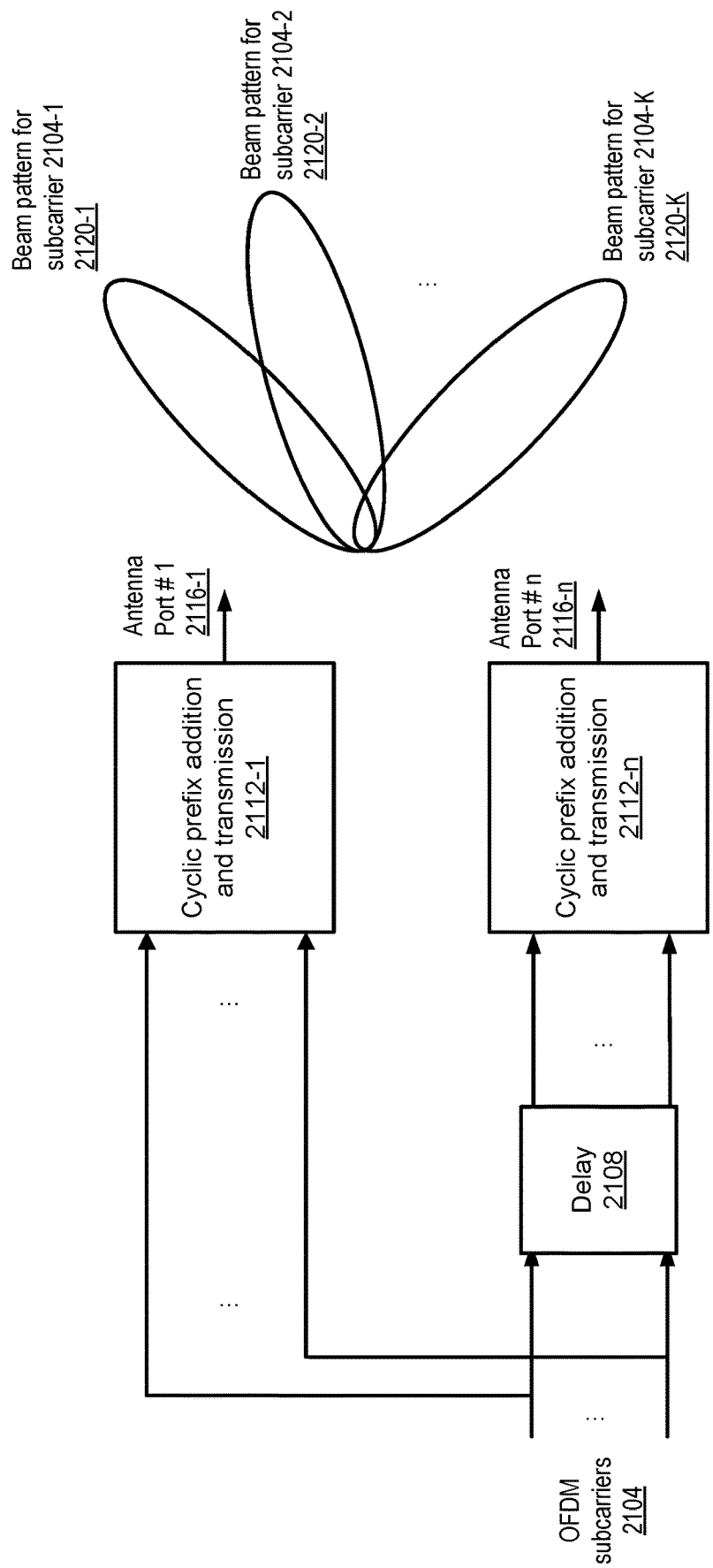
FIG. 21 shows example wireless communication using cyclic delay diversity (CDD).

FIG. 21 shows example communication using CDD. A wireless device may comprise n antenna ports 2116-1 . . . 2116-n. Sending/transmission of a signal via an antenna port 2116 may comprise addition of a cyclic prefix at block 2112. A time delay 2108 may be applied to OFDM subcarriers 2104, prior to addition of the cyclic prefix. Different time delays may be used for different antenna ports 2116. Addition of different time delays for transmissions via different antenna ports 2116 may result in each OFDM subcarrier (of the OFDM subcarriers 2104) having a different beam pattern 2120. For example, subcarrier 2104-1 (of the OFDM subcarriers 2104) may have a beam pattern 2120-1, subcarrier 2104-2 (of the OFDM subcarriers 2104) may have a beam pattern 2120-2, etc.

Adding a time delay before the adding the cyclic prefix may allow a use of any time delay value without increasing the overall delay spread of the channel. An additional RS may be transmitted for channel estimation of a delayed version of the channel, for example, if the time delay value is greater than a length (e.g., duration) of the cyclic prefix. A CDD scheme that uses a delay shorter than the cyclic prefix length may be referred to as a small delay CDD (SD-CDD), and a CDD scheme that requires an additional RS with a delay larger than the cyclic prefix length is called a large delay CDD (LD-CDD).

FIGS. 22A-22D shows example resource configurations for control channels and data channels. An example resource configuration may correspond to division of resources in a resource pool (e.g., the resource pool 1850) between a control channel and a data channel. The resource pool may correspond to resources used for sidelink communications (e.g., a sidelink channel) between two wireless devices. For example, the control channel may comprise a PSCCH and the data channel may comprise a PSSCH.

FIG. 22A shows an example resource configuration 2200 of a control channel 2204 and a data channel 2208. The control channel 2204 and the data channel 2208 may share a same frequency band but may correspond to different time periods. FIG. 22B shows an example resource configuration 2210 of a control channel 2214 and a data channel 2218. The control channel 2214 and the data channel 2218 may correspond to different frequency bands and different time periods, but a portion of the data channel 2218 may overlap in frequency with the control channel 2214. FIG. 22C shows an example resource configuration 2220 of a control channel 2224 and a data channel 2228. The control channel 2224 and the data channel 2228 may correspond to different frequency bands but a same time period. FIG. 22D shows an example resource configuration 2230 of a control channel 2234 and a data channel 2238. The control channel 2234 and the data channel 2238 may correspond to different frequency bands and different time periods, but a portion of the data channel 2238 may overlap in time and frequency with the control channel 2234.

Figure 23:
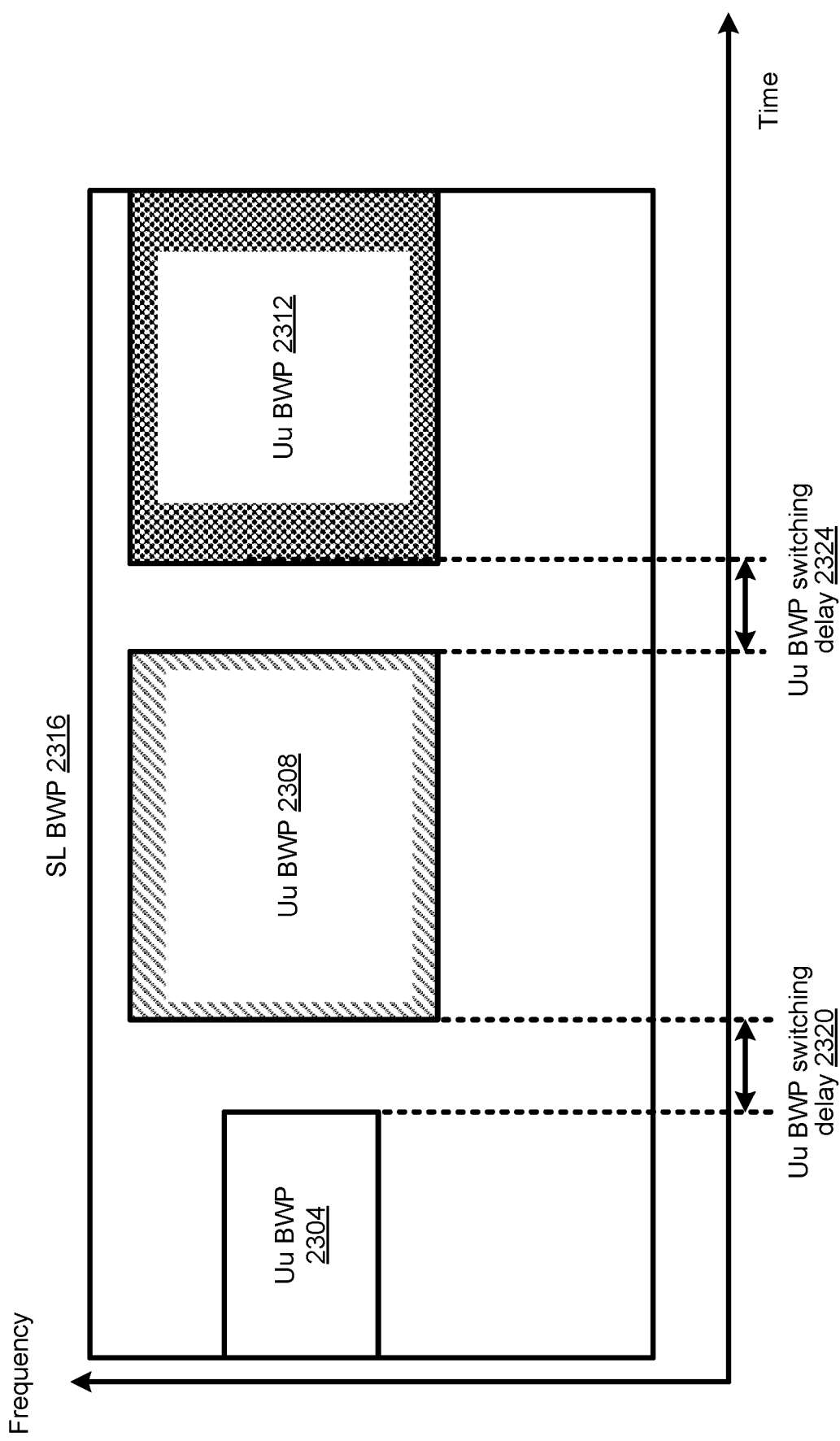
FIG. 23 shows an example configuration of BWPs used for communications.

FIG. 23 shows an example configuration of BWPs used for communications. A sidelink BWP (SL BWP) 2316 may be a BWP for sidelink communications between two wireless devices. The SL BWP 2316 may correspond to a sidelink channel (e.g., comprising a data channel and/or a control channel as described with reference to FIGS. 22A-22D).

The SL BWP 2316 may at least partially overlap (e.g., in frequency and/or time) one or more BWPs (e.g., Uu BWPs) used for communication between a wireless device and a base station. The one or more BWPs may comprise BWP 2304, BWP 2308, and/or BWP 2312. The one or more BWPs may correspond to an interface (e.g., a Uu interface) between the wireless device and the base station. The one or more BWPs may be Uu BWPs corresponding to a Uu interface between the wireless device and the base station. The wireless device and the base station may switch between the one or more BWPs for communications. Switching between the one or more BWPs may comprise a BWP switching delay 2320 or a BWP switching delay 2424, for example, during which the wireless device and/or the base station switch operating frequencies from one BWP to another BWP. The BWP switching delay 2420 and the BWP switching delay 2424 may or may not be same.

Figure 24:
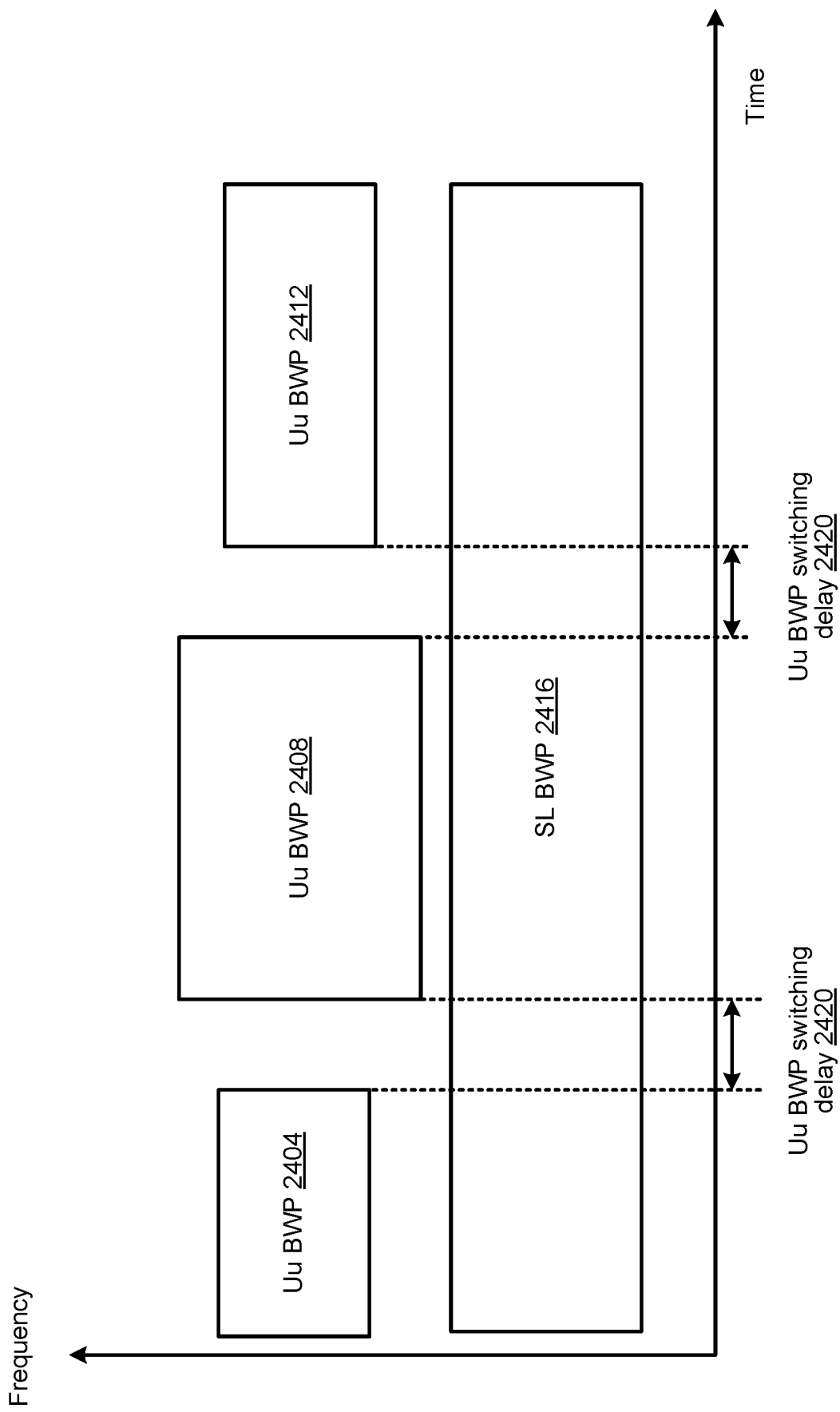
FIG. 24 shows an example configuration of BWPs used for communications.

FIG. 24 shows an example configuration of BWPs used for communications. A sidelink BWP (SL BWP) 2416 may be a BWP for sidelink communications between two wireless devices. The SL BWP 2416 may correspond to a sidelink channel (e.g., comprising a data channel and/or a control channel as described with reference to FIGS. 22A-22D).

One or more other BWPs (e.g., Uu BWPs) may be used for communication between a wireless device and a base station. The one or more other BWPs may not overlap (e.g., in frequency and/or time) with the SL BWP 2416. The one or more BWPs may comprise BWP 2404, BWP 2408, and/or BWP 2412. The one or more BWPs may correspond to an interface (e.g., a Uu interface) between the wireless device and the base station. The one or more BWPs may be Uu BWPs corresponding to a Uu interface between the wireless device and the base station. The wireless device and/or the base station may switch between the one or more BWPs for communications. Switching between the one or more BWPs may comprise a BWP switching delay 2420 or a BWP switching delay 2424, for example, during which the wireless device and/or the base station switch operating frequencies from one BWP to another BWP. The BWP switching delay 2420 and the BWP switching delay 2424 may or may not be same.

In some types of wireless communications (e.g., compatible with 3GPP Release 16, earlier/later 3GPP releases or generations, and/or other access technology), a base station may determine configuration parameters for sidelink communication between two or more wireless devices. A first wireless device may send/receive data (e.g., transport blocks, signals, messages) to/from a second wireless device, via a sidelink channel, based on configuration parameters determined by the base station. The second wireless device may be unable to properly receive/send the signal, for example, if a transmission/reception scheme (e.g., used at the first wireless device) based on the configuration parameters is not supported by the second wireless device. For example, the first wireless device may send/receive signals via bands/carriers not supported by the second wireless device, using a RAT not supported by the second wireless device, using an MCS not supported by the second wireless device, a slot format not supported by the second wireless device, and/or any other configuration(s) and/or parameter(s) not supported by the second wireless device. Using configuration(s)/parameter(s) not supported by the second wireless device may increase packet loss rate, decrease service reliability of wireless devices, and/or reduce transmission efficiency of sidelink communications.

Various examples described herein support efficient sidelink communications between two or more wireless devices. A first wireless device (a sending wireless device or a wireless device at another base station) may send, to a base station, sidelink capability information of (e.g., corresponding to, associated with) a second wireless device (e.g., a receiving wireless device, a peer wireless device, etc.). The base station may determine configuration parameters for communication between the first wireless device and the second wireless device based on the sidelink capability information. The first wireless device may use transmission/reception schemes based on the configuration parameters (e.g., as determined by the base station) for sidelink communications with the second wireless device.

Various examples of sidelink communications described herein may support handover procedures. For example, a base station may send sidelink capability information of the second wireless device (e.g., receiving wireless device) to a target base station for a handover procedure of the first wireless device (e.g., sending wireless device). The target base station may determine configuration parameters for communication between the first wireless device and the second wireless device based on the sidelink capability information of the second wireless device.

Determining the configuration parameters based on the sidelink capability information of the second wireless device may help to ensure use of transmission/reception schemes that are supported by the second wireless device for communications between the first wireless device and the second wireless device. For example, the second wireless device may properly and/or reliably send/receive data (e.g., messages, transport blocks, packets, signals) if the first wireless device uses transmission/reception schemes that may be supported by the second wireless device. Determining the configuration parameters based on the sidelink capability information and using transmission/reception schemes based on the determined communication parameters may provide advantages such as decreased packet loss rate in sidelink communications and/or increased communication reliability of the sidelink communications.

Figure 25:
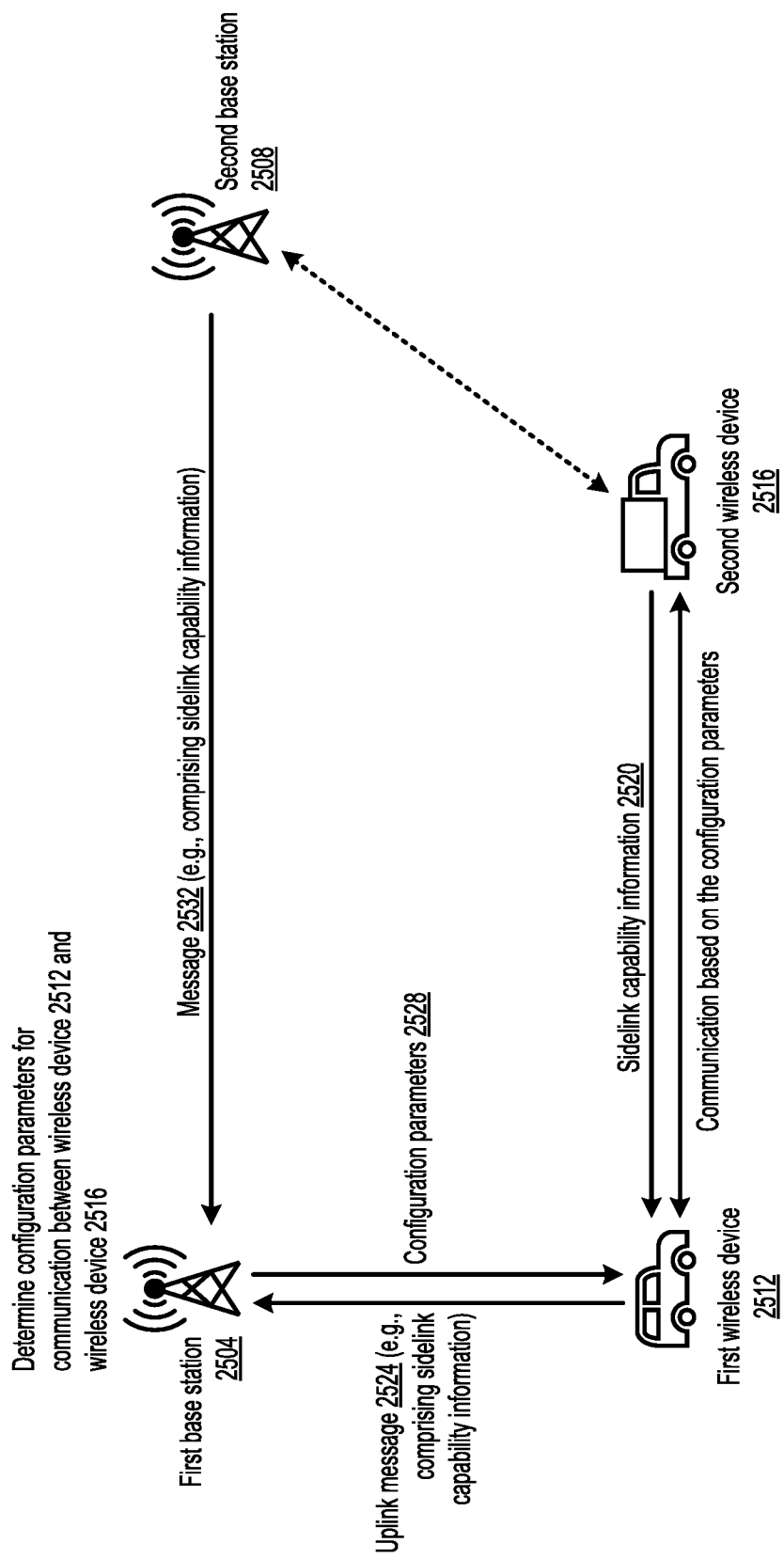
FIG. 25 shows example sidelink communications between two wireless devices.

FIG. 25 shows example sidelink communications between two wireless devices. A wireless device (e.g., a first wireless device 2512) may send, to one or more base stations (e.g., a first base station 2504), sidelink capability information associated with one or more other wireless devices (e.g., a second wireless device 2516). The wireless device may receive configuration parameters determined based on the sidelink capability information and communicate with one or more other wireless devices based on the configuration parameters. For example, the first base station 2504 may send, to the first wireless device 2512, configuration parameters determined based on the sidelink capability information. The first wireless device 2512 and the second wireless device 2516 may communicate based on the configuration parameters.

The first wireless device 2512 (e.g., UE1, a first vehicle, a first sidelink wireless device, a first device-to-device communication wireless device, etc.) may communicate with the second wireless device 2516 (e.g., UE2, a second vehicle, a second sidelink wireless device, a second device-to-device communication wireless device, etc.). The first wireless device 2512 may have an RRC connection with the second wireless device 2516. An RRC connection between two wireless devices (e.g., the first wireless device 2512 and the second wireless device 2516) may be via a PC5 interface as defined by the 3GPP, or via any other interface compatible with any other access technology. An RRC connection between two wireless devices via a PC5 interface may be referred to as a PC5-RRC connection.

The first wireless device 2512 may have a direct connection (e.g., a sidelink direct communication connection), a PC5 connection, a sidelink connection, and/or the like with the second wireless device 2516. The first wireless device 2512 may be configured to communicate with the first base station 2504 (e.g., gNB1, gNB, eNB, RNC, IAB-node, IAB-donor, gNB-DU, gNB-CU, access node, etc.). The second wireless device 2516 may be configured to communicate with a second base station 2508 (e.g., gNB2, gNB, eNB, RNC, IAB-node, IAB-donor, gNB-DU, gNB-CU, access node, etc.).

The first wireless device 2504 may communicate with a third wireless device (e.g., UE3, a third vehicle, a third sidelink wireless device, a third device-to-device communication wireless device, etc.). The first wireless device 2504 may be connected with the third wireless device via at least one of: a second RRC connection (e.g., a second PC5-RRC connection), a second direct connection (e.g., a sidelink direct communication connection), a second PC5 connection, a second sidelink connection, and/or the like. The first wireless device 2512 may send/transmit data/transport blocks to the second wireless device 2516 and/or the third wireless device. The wireless device 2512 may send data/transport blocks as a unicast transmission, a multicast transmission, and/or a broadcast transmission. The first wireless device 2512, the second wireless device 2516, and/or the third wireless device may belong to a same sidelink multicast group.

The first wireless device 2512 may have an RRC connection with the first base station 2504. The first base station 2504 may be a serving base station of the first wireless device 2512. The first base station 2504 may serve the first wireless device 2512 via at least one serving cell (e.g., comprising at least one of a first primary cell, one or more first secondary cells, etc.). The first base station 2504 may be a secondary base station or other base station (e.g., camp-on base station) of the first wireless device (e.g., if the first wireless device 2512 is in an RRC inactive state and/or an RRC idle state). The first wireless device 2512 may communicate with the second wireless device 2516 based on mode 1 operation and/or mode 2 operation (e.g., mode 1 sidelink resource selection and/or mode 2 sidelink resource selection).

The second wireless device 2516 may be served by the second base station 2508. The second wireless device 2516 may have an RRC connection with the second base station 2508. The second wireless device 2516 may be in an RRC idle state or an RRC inactive state at a cell of the second base station 2508 (e.g., the second wireless device 2516 may be camping on a cell of the second base station 2508). The first base station 2504 may have a direct connection (e.g., via an Xn interface, an X2 interface, etc.) and/or an indirect connection (e.g., via one or more N2/S1 interfaces, one or more AMFs/MMEs, etc.) with the second base station 2508.

The first wireless device 2512 may receive, from the second wireless device 2516, at least one message (e.g., a sidelink message via a sidelink channel) comprising sidelink capability information 2520 of the second wireless device 2516. The sidelink capability information 2520 of the second wireless device 2516 may indicate at least one of: whether the second wireless device 2516 supports a sidelink multiple carrier operation, a supported/operating sidelink RAT, an available band, whether the second wireless device 2516 supports an unlicensed band, a supported MCS, a synchronization reference source (e.g., a base station, a satellite, a GNSS, etc.) of the second wireless device 2516, and/or the like. The first wireless device 2512 may send, to the first base station 2504, at least one uplink message 2524 (e.g., an RRC message) comprising the sidelink capability information 2520 of the second wireless device 2516. The first base station 2504 may determine configuration parameters 2528 for sidelink communication between the first wireless device 2512 and the second wireless device 2516 based on the sidelink capability information 2520 of the second wireless device 2516. The first wireless device 2512 may receive, from the first base station 2504, the configuration parameters 2528 for sidelink communication between the first wireless device 2512 and the second wireless device 2516. The first wireless device 2512 may send/transmit, to the second wireless device 2516, data (e.g., signals, transport blocks) based on the configuration parameters 2528. The first wireless device 2512 may receive, from the second wireless device 2516, data (e.g., signals, transport blocks) based on the configuration parameters 2528.

The first base station 2504 may send, to a third base station, the sidelink capability information 2520 of the second wireless device 2516. The third base station may be at least one of: a target base station for a handover of the first wireless device, a secondary base station of the first wireless device, and/or the like. The third base station may use the sidelink capability information 2520, for example, to configure a sidelink channel between the first wireless device 2512 and the second wireless device 2516 after a handover process of the first wireless device 2512 to the third base station.

The first base station 2504 may receive, from the first wireless device 2512, device information of the second wireless device 2516. The device information may indicate at least one of: a serving cell, a serving base station, a resource pool, a zone, and/or the like. The first base station 2504 may determine/identify, based on the device information, the second base station 2508 that serves the second wireless device 2516. The first base station 2504 may send, to the second base station 2508, request for sidelink capability information of the second wireless device 2516. The second base station 2508 may send an information request to the second wireless device 2516, and/or may receive the sidelink capability information 2520 of the second wireless device. The first base station 2504 may receive, from the second base station 2508, the sidelink capability information 2520 of the second wireless device 2516 in a message 2532. The first base station 2504 may determine, based on the sidelink capability information 2520 of the second wireless device 2516, the configuration parameters 2528 for sidelink communication between the first wireless device 2512 and the second wireless device 2516. The first base station 2504 may send, to the first wireless device 2512, the configuration parameters 2528.

The first wireless device 2512 may establish the RRC connection (e.g., the PC5-RRC connection) with the second wireless device 2516. Sidelink communication between the first wireless device 2512 and the second wireless device 1516 may be direct sidelink communication. The first wireless device 2512 may send a direct communication request to the second wireless device 2516 for direct sidelink communication. The first wireless device 2512 may receive a direct communication response from the second wireless device 1516 based on (e.g., after or in response to) the direct communication request. The first wireless device 2512 may receive a direct communication request from the second wireless device 2516 for direct sidelink communication. The first wireless device 2512 may send a direct communication response to the second wireless device 2516 based on (e.g., after or in response to) the direct communication request. The first wireless device 2512 may send, to the second wireless device 2516, first sidelink capability information of the first wireless device 2512 for the direct sidelink communication. The first wireless device 2512 may receive, from the second wireless device 2516, second sidelink capability information of the second wireless device 2516 for the direct sidelink communication. The first wireless device 2512 may send, to the second wireless device 2516, one or more first RRC configuration parameters (e.g., PC5-RRC configuration parameters) to configure the RRC connection (e.g., the PC5-RRC connection) between the first wireless device 2512 and the second wireless device 2516 for the direct sidelink communication. The first wireless device 2512 may receive, from the second wireless device 2516, one or more second RRC configuration parameters (e.g., PC5-RRC configuration parameters) to configure the RRC connection (e.g., the PC5-RRC connection) for the direct sidelink communication.

The first wireless device 2512 may establish one or more sidelink radio bearers (e.g., one or more sidelink logical channels, one or more QoS flows, one or more sidelink PDU sessions, etc.) between the first wireless device 2512 and the second wireless device 2516. The one or more sidelink radio bearers may be based on the PC5-RRC connection between the first wireless device 2512 and the second wireless device 2516. The establishing the one or more sidelink radio bearers may comprise sending, by the first wireless device 2512 to the second wireless device 2516, an RRC bearer configuration request (e.g., a PC5-RRC bearer configuration request). The first wireless device 2512 may receive, from the second wireless device 2516, an RRC bearer configuration response (e.g., a PC5-RRC bearer configuration response) based on/in response to the RRC bearer configuration request. The RRC bearer configuration request may request the one or more sidelink radio bearers. The RRC bearer configuration request may comprise QoS parameters of the one or more sidelink radio bearers. The one or more first PC5-RRC configuration parameters may comprise parameters of the RRC bearer configuration request for the one or more sidelink radio bearers. The RRC bearer configuration response may indicate configuration of the one or more sidelink radio bearers. The one or more second PC5-RRC configuration parameters may comprise parameters of the RRC bearer configuration response for the one or more sidelink radio bearers.

The QoS parameters of the one or more sidelink radio bearers (e.g., the one or more sidelink logical channels, one or more QoS flows, etc.) may indicate a priority level of a sidelink bearer of the one or more sidelink radio bearers. The QoS parameters of the one or more sidelink radio bearers may comprise/indicate at least one of: a PC5 QoS flow indicator/identifier (PFI), a PC5 5G QoS indicator/identifier (5QI) (e.g. PQI and range), a V2X service type (e.g. public service indicator/identifier (PSID) or intelligent transport system application indicator/identifier (ITS-AID)), a QoS class indicator/identifier (QCI), a 5G QoS indicator (5QI) (e.g., dynamic and/or non-dynamic), a priority level, an allocation and retention priority (ARP): (e.g., indicating priority level, pre-emption capability, pre-emption vulnerability, etc.), a latency requirement (e.g., tolerable packet transmission latency/delay), a reliability requirement (e.g., maximum error rate), a session aggregate maximum bit rate (AMBR), a bearer type (e.g., PDU session type, QoS flow type, bearer type indicating at least one of: IP, non-IP, ethernet, IPv4, IPv6, IPv4v6, unstructured, etc.), a QoS flow indicator/identifier, a bearer indicator/identifier, QoS flow level QoS parameters, bearer level QoS parameters, an averaging window, a maximum data burst volume, a packet delay budget, a packet error rate, a delay critical indication (e.g., critical or non-critical), a maximum flow bit rate, a guaranteed flow bit rate, notification control (e.g., indicating notification requested to the first base station based on events), a maximum packet loss rate, and/or the like. One or more QoS flows and/or one or more sidelink radio bearers may be configured based on the QoS parameters (e.g., PC5 QoS rules), for example, as described herein with reference to FIG. 35.

The first wireless device 2512 may determine sidelink radio resources based on the mode 2 operation, or the first base station 2504 may assign (e.g., via a dynamic grant or a configured grant) sidelink radio resources for the sidelink communication based on the mode 1 operation. The establishing the one or more sidelink radio bearers (e.g., for mode 1 operation or for mode 2 operation) may comprise sending, by the first wireless device 2512, a sidelink bearer configuration request (e.g., via an uplink RRC message) to the first base station 2504. The first wireless device 2512 may receiving a sidelink bearer configuration response (e.g., via a downlink RRC message) from the first base station 2504, for example, based on sending the sidelink bearer configuration request. The first wireless device 2512 may send, to the first base station 2504, the sidelink bearer configuration request indicating the one or more sidelink radio bearers for establishment. The sidelink bearer configuration request may comprise the QoS parameters of the one or more sidelink radio bearers. The first wireless device 2512 may receive, from the first base station 2504 and based on/in response to the sidelink bearer configuration request, the sidelink bearer configuration response comprising configuration parameters for the one or more sidelink radio bearers. The configuration parameters may comprise the QoS parameters of the one or more sidelink radio bearers. The first wireless device 2512 may configure the one or more sidelink radio bearers with the second wireless device 2516 based on the configuration parameters in the sidelink bearer configuration response from the first base station 2504. The first wireless device 2512 may send, to the second wireless device 2516, the RRC bearer configuration request (e.g., the PC5-RRC bearer configuration request) based on the configuration parameters in the sidelink bearer configuration response from the first base station 2504.

The second wireless device 2516 may determine the sidelink capability information 2520 (e.g., of the second wireless device 2516). The second wireless device 2516 may determine the sidelink capability information 2520 based on a base station (e.g., the second base station 2508) or a cell (e.g. a cell that serves the second wireless device 2516 and/or that the second wireless device 2516 camps on). The second wireless device 2516 may determine the sidelink capability information 2520 based on pre-configured parameters.

The sidelink capability information 2520 may indicate at least one of: a cell indicator/identifier of a serving cell of the second wireless device, a base station indicator/identifier of a serving base station (e.g., the second base station 2508) of the second wireless device 2516, a resource pool that the second wireless device 2516 uses, a zone of the second wireless device 2516, a synchronization reference source that the second wireless device 2516 uses for sidelink communication, the synchronization reference source (e.g., comprising at least one of: a base station, a GNSS (e.g., GPS, GLONASS, Galileo, Beidou, and/or the like) etc.), priority information of synchronization reference sources at the serving cell of the second wireless device 2516, and/or the like. The sidelink capability information 2520 of the second wireless device 2516 may indicate at least one of: whether the second wireless device 2516 supports a sidelink multiple carrier operation (e.g., sidelink carrier aggregation, sidelink multiple carriers, sidelink multi-carrier), a supported/operating sidelink (RAT (e.g., LTE, 5G, etc.), an available band (e.g., based on bands currently being used and/or supported band combinations), whether the second wireless device 2516 supports an unlicensed band (e.g., unlicensed spectrum), a supported MCS (e.g., 64 QAM, 256 QAM, 1024 QAM, etc.), a synchronization reference source (e.g., a base station, a satellite, GNSS, etc.), and/or the like. The sidelink capability information 2520 of the second wireless device 2516 may indicate at least one of: a supported band combination (e.g., supported band grouping for simultaneous use, and/or information corresponding to bands being currently used), a list of supported bands, a measurement capability (e.g., whether the second wireless device 2516 supports CBR measurement, sl-Congestion-Control, etc.), a sidelink MIMO capability (e.g., the number of supported MIMO layers for spatial multiplexing in sidelink reception/transmission, beamforming), a sidelink MIMO capability per band (e.g., provided by higher layer parameter MIMO-ParametersPerBand), a supported numerology/TTI, a supported sidelink slot format, a maximum number of transport block bits in one TTI (e.g., if 16 QAM reception is supported), a device type (e.g., whether the wireless device 2516 needs battery consumption optimization), a wireless device category, whether the wireless device 2516 supports aperiodic CSI reporting, a supported bandwidth class (e.g., a number of aggregated resource blocks within a fully allocated aggregated channel bandwidth, a number of contiguous component carrier, whether the wireless device 2516 supports multiple carriers), and/or the like.

The sidelink capability information 2520 of the second wireless device 2516 may indicate whether or not the second wireless device 2516 supports one or more of: multiple beam operation (e.g., beam switching, beam failure recovery procedure, beam correspondence, etc.); sidelink multiple BWPs; sidelink multiple active BWPs; multiple panels; one or more frequency ranges (e.g., frequency range 2 (FR2) and/or frequency range 3 (FR3)); an extended cyclic prefix (e.g., whether to use an extended cyclic prefix or a normal cyclic prefix where a normal cyclic prefix may be supported for all subcarrier spacings and slot formats and/or an extended cyclic prefix may be supported for one or more specified subcarrier spacings (e.g., a 60 kHz subcarrier spacing)); simultaneous operation of mode 1 and mode 2 resource selection; simultaneously transmission/reception on sidelink BWP and uplink BWP; sidelink PDCP packet duplication; periodic CSI reporting; a V2X (enhanced) high reception (e.g., as indicated by higher layer parameters v2x-EnhancedHighReception and/or v2x-HighReception, indicating whether the second wireless device 2516 supports reception of 20/30 PSCCH in a subframe and decoding of 136/204 resource blocks (RBs) per subframe counting both PSCCH and PSSCH in a band for sidelink communication); transmission and/or reception in a configuration of non-adjacent PSCCH and PSSCH for V2X sidelink communication (e.g., as indicated by higher layer parameter v2x-nonAdjacentPSCCH-PSSCH); a combination of RLC UM and RLC AM bearers (e.g., as indicated by higher layer parameter flexibleUM-AM-Combinations); reporting of flight path plan information (e.g., as indicated by higher layer parameter flightPathPlan); full duplex operation (e.g., as indicated by higher layer parameter halfDuplex); measurement events H1/H2 (e.g., height based measurement events; as indicated by higher layer parameter heightMeas); an in-device coexistence indication and/or autonomous denial functionality (e.g., as indicated by higher layer parameter inDeviceCoexInd); PDSCH collision handling (e.g., as indicated by higher layer parameter pdsch-CollisionHandling); rate matching and TBS scalling for sidelink communication (e.g., as indicated by higher layer parameter sl-RateMatchingTBSScaling); the sidelink synchronization signal (SLSS) transmission on single carrier or on multiple carriers in the case of sidelink carrier aggregation (e.g., as indicated by higher layer parameter slss-SupportedTxFreq); SLSS/PSBCH transmission and reception in wireless device autonomous resource selection mode (e.g., mode 2 operation) and/or base station scheduled mode (e.g., mode 1 operation) in a band for sidelink communication (e.g., as indicated by higher layer parameter slss-TxRx); transmit diversity for sidelink communication (e.g., as indicated by higher layer parameter sl-TxDiversity); TDD special subframes (e.g., as indicated by higher layer parameter tdd-SpecialSubframe; or as indicated by higher layer parameter tdd-SpecialSubframe-r11 if the wireless device supports TDD special subframes ssp7 and ssp9; or as indicated by higher layer parameter tdd-SpecialSubframe-r14 if supporting the TDD special subframe ssp10; etc.); TDD special subframe configuration 10 and/or TTI bundling for TDD configuration 2 and 3 if PUSCH transmissions in uplink pilot time slot (UpPTS) are configured (e.g., as indicated by higher layer parameter tdd-TTI-Bundling); PSCCH transmissions and/or PSSCH transmissions using wireless device autonomous resource selection mode (e.g., mode 2 operation) with full sensing (e.g., continuous channel monitoring) for sidelink communication and/or maximum transmit power associated with power class 3 wireless device (e.g., as indicated by higher layer parameter ue-AutonomousWith-FullSensing); PSCCH transmissions and/or PSSCH transmissions using wireless device autonomous resource selection mode (e.g., mode 2 operation) with partial sensing (e.g., channel monitoring in a limited set of subframes) for sidelink communication and/or supporting maximum transmit power associated with power class 3 wireless device (e.g., as indicated by higher layer parameter ue-AutonomousWith-PartialSensing); blind decoding adjustment on a specific search space (e.g., as indicated by higher layer parameter uss-BlindDecodingAdjustment); blind decoding reduction on a specific search space by not monitoring DCI format 0A/0B/4A/4B (e.g., as indicated by higher layer parameter uss-BlindDecodingReduction); and/or frequency hopping (e.g., as indicated by higher layer parameter unicastFrequencyHopping) for unicast machine-type communication (MTC) PDCCH (MPDCCH) transmissions and/or PDSCH transmissions (e.g., as configured by higher layer parameter mpdcch-pdsch-HoppingConfig), and/or unicast PUSCH transmissions (e.g., as configured by pusch-HoppingConfig).

The sidelink capability information 2520 of the second wireless device 2516 may indicate a supported bandwidth (e.g., maximum channel bandwidth supported by the second wireless device 2516 on one carrier of a band of a band combination). The sidelink capability information 2520 of the second wireless device 2516 may indicate a number of multiple reference TX/RX timings counted over configured sidelink carriers for sidelink communication (e.g., as provided by higher layer parameter v2x-numberTxRxTiming).

The second wireless device 2516 may support one or more band combinations and/or one or more carrier aggregation (CA) combinations. An aggregated transmission bandwidth configuration (ATBC) may indicate a total number/quantity of aggregated physical resource blocks (PRB). A CA bandwidth class may indicate a combination of maximum ATBC and/or maximum number/quantity of carrier components (CCs). A first CA bandwidth class (e.g., class A) may indicate a first combination (e.g., ATBC≤100 and/or a maximum quantity of CC=1). A CA second bandwidth class (e.g., class B) may indicate a second combination (e.g., ATBC≤100 and/or a maximum quantity of CC=2). A third CA bandwidth class (e.g., class C) may indicate a third combination (e.g., 100<ATBC≤200 and/or a maximum quantity of CC=2). The sidelink capability information 2520 of the second wireless device 2516 may indicate one or more CA bandwidth classes supported by the second wireless device 2516.

The second wireless device 2516 may send, to the first wireless device 2512, at least one sidelink message comprising the sidelink capability information 2520 of the second wireless device 2516. The first wireless device 2512 may receive, from the second wireless device 2516, the at least one sidelink message. The at least one sidelink message may be associated with the PC5-RRC connection between the first wireless device 2512 and the second wireless device 2516. The at least one sidelink message may be at least one of: a PC5-RRC message (e.g., a PC5-RRC configuration message, a PC5-RRC wireless device information message, PC5-RRC wireless device capability message, etc.); a direct communication request message; a capability information message; and/or the like. The at least one sidelink message comprise at least one of: a wireless device indicator/identifier (e.g., IMSI, temporary mobile subscriber identity (TMSI), C-RNTI, V2X node indicator/index, etc.) of the second wireless device 2516; a wireless device indicator/identifier (e.g., IMSI, TMSI, C-RNTI, V2X node indicator/index, etc.) of the first wireless device 2512; a destination indicator/identifier (e.g., destination layer-2 identifier, IP address, wireless device identifier, etc.) indicating the first wireless device 2512; and/or the like.

The first wireless device 2512 may receive, from the third wireless device, second sidelink capability information of the third wireless device. The second sidelink capability information of the third wireless device may indicate at least one of: whether the third wireless device supports a sidelink multiple carrier operation; a second supported/operating sidelink RAT; a second available band; whether the third wireless device supports an unlicensed band; a second supported MCS; a second synchronization reference source (e.g., base station, satellite, GNSS, etc.); and/or the like. The first wireless device 2512, the second wireless device 2516, and/or the third wireless device may belong/correspond to the sidelink multicast group. The first wireless device 2512 may multicast/broadcast data (e.g., transport blocks) to the second wireless device 2516 and/or the third wireless device. The first wireless device 2512 may multicast/broadcast transport blocks to the second wireless device 2516 and/or the third wireless device via radio resources and/or transmission schemes determined based on the sidelink capability information 2520 of the second wireless device 2516 and/or the second sidelink capability information of the third wireless device (e.g., based on the radio resources and/or the transmission schemes that are supported by the second wireless device 2516 and/or the third wireless device).

The sidelink capability information 2520 of the second wireless device 2516 may be based on an information request from the first wireless device 2512 (e.g., in response to the information request from the first wireless device 2512). The second wireless device 2516 may send, to the first wireless device 2512, the sidelink capability information 2520 based on an information request from the first base station 2504 (e.g., in response to the information request from the first base station 2504). The first wireless device 2512 may send, to the second wireless device 2516, a sidelink information request message for the sidelink capability information 2520. The sidelink information request message may indicate request for the sidelink capability information 2520. The at least one sidelink message (from the second wireless device 2516) comprising the sidelink capability information 2520 may be based on/in response to the sidelink information request message. The sidelink information request message may be associated with the PC5-RRC connection. The sidelink information request message may be at least one of: a PC5-RRC message (e.g., a PC5-RRC configuration message, a PC5-RRC wireless device information message, a PC5-RRC wireless device capability message, etc.); a direct communication request message; a capability information message; and/or the like. The first wireless device 2512 may send, to the second wireless device 2516, the sidelink information request message, for example, based on a request from the first base station 2504. The sidelink information request message may comprise at least one of: a wireless device indicator/identifier (e.g., IMSI, TMSI, C-RNTI, V2X node index, etc.) of the second wireless device 2516; a wireless device indicator/identifier (e.g., IMSI, TMSI, C-RNTI, V2X node index, etc.) of the first wireless device 2512; a destination indicator/identifier (e.g., destination layer 2 identifier, IP address, wireless device identifier, etc.) indicating the second wireless device 2516; a bearer indicator/identifier of a sidelink bearer associated with the second wireless device 2516; a logical channel indicator/identifier of a sidelink logical channel associated with the second wireless device 2516; a QoS flow indicator/identifier of a sidelink QoS flow (e.g., sidelink session, sidelink PDU session, etc.) associated with the second wireless device 2516; and/or the like (e.g., for identification of the second wireless device 2516 and/or the destination wireless device).

The first wireless device 2512 may send the sidelink information request message to the second wireless device 2516, for example, based on an information request from the first base station 2504 (e.g., in response to the information request from the first base station 2504). The first wireless device 2512 may receive, from the first base station 2504, an RRC information request message for the sidelink capability information of the second wireless device 2516. The first wireless device 2512 may send, to the first base station 2504, the sidelink capability information 2520 of the second wireless device 2516 (e.g., via at least one uplink RRC message, uplink message 2524), for example, based on the RRC information request message received from the first base station 2504. The RRC information request message may be at least one of: a wireless device information request message, a wireless device assistance information request message, an RRC reconfiguration message, an RRC reestablishment message, an RRC setup message, an RRC resume message, and/or the like.

The RRC information request message may comprise at least one of: a wireless device indicator/identifier (e.g., IMSI, TMSI, C-RNTI, V2X node index, etc.) of the second wireless device 2516 (e.g., a target wireless device for which the first wireless device 2512 needs to send sidelink capability information to the first base station 2504); a destination indicator/identifier (e.g., destination layer-2 identifier, IP address, wireless device identifier, etc.) indicating the second wireless device 2516; a bearer indicator/identifier of a sidelink bearer associated with the second wireless device; a logical channel indicator/identifier of a sidelink logical channel associated with the second wireless device 2516; a QoS flow indicator/identifier (e.g., session identifier, PDU session identifier, etc.) of a sidelink QoS flow (e.g., sidelink session, sidelink PDU session, etc.) associated with the second wireless device 2516; and/or the like. The first wireless device 2512 may use the indicators/identifiers of packet flows (e.g., the sidelink bearer, the sidelink logical channel, and/or the sidelink QoS flow associated with the second wireless device 2516) to determine/identify a target wireless device (e.g., the second wireless device 2516 and/or the third wireless device) for which the first wireless device 2512 needs to send, to the first base station 2504, the sidelink capability information. The indicators/identifiers of the packet flows may be unique among multiple receiver wireless devices (e.g., the second wireless device 2516, the third wireless device, etc.) of the first wireless device 2504.

The first base station 2504 may send, to the first wireless device 2512, the RRC information request message for the sidelink capability information 2520 of the second wireless device 2516, for example, based on network information of the second wireless device 2516. The first base station 2504 may send the RRC information request message to the first wireless device 2512, based on the network information of the second wireless device 2516, for example, if: the second wireless device 2516 is not served by the first base station 2504; the second wireless device 2516 is an out-of-coverage wireless device or in RRC idle/inactive state; and/or the like. The first base station 2504 may request the first wireless device 2512 to send (e.g., provide) the sidelink capability information 2520 of the second wireless device 2516, for example, based on whether or not the second wireless device 2516 is served by the first base station 2504. The first base station 2504 may request the first wireless device 2512 to send (e.g., provide) the sidelink capability information 2520 of the second wireless device 2516, for example, if the second wireless device 2516 is not served by the first base station 2504. The first base station 2504 may request the second wireless device 2512 to send (e.g., provide) the sidelink capability information 2520 of the second wireless device 2516, for example, if the second wireless device 2516 is served by the first base station 2504.

The first wireless device 2512 may receive, from the second wireless device 2512, the network information of the second wireless device 2512. The second wireless device 2516 may send, to the first wireless device 2512, the network information via at least one of: a PC5-RRC message (e.g., a PC5-RRC configuration message, a PC5-RRC wireless device information message, PC5-RRC wireless device capability message, etc.); a direct communication message; a capability information message; and/or the like. The first wireless device 2516 may send, to the first base station 2504, the network information of the second wireless device 2516 via at least one of: an uplink RRC message, a wireless device assistance information message, a wireless device information message, an RRC reestablishment complete message, an RRC reconfiguration complete message, an RRC resume complete message, an RRC setup complete message, and/or the like.

The first wireless device 2512 may send, to the second wireless device 2516, the sidelink information request message for the sidelink capability information 2520, for example, based on the network information of the second wireless device 2516. The first wireless device 2512 may send the sidelink information request message to the second wireless device 2516, based on the network information of the second wireless device 2516, for example, if: the second wireless device 2516 is not served by the first base station 2504; the second wireless device 2516 is an out-of-coverage wireless device or in an RRC idle/inactive state; and/or the like. The first wireless device 2512 may request the sidelink capability information 2520 of the second wireless device 2516, for example, based on whether or not the second wireless device 2516 is served by the first base station 2504. The first wireless device 2512 may request the sidelink capability information 2520 of the second wireless device 2516, for example, if the second wireless device 2516 is not served by the first base station 2504. The first wireless device 2512 may request the sidelink capability information 2520 of the second wireless device 2516, for example, if the second wireless device 2516 is served by the first base station 2504.

The network information may comprise at least one of: a cell indicator/identifier (e.g., physical cell identifier, PCI, global cell identifier, GCI, CGI, carrier index, etc.) of a serving cell (e.g., a camp-on cell) of the second wireless device 2516; a base station indicator/identifier (e.g., gNB identifier, eNB identifier, gNB-DU identifier, gNB-CU identifier, etc.) of a serving base station (e.g., the second base station 2508) of the second wireless device 2516; a resource pool indicator/index of a resource pool (e.g., for sidelink, V2X, device-to-device communication, etc.) used by the second wireless device 2516; a zone indicator/identifier of a zone (e.g., a physical location) in which the second wireless device 2516 is located; a band indicator/index of a serving band used by the second wireless device 2516; an RRC state (e.g., RRC idle state, RRC inactive state, RRC connected state, etc.) of the second wireless device 2516 (e.g., if the second wireless device 2516 is in an RRC connected state, the first base station 2504 may request the sidelink capability information 2520 from a serving base station of the second wireless device 2516); a synchronization reference source (e.g., at least one of: a base station; or a GNSS, such as GPS, GLONASS, Galileo, Beidou, etc.) used by the second wireless device 2516 for sidelink communication; priority information of synchronization reference sources at the serving cell (e.g., camp-on cell) of the second wireless device 2516 (e.g., among the second base station 2508, the GNSS, etc.); and/or the like. The first base station 2504 may determine, based on the network information, whether to request the sidelink capability information of the second wireless device 2516 from the second wireless device 2516, from the first wireless device (e.g., as shown with reference to FIG. 32), and/or from the second base station 2508 (e.g., as shown with reference to FIG. 33).

The first wireless device 2512 may determine/select sidelink radio resources and/or transmission schemes for transmission to the second wireless device 2516 based on the sidelink capability information 2520. The first wireless device 2512 (e.g., using mode 1 operation where resource assignment is based on configured grant resources, SPS resources, and/or dynamic grant) may send the sidelink capability information 2520 to the first base station 2504. The first wireless device 2512 may receive, from the first base station 2504, configuration parameters of sidelink radio resources (e.g., configured grant resource assignment, SPS resources, dynamic grant, etc.) and/or transmission schemes (e.g., comprising HARQ feedback configured for the second wireless device 2516), for example, based on the sidelink capability information 2520. The first wireless device 2512 (e.g., using mode 2 operation; or mode 1 operation with configured grant resources) may determine, based on the sidelink capability information 2520, transmission schemes and/or sidelink radio resources from a resource pool (e.g., for mode 2 operation) that configured by the network or are preconfigured.

The first wireless device 2512 may send, to the first base station 2504, at least one uplink message 2524 (e.g., uplink RRC message) comprising the sidelink capability information 2520 of the second wireless device 2516. The at least one uplink RRC message may comprise the second sidelink capability information of the third wireless device. The first wireless device 2512 may send the at least one uplink message 2524 to the first base station 2504 based on the first wireless device 2512 receiving, from the first base station 2504, the RRC information request message for the sidelink capability information 2520 of the second wireless device 2512. The first wireless device 2512 may send, to the first base station 2504, the at least one uplink message 2524 comprising the sidelink capability information 2520 of the second wireless device 2516, for example, based on/in response to the RRC information request message. The at least one uplink RRC message may be at least one of: an uplink RRC message, a wireless device assistance information message, a wireless device information message, an RRC reestablishment complete message, an RRC reconfiguration complete message, an RRC resume complete message, an RRC setup complete message, and/or the like.

The sidelink capability information 2520 of the second wireless device 2512 may correspond to a capability that is same as or different from a capability of the first wireless device 2512. The first wireless device 2512 may forward/indicate, to the first base station 2504, a capability of the second wireless device 2516 in the at least one uplink message 2524, for example, if the capability of the second wireless device 2516 is different from a capability of the first wireless device 2512 (e.g., if the second wireless device 2516 is associated with less capable features than the first wireless device 2512). The first wireless device 2512 may not forward/indicate, to the first base station 2504, a capability of the second wireless device 2516 in the at least one uplink message 2524, for example, if the capability of the second wireless device 2516 is the same as or higher than a capability of the first wireless device 2512.

Figure 33:
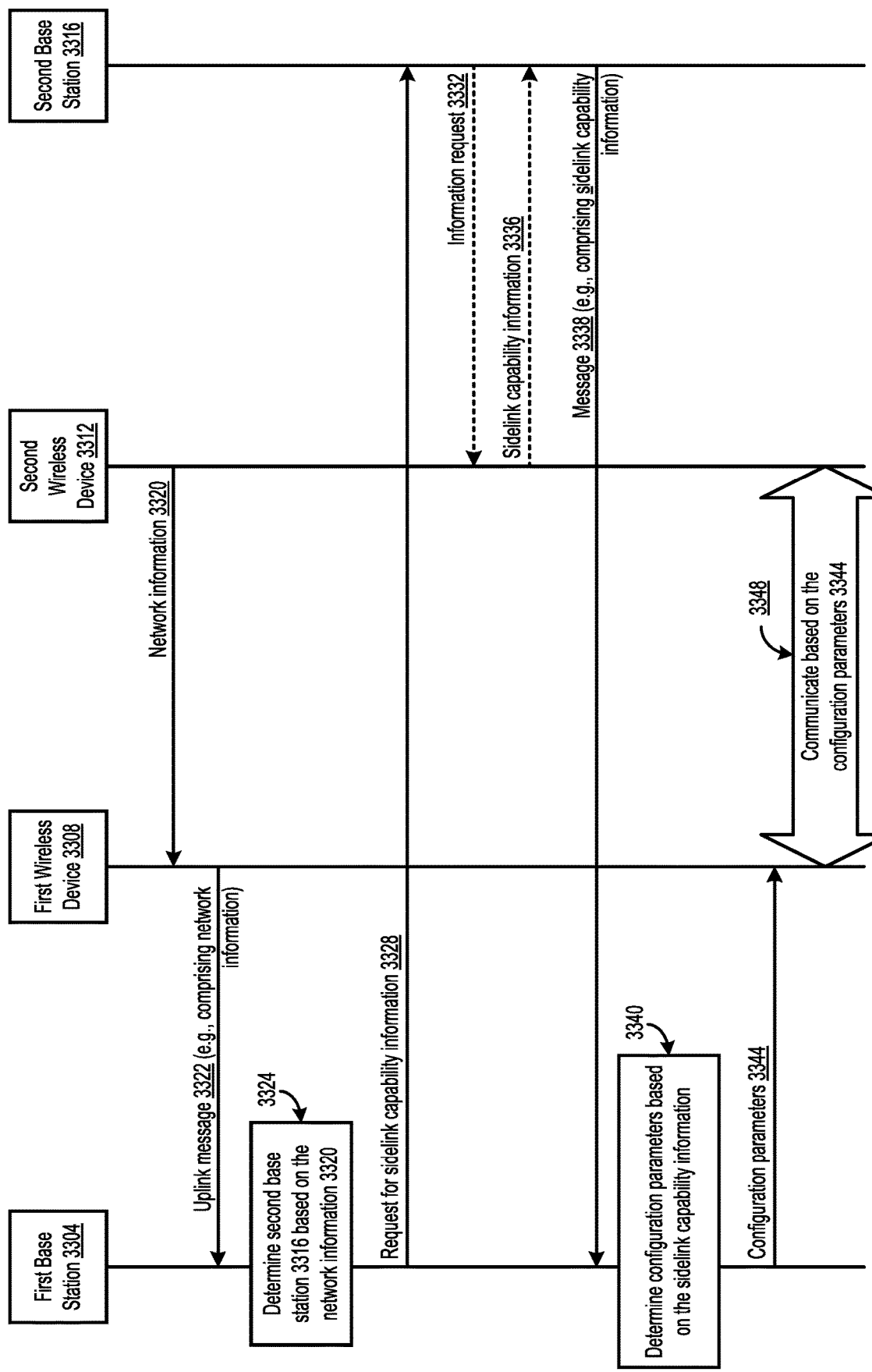
FIG. 33 shows an example procedure for sidelink communications between two wireless devices.
Figure 37:
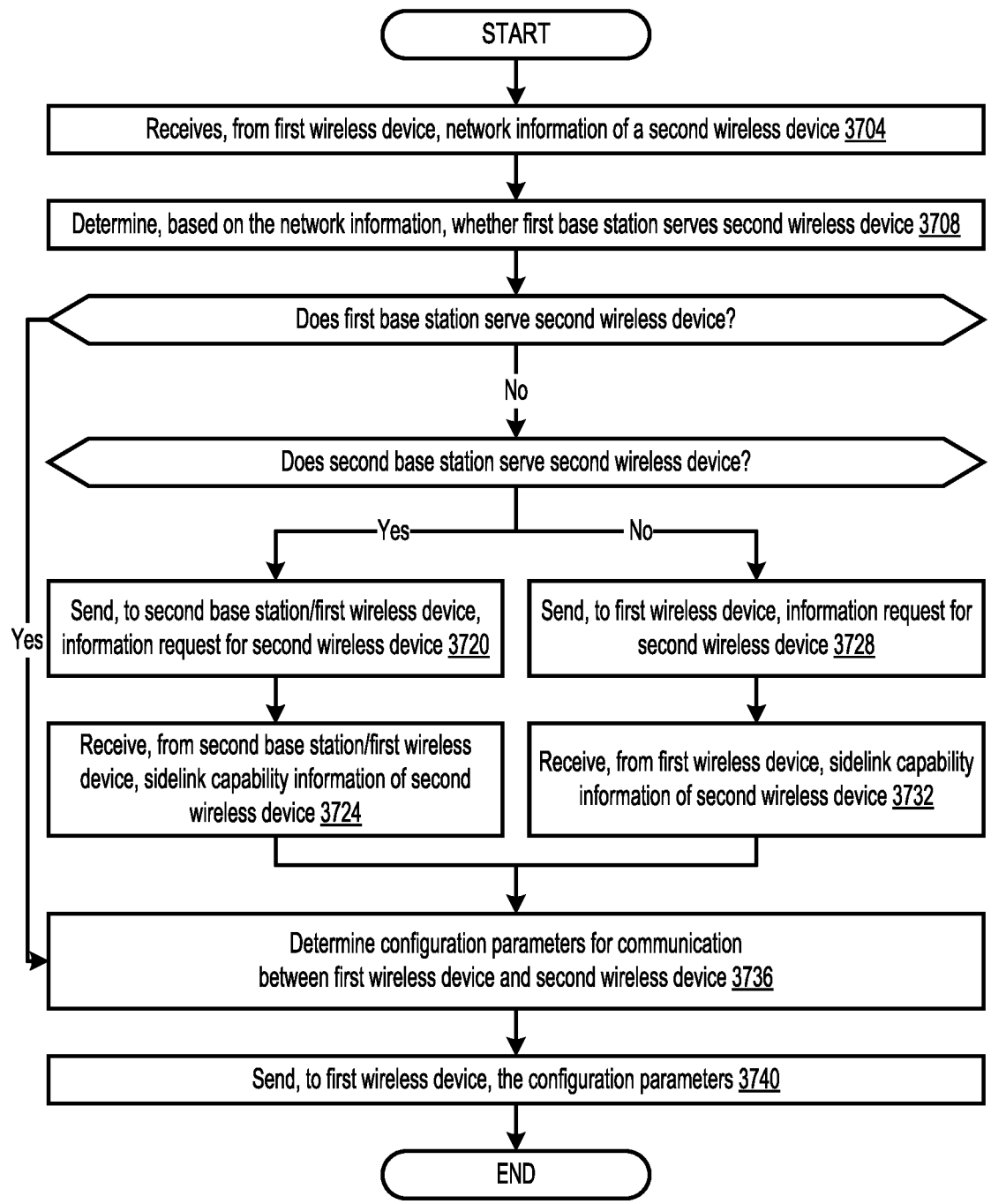
FIG. 37 shows an example method for determining configuration parameters at a base station for sidelink communications between two wireless devices.

The first base station 2504 may determine whether the second wireless device 2516 is served by the first base station 2504 based on the network information (e.g., based on at least one of: the cell indicator/identifier of the serving cell of the second wireless device 2516, the base station indicator/identifier of the serving base station of the second wireless device 2516, the band indicator/index of the serving band of the second wireless device 2516, the resource pool indicator/index of the resource pool of the second wireless device 2516, the RRC state of the second wireless device 2516, the zone of the second wireless device 2516, and/or the like as indicated by the network information). The first base station 2504 may determine/identify, based on the network information, the serving base station (e.g., the second base station 2508) of the second wireless device 2516, for example, if the first base station 2504 determines that the second wireless device 2516 is not served by the first base station 2504. The serving base station (e.g., the second base station 2508) may serve the second wireless device 2516. The second wireless device 2516 (e.g., in an RRC idle/inactive state) may camp on a cell of the serving base station (e.g., the second base station 2508). The first base station 2504 may send, to the second base station 2508 (e.g., via a direct interface and/or an indirect interface), a request for sidelink capability information of the second wireless device 2516 (e.g., as shown in FIGS. 33 and 37). The first base station 2504 may send, to the second base station 2508, a request for sidelink capability information of the second wireless device 2516, for example, based on determining that the second wireless device 2516 is not served by the first base station 2504. The first base station 2504 may receive, from the second base station 2508 (e.g., via the direct interface and/or the indirect interface), a message 2532 comprising the sidelink capability information 2520. The message 2532 received from the second base station 2508 may comprise similar or substantially similar elements as described with reference to the sidelink capability information 2520 that the first wireless device 2512 receives from the second wireless device 2516 and sends to the first base station 2504. The message 2532 received from the second base station 2508 may comprise the elements described as elements/parameters of the sidelink capability information 2520 sent by the second wireless device 2516.

The first base station 2504 may determine configuration parameters 2528 for sidelink communication between the first wireless device 2512 and the second wireless device 2516, for example, based on sidelink capability information 2520 of the second wireless device 2516 (e.g., as received from the second wireless device 2516, the first wireless device 2512, and/or the second base station 2508). The first wireless device may send/transmit data/signals/transport blocks (e.g., control signal, sidelink control information, SCI, PSCCH transmissions, PSSCH transmission, etc.) to the second wireless device 2516, for example based on the configuration parameters 2528 received from the first base station 2504.

The configuration parameters 2528 may indicate at least one of: PHY configuration parameters, MAC configuration parameters, RLC configuration parameters, PDCP configuration parameters, SDAP configuration parameters, resource configuration parameters, transmission scheme parameters (e.g., MIMO, frequency hopping, PDCP duplication, MCS level, etc.), a HARQ feedback scheme, a reception scheme (e.g., blind decoding, MCS level, etc.), etc.

The configuration parameters 2528 may indicate/assign/configure first sidelink radio resources of an of a first carrier and second sidelink radio resources of a second carrier for sidelink communication between the first wireless device 2512 and the second wireless device 2516. The first base station 2504 may determine the configuration parameters 2528 indicating/assigning/configuring the first sidelink radio resources of the first carrier and the second sidelink radio resources of the second carrier for sidelink communication between the first wireless device 2512 and the second wireless device 2516, for example, if an indication (e.g., in the sidelink capability information 2520) indicates support for sidelink multiple carriers (e.g., multi-carrier operation, sidelink carrier aggregation, etc.). The sidelink capability information 2520 may comprise band combination information indicating one or more bands that are allowed to be simultaneously used for sidelink communication with the second wireless device 2516. The first base station 2512 may determine the first carrier and the second carrier based on the band combination information in the sidelink capability information 2520. The first wireless device 2512 may send/transmit, to the second wireless device 2516 first data (e.g., first transport blocks and/or first signals) via first sidelink radio resources of the first carrier and second data (e.g., second transport blocks and/or second signals) via second sidelink radio resources of the second carrier, for example, based on the configuration parameters received from the first base station 2504.

The first base station 2504 may determine the configuration parameters 2528 that are compatible with a sidelink RAT of the second wireless device 2516, for example, based on an indication (e.g., in the sidelink capability information 2520) of the sidelink RAT (e.g., LTE, 5G, NR, 3G, WLAN, and/or any other access technology) of the second wireless device 2516. The first wireless device 2512 may send/transmit, to the second wireless device 2516, data (e.g., transport blocks and/or signals), for example, based on the configuration parameters 2528 received from the first base station 2504. The sidelink RAT may correspond to at least one of: LTE; NR (e.g., 5G); 3G; WLAN; and/or other access technology. The second wireless device 2516 may determine the sidelink RAT based on the serving base station (e.g., and/or camping-on base station; the second base station 2508) of the second wireless device 2516. The serving base station may indicate the sidelink RAT to be used by the second wireless device 2516. The sidelink RAT may be a RAT of the serving base station.

The configuration parameters 2528 may indicate/assign/configure sidelink radio resources of at least one first band. The first base station 2504 may determine the configuration parameters 2528 indicating/assigning/configuring sidelink radio resources of the at least one first band, for example, based on an indication (e.g., in the sidelink capability information 2520) of the at least one first band that is available (e.g., at the second wireless device 2516) for sidelink communication between the first wireless device 2512 and the second wireless device 2516. The first wireless device 2512 may send/transmit, to the second wireless device 2516, data (e.g., transport blocks and/or signals) via sidelink radio resources of the at least one first band, for example, based on the configuration parameters 2528 received from the first base station 2504. The second wireless device 2516 may determine the at least one first band based on at least one second band that the second wireless device 2516 uses for communication with a third network node (e.g., the second base station 2508, a third wireless device, the first wireless device 2512, another network node, etc.). The second wireless device 2516 may be capable to simultaneously use the at least one first band (e.g., for sidelink communication) and the at least one second band (e.g., for sidelink communication and/or for communication via a Uu interface with a base station).

The configuration parameters 2528 may indicate/assign/configure sidelink radio resources of an unlicensed band. The first base station 2504 may determine the configuration parameters 2528 indicating/assigning/configuring sidelink radio resources of the unlicensed band, for example, based on an indication (e.g., in the sidelink capability information 2520) indicating support for the unlicensed bands (e.g., unlicensed spectrum/carrier). The first wireless device 2512 may transmit, to the second wireless device 2516, data (e.g., transport blocks and/or signals) via the sidelink radio resources of the unlicensed band, for example, based on the configuration parameters 2528 received from the first base station. The sidelink capability information 2520 may indicate whether the second wireless device 2516 supports at least one of: a subframe/slot structure for unlicensed spectrum; listen-before-talk operation; and/or the like. The configuration parameters 2528 may indicate at least one of: configurations of subframe/slot structures for unlicensed spectrum; configurations for listen-before-talk operation; and/or the like.

The configuration parameters 2528 may indicate/assign/configure sidelink radio resources that are configured to use at least one MCS level. The first base station 2504 may determine the configuration parameters 2528 indicating/assigning/configuring sidelink radio resources that are configured to use the at least one MCS level, for example, based on an indication (e.g., in the sidelink capability information 2520) of the at least one MCS level supported by the second wireless device 2512. The first wireless device 2512 may send/transmit, to the second wireless device 2516, data (e.g., transport blocks and/or signals) via the sidelink radio resources based on the at least one MCS level and based on receiving the configuration parameters 2528. The at least one MCS level may comprise at least one of: QPSK; 16 QAM; 64 QAM; 256 QAM; 1024 QAM; and/or the like.

The configuration parameters 2528 may indicate/assign/configure sidelink radio resources. The first base station 2504 may determine the configuration parameters 2528 indicating/assigning/configuring sidelink radio resources, for example, based on an indication (e.g., in the sidelink capability information 2520) of a synchronization reference source of the second wireless device 2516. The configuration parameters 2528 may indicate the sidelink radio resources determined based on the synchronization reference source. The configuration parameters 2528 may indicate the sidelink radio resources with time-shifted resource indication values that may correspond to a synchronization timing difference between a synchronization reference of the synchronization reference source of the second wireless device 2516 and a synchronization reference of the first base station 2504 and/or the first wireless device 2512. The configuration parameters 2528 of the sidelink radio resources may indicate (e.g., via resource configuration parameters) the synchronization timing difference between the synchronization reference of the synchronization reference source of the second wireless device 2516 and the synchronization reference of the first base station 2504 and/or the first wireless device 2512. The first wireless device 2512 may transmit/receive, to/from the second wireless device 2516, transport blocks and/or signals via the sidelink radio resources (e.g., determined based on the synchronization reference source). The first wireless device 2512 may indicate, to the second wireless device 2516, radio resources for transmissions from the second wireless device 2516 to the first wireless device 2512 (e.g., a HARQ feedback message) based on the configuration parameters 2528. The synchronization reference source may comprise at least one of: a base station; a satellite; a GNSS (e.g., GPS, GLONASS, Galileo, Beidou, etc.); and/or the like. The sidelink capability information 2520 may comprise a priority of synchronization reference sources of the second wireless device 2516.

The configuration parameters 2528 may indicate sidelink measurement configuration for the second wireless device 2516. The first base station 2512 may determine configuration parameters 2528 indicating sidelink measurement configuration for the second wireless device 2516, for example, based on a measurement capability of the second wireless device 2516. The measurement capability may correspond to whether the second wireless device 2516 supports CBR measurement and/or other capabilitites indicated by one or more higher layer parameters (e.g., sl-CongestionControl). The sidelink measurement configuration may indicate at least one of: CBR measurement events, RSSI measurement timing configuration (RMTC), measurement target resource pool, and/or the like.

The configuration parameters 2528 may indicate sidelink CSI report configurations for the second wireless device 2516. The first base station 2512 may determine configuration parameters 2528 indicating sidelink CSI report configurations for the second wireless device 2516, for example, based on whether the second wireless device 2516 supports aperiodic/periodic CSI reporting. The sidelink CSI report configurations may indicate at least one of: CSI-RS transmission configuration of the first wireless device 2512, aperiodic CSI reporting configuration (e.g., SCI configuration for CSI report command), periodic CSI reporting configuration (e.g., periodicity, timing offset, etc.), and/or the like.

The configuration parameters 2528 may indicate sidelink radio resources configured with a supported numerology/TTI of the second wireless device 2516. The first base station 2512 may determine configuration parameters 2528 indicating sidelink radio resources configured with the supported numerology/TTI, for example, based on the supported numerology/TTI of the second wireless device 2516. The configuration parameters 2528 may indicate slot size, frequency parameters, and/or the like that are compatible with supported numerology/TTI of the second wireless device 2516.

The configuration parameters 2528 may indicate sidelink radio resources that are in accordance with a supported slot format of the second wireless device 2516. The first base station 2512 may determine configuration parameters 2528 indicating sidelink radio resources that are in accordance with the supported sidelink slot format, for example, based on the supported sidelink slot format of the second wireless device 2516.

The first base station may determine the sidelink radio resources and/or the configuration parameters 2528 for the first wireless device 2512 based on the sidelink capability information 2520 of the second wireless device 2516 (e.g., and/or based on the second sidelink capability information of the third wireless device). The first base station 2504 may determine the sidelink radio resources and/or the configuration parameters 2528 for sidelink transmissions of the first wireless device 2512 to the second wireless device 2516, based on the sidelink capability information 2520 received from the first wireless device 2512 (e.g., from the second wireless device 2516 via the first wireless device 2512) and/or from the second base station 2508. The sidelink radio resource and/or the configuration parameters 2528, determined by the first base station 2504, may be used by the first wireless device 2512 to send/transmit transport blocks and/ or signals to the second wireless device 2516 (e.g., and/or to the third wireless device). The sidelink radio resources and/or the configuration parameters 2528 may be for transmission/reception of data (e.g., transport blocks and/or signals) from/at the first wireless device 2512 to/from the second wireless device 2516. The first base station 2504 may determine, (e.g., for transmission/reception from/at the first wireless device 2512 to/from the second wireless device 2516) based on the sidelink capability information 2520 of the second wireless device 2516, sidelink radio resources from a plurality of resource pools, a resource pool, radio resources for sidelink communication, and/or radio resources for uplink/downlink communication. The determining the sidelink radio resources and/or the configuration parameters 2528 may comprise determining at least one of: a transmission scheme, a power control scheme, a feedback configuration, an antenna configuration, band/carrier selection, carrier aggregation, PDCP packet duplication, a beam configuration, a BWP configuration, one or more resource segments in time/frequency domain; one or more resource pools (e.g., configured for V2X/device-to-device/sidelink communication, configured for mode 1 operation or mode 2 operation, etc.). A resource segment, of the one or more resource segments, may comprise a combination of at least one of a resource block, a time period, and/or a frequency. The time period may correspond to one or more slots, mini slots, symbols, subframes, or any other measure of a time duration/time occasion. The frequency may correspond to one or more of subcarriers, carriers, bandwidth parts, bandwidth segments, or any other measure of frequency. The sidelink radio resources determined by the first base station 2504 may comprise at least one of: the one or more resource segments in time/frequency domain and/or one or more resource pools (e.g., configured for V2X/device-to-device/ sidelink communication, configured for mode 1 operation or mode 2 operation, etc.).

The first base station 2504 may send, to the first wireless device 2512, the configuration parameters 2528 for sidelink communication between the first wireless device 2512 and the second wireless device 2516. The first wireless device 2512 may receive, from the first base station 2504, the configuration parameters 2528 for sidelink communication between the first wireless device 2512 and the second wireless device 2516. The first wireless device 2512 may receive the configuration parameters 2528 via at least one of: at least one RRC configuration message (e.g., RRC reconfiguration message, RRC setup message, RRC resume message, RRC reestablishment message, etc.); at least one MAC CE; at least one PDCCH transmission (e.g., DCI); and/or the like. The configuration parameters 2528 may be associated with at least one of: transmissions from the first wireless device 2512 to the second wireless device 2516; transmissions from a of the second wireless device 2516 (e.g., a HARQ feedback message) to the first wireless device 2512; and/or the like.

The first wireless device 2512 may send/transmit, to the second wireless device 2516 and based on the configuration parameters 2528, data (e.g., transport blocks, signals). The first wireless device 2512 may receive, from the second wireless device 2516, data (e.g., transport blocks, signals) based on the configuration parameters 2528. The first wireless device 2512 may send (e.g., transmit, multicast, and/or broadcast), to the second wireless device 2516 and/or the third wireless device, data (e.g., transport blocks, signals, such as PSSCH transmissions, PSCCH transmissions, etc.) via the sidelink radio resources and/or based on the configuration parameters 2528.

The second wireless device 2516 may receive the data (e.g., transport blocks and/or the signals) from the first wireless device 2512 based on the capabilities indicated in the sidelink capability information 2520 of the second wireless device 2516. The first base station 2504 may send, to a third base station, the capability information of the second wireless device 2516. The third base station may be at least one of: a target base station for a handover of the first wireless device 2512, a secondary base station of the first wireless device 2512, and/or the like.

Figure 26:
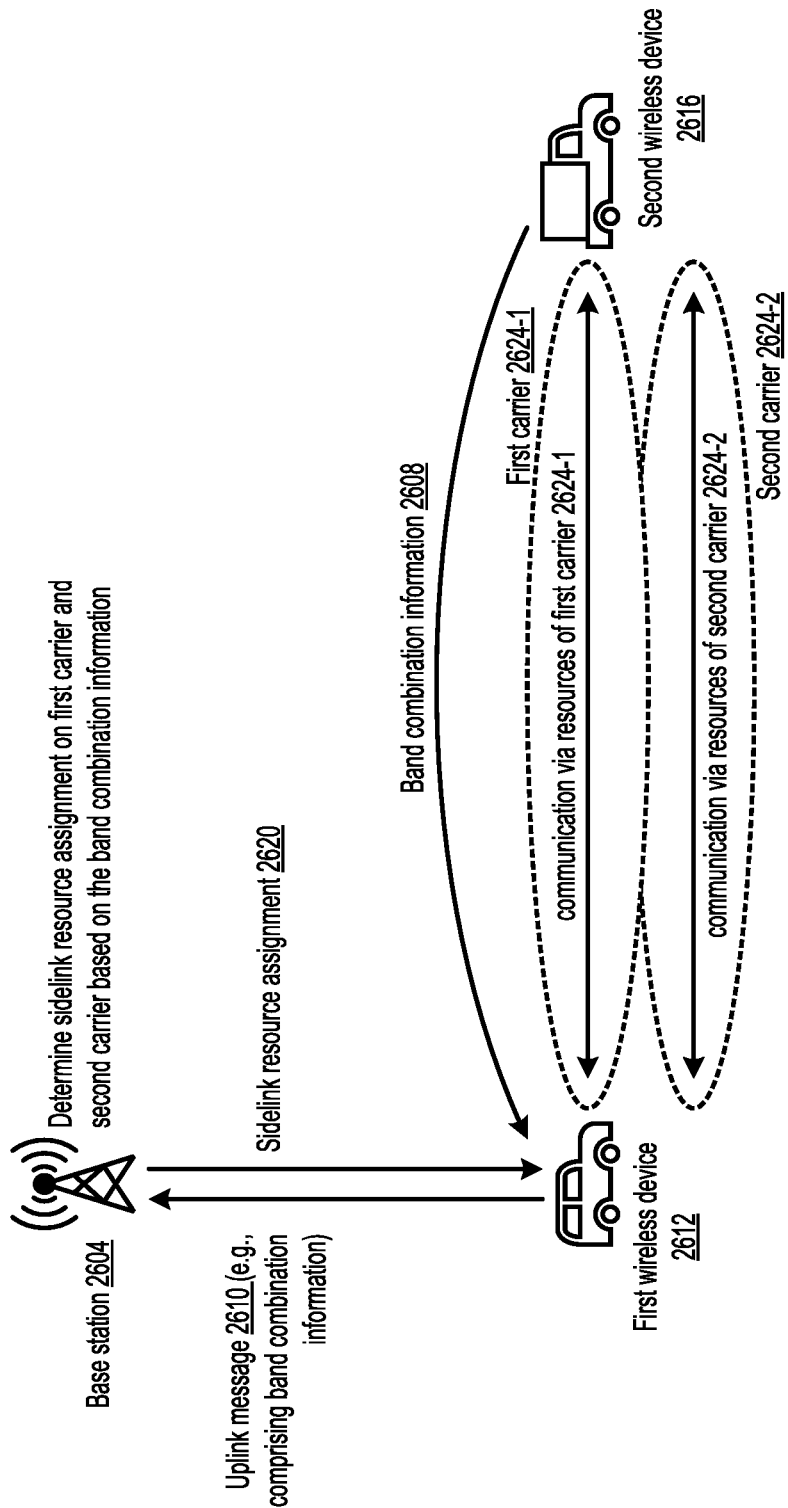
FIG. 26 shows example sidelink communications between two wireless devices via multiple carriers.

FIG. 26 shows example sidelink communications between two wireless devices via multiple carriers. A first wireless device 2612 may receive, from a second wireless device 2616, at least one sidelink message comprising sidelink capability information of the second wireless device 2616. The sidelink capability information may comprise band combination information 2608 indicating one or more bands that are allowed to be simultaneously used for sidelink communication at the second wireless device 2616. The band combination information 2608 may indicate whether the second wireless device 2616 supports multiple sidelink carriers (e.g., multi-carrier operation, sidelink carrier aggregation, etc.). The first wireless device 2612 may send, to a base station 2604, at least one uplink message 2610 (e.g., RRC message) comprising the sidelink capability information 2608 of the second wireless device. The base station 2604 may determine/assign resources for sidelink communication based on the band combination information 2608. The base station 2604 may determine/assign resources corresponding to multiple carriers, for example, if band combination information 2608 indicates that the second wireless device 2616 supports multiple sidelink carriers. The first wireless device 2612 may receive, from the base station 2604, configuration parameters for sidelink communication between the first wireless device 2612 and the second wireless device 2616. The configuration parameters may indicate a sidelink resource assignment 2620. The sidelink resource assignment 2620 may indicate first sidelink radio resources of a first carrier 2624-1 and second sidelink radio resources of a second carrier 2624-2. The first wireless device 2612 may send/transmit, to the second wireless device 2616, first transport blocks via the first sidelink radio resources of the first carrier 2624-1 and second transport blocks via the second sidelink radio resources of the second carrier 2624-2.

Figure 27:
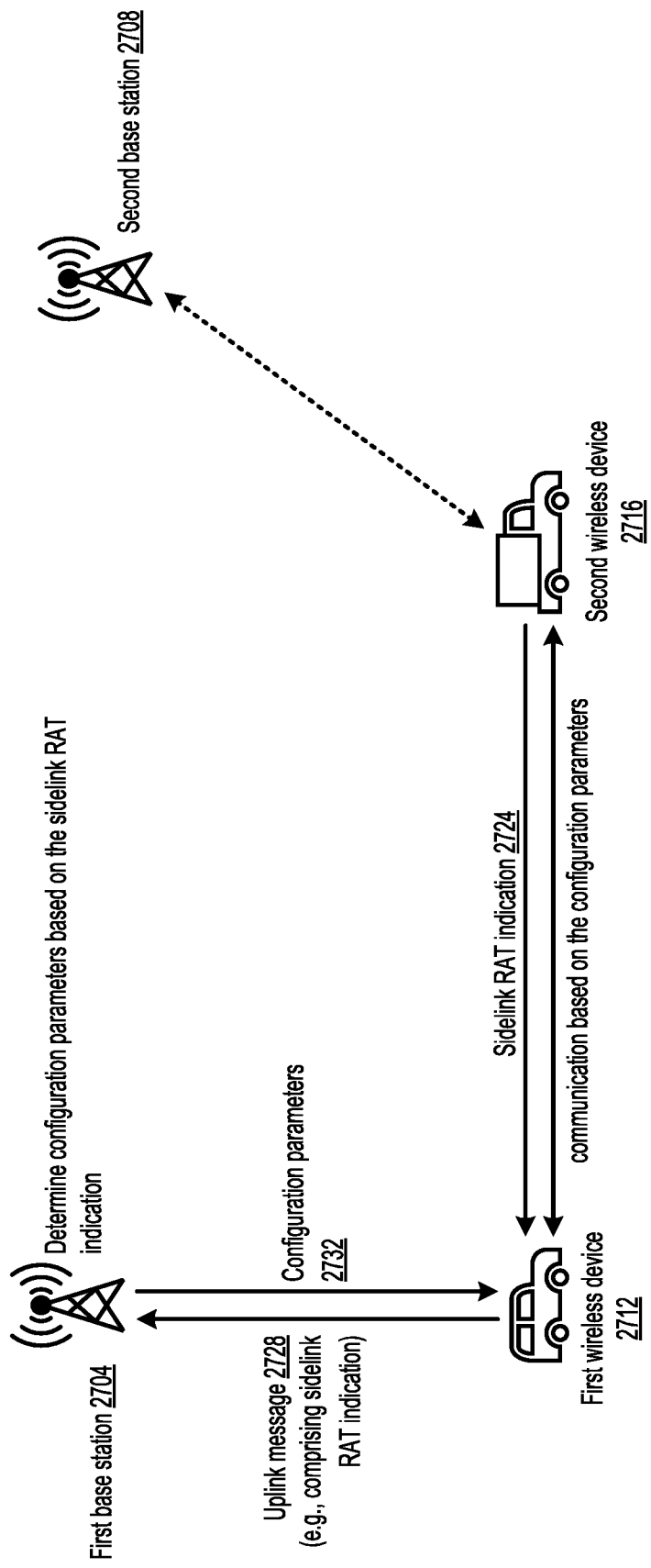
FIG. 27 shows example sidelink communications between two wireless devices.

FIG. 27 shows example sidelink communications between two wireless devices. A first wireless device 2712 may receive, from a second wireless device 2716, at least one sidelink message comprising sidelink capability information of the second wireless device 2716. The sidelink capability information may comprise a sidelink RAT indication 2724. The sidelink RAT indication 2724 may indicate a sidelink RAT of the second wireless device 2716. The sidelink RAT may correspond to at least one of: LTE, NR (e.g., 5G), 3G, WLAN, etc. The first wireless device 2712 may send, to a first base station 2704, at least one uplink message 2728 (e.g., uplink RRC message) comprising the sidelink capability information (e.g., the sidelink RAT indication 2724) of the second wireless device 2716. The first wireless device 2712 may receive, from the first base station 2704, configuration parameters 2732 for sidelink communication between the first wireless device 2712 and the second wireless device 2716. The base station 2704 may determine the configuration parameters 2732 that may be compatible with the sidelink RAT of the second wireless device 2716. The first wireless device 2712 may send/ transmit, to the second wireless device 2716, data (e.g., signals, transport blocks) based on the configuration parameters.

Figure 28:
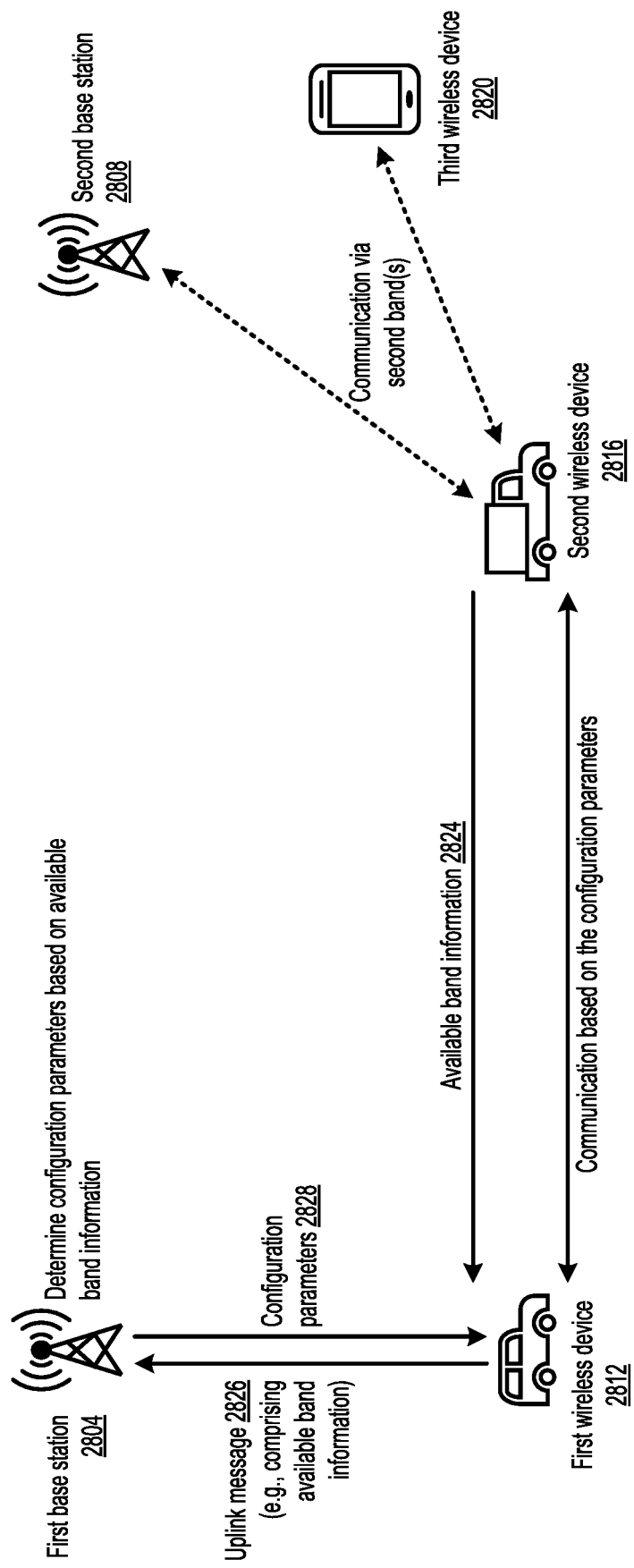
FIG. 28 shows example sidelink communications between two wireless devices based on available band information.

FIG. 28 shows example sidelink communications between two wireless devices based on available band information. A first wireless device 2812 may receive, from a second wireless device 2816, at least one sidelink message comprising sidelink capability information of the second wireless device 2816. The sidelink capability information may comprise available band information 2824 corresponding to the second wireless device 2816. The available band information 2824 may indicate at least one first band that is available for sidelink communication between the first wireless device 2812 and the second wireless device 2816. The second wireless device 2816 may determine the at least one first band based on at least one second band that the second wireless device uses for communication with a third network node (e.g., a second base station 2808, a third wireless device 2820, the first wireless device 2812, another network node, etc.). The second wireless device 2816 may determine band(s) that do not overlap with the at least one second band as the at least one first band. The second wireless device 2816 may determine the at least one first band based on bands/band combinations supported by the second wireless device 2816.

The first wireless device 2812 may send, to a first base station 2804, at least one uplink message 2826 (e.g., uplink RRC message). The at least one uplink message 2826 may comprise the sidelink capability information of the second wireless device 2816. The base station 2804 may determine resource configurations for sidelink communication between the first wireless device 2812 and the second wireless device 2816 based on the available band information 2824 included in the sidelink capability information. The first wireless device 2812 may receive, from the first base station 2804, configuration parameters 2828 (e.g., resource configurations) for sidelink communication between the first wireless device 2812 and the second wireless device 2816. The configuration parameters 2828 may indicate sidelink radio resources of the at least one first band. The first wireless device 2812 may send/transmit, to the second wireless device 2816, data (e.g., transport blocks, signals) via the sidelink radio resources of the at least one first band.

Figure 29:
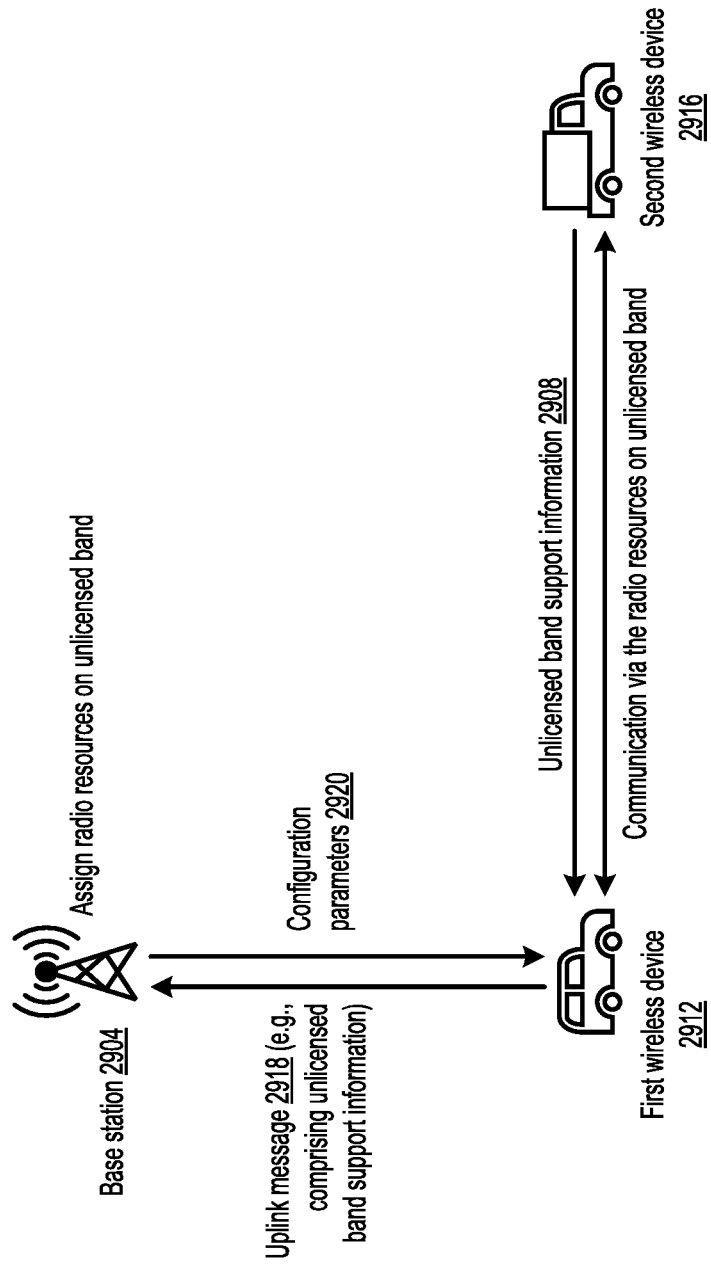
FIG. 29 shows example sidelink communications between two wireless devices based on unlicensed band support information.

FIG. 29 shows example sidelink communications between two wireless devices based on unlicensed band support information. A first wireless device 2912 may receive, from a second wireless device 2916, at least one sidelink message comprising sidelink capability information of the second wireless device 2916. The sidelink capability information may comprise unlicensed band support information 2908 indicating whether the second wireless device 2916 supports unlicensed bands. The sidelink capability information may indicate whether the second wireless device 2916 supports at least one of: a subframe/slot structure for unlicensed spectrum, a listen-before-talk operation, and/or the like. The first wireless device 2912 may send, to a base station 2904, at least one uplink message 2918 (e.g., uplink RRC message) comprising the sidelink capability information (e.g., the unlicensed band support information 2908) of the second wireless device 2916. The base station 2904 may determine/assign resources on the unlicensed band for sidelink communications, for example, if the unlicensed band support information 2908 indicates that the second wireless device 2916 supports communication via the unlicensed band. The first wireless device 2912 may receive, from the base station 2904, configuration parameters 2920 for sidelink communication between the first wireless device 2912 and the second wireless device 2916. The configuration parameters 2920 may indicate sidelink radio resources on an unlicensed band. The first wireless device 2912 may send/transmit, to the second wireless device 2916, data (e.g., transport blocks, signals) via the sidelink radio resources of the unlicensed band.

Figure 30:
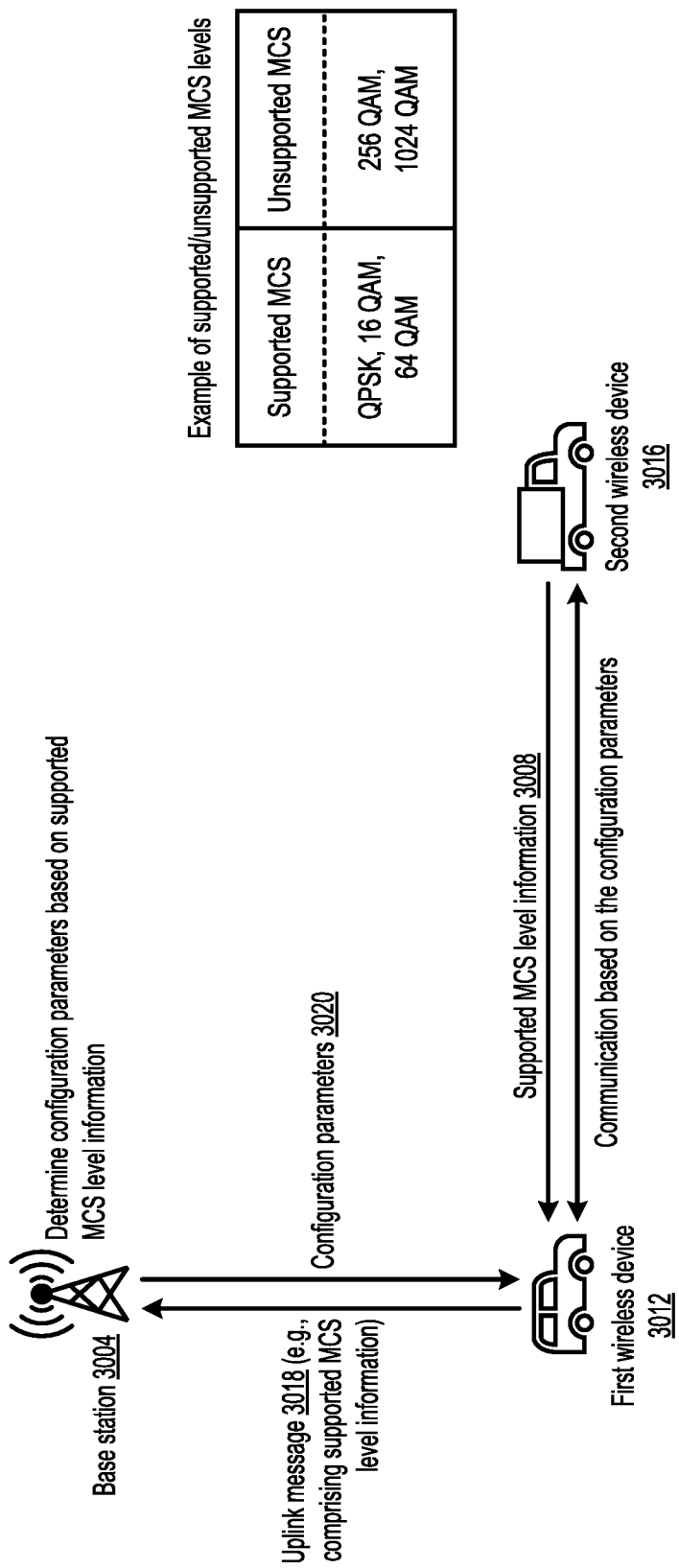
FIG. 30 shows example sidelink communications between two wireless devices based on supported modulation and coding schemes (MCSs).

FIG. 30 shows example sidelink communications between two wireless devices based on supported MCSs. A first wireless device 3012 may receive, from a second wireless device 3016, at least one sidelink message comprising sidelink capability information of the second wireless device 3016. The sidelink capability information may comprise supported MCS level information 3008 indicating at least one MCS level that the second wireless device 3016 supports. The at least one MCS level may comprise at least one of: QPSK, 16 QAM, 64 QAM, 256 QAM, 1024 QAM, and/or the like. The first wireless device 3012 may send, to a base station 3004, at least one uplink message 3018 (e.g., uplink RRC message) comprising the sidelink capability information (e.g., supported MCS level information 3008) of the second wireless device 3016. The base station may determine configuration parameters 3020 for sidelink communication between the first wireless device 3012 and the second wireless device 3016 based on the sidelink capability information. The configuration parameters 3020 may indicate sidelink radio resources configured to use the at least one MCS level. The first wireless device 3012 may receive, from the base station 3004, the configuration parameters 3020 for sidelink communication between the first wireless device 3012 and the second wireless device 3016. The first wireless device 3012 may send/transmit, to the second wireless device 3016, data (e.g., transport blocks, signals) via sidelink radio resources based on/using the at least one MCS level.

Figure 31:
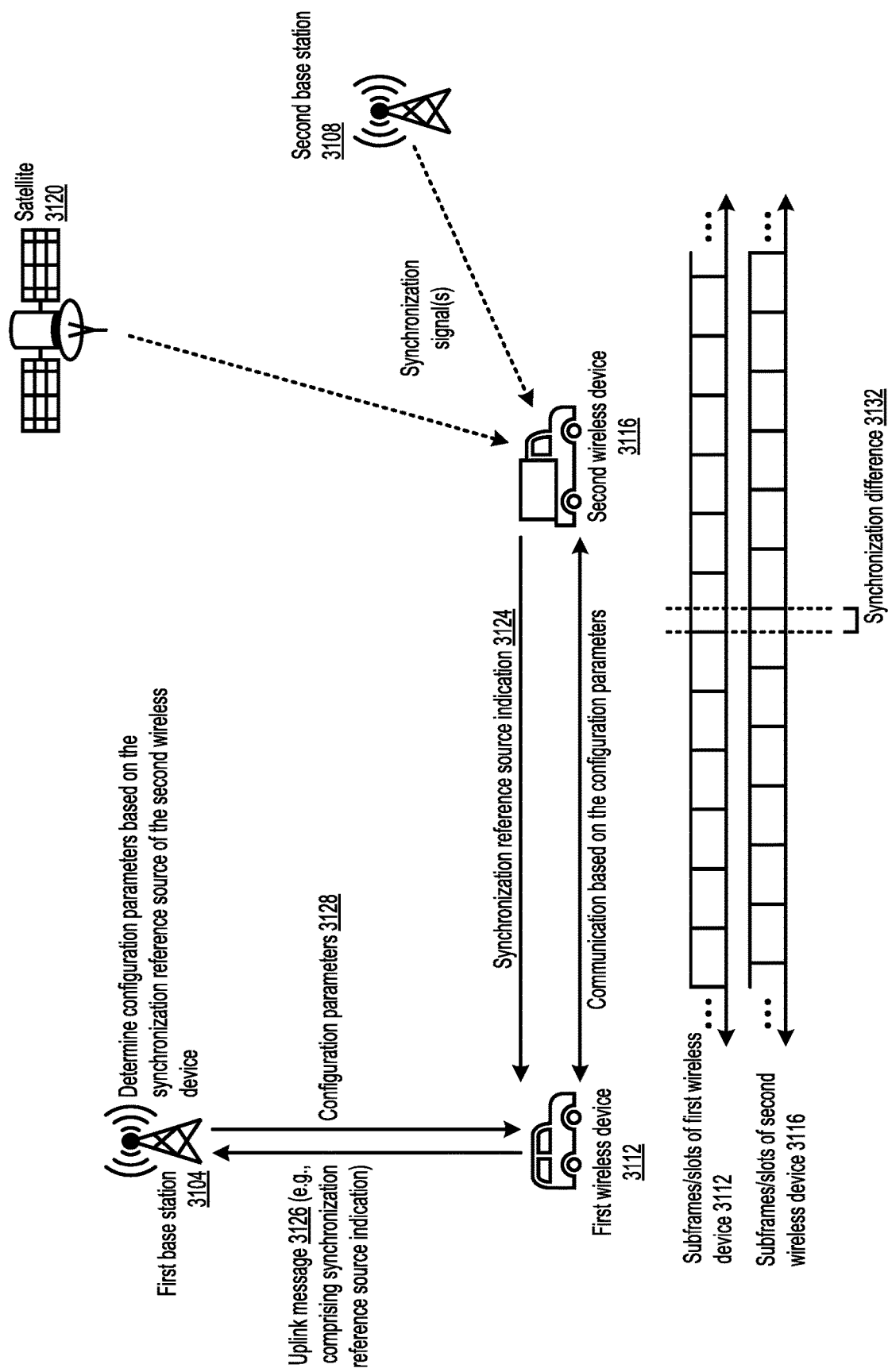
FIG. 31 shows example sidelink communications between two wireless devices based on a synchronization reference source of a wireless device.

FIG. 31 shows example sidelink communications between two wireless devices based on a synchronization reference source of one of the wireless devices. A synchronization reference source may comprise at least one of: a base station (e.g., a first base station 3104, a second base station 3108), a satellite 3120, a GNSS (e.g., GPS, GLONASS, Galileo, Beidou, etc.), and/or the like. A synchronization reference source may be associated with a subframe/slot timing.

A first wireless device 3112 may receive, from a second wireless device 3116, at least one sidelink message comprising sidelink capability information of the second wireless device. The sidelink capability information may comprise a synchronization reference source indication 3124 indicating a synchronization reference source of the second wireless device 3116. The first wireless device 3112 may send, to the first base station 3104, at least one uplink message 3126 (e.g., uplink RRC message) comprising the sidelink capability information of the second wireless device 3116. The first base station 3104 may determine configuration parameters 3128 for sidelink communication between the first wireless device 3112 and the second wireless device 3116 based on the synchronization reference source of the second wireless device 3116. The first wireless device 3112 may receive, from the first base station 3104, the configuration parameters 3128 for sidelink communication between the first wireless device 3112 and the second wireless device 3116. The configuration parameters 3128 may indicate sidelink radio resources determined based on the synchronization reference source of the second wireless device 3116. The first wireless device 3112 may send/receive, to/from the second wireless device 3116, data (e.g., transport blocks and/or signals, such as HARQ feedback) via the sidelink radio resources determined based on the synchronization reference source of the second wireless device 3116. The sidelink radio resources may be determined based on a synchronization difference 3132 between the first wireless device 3112 and the second wireless device 3116.

Figure 32:
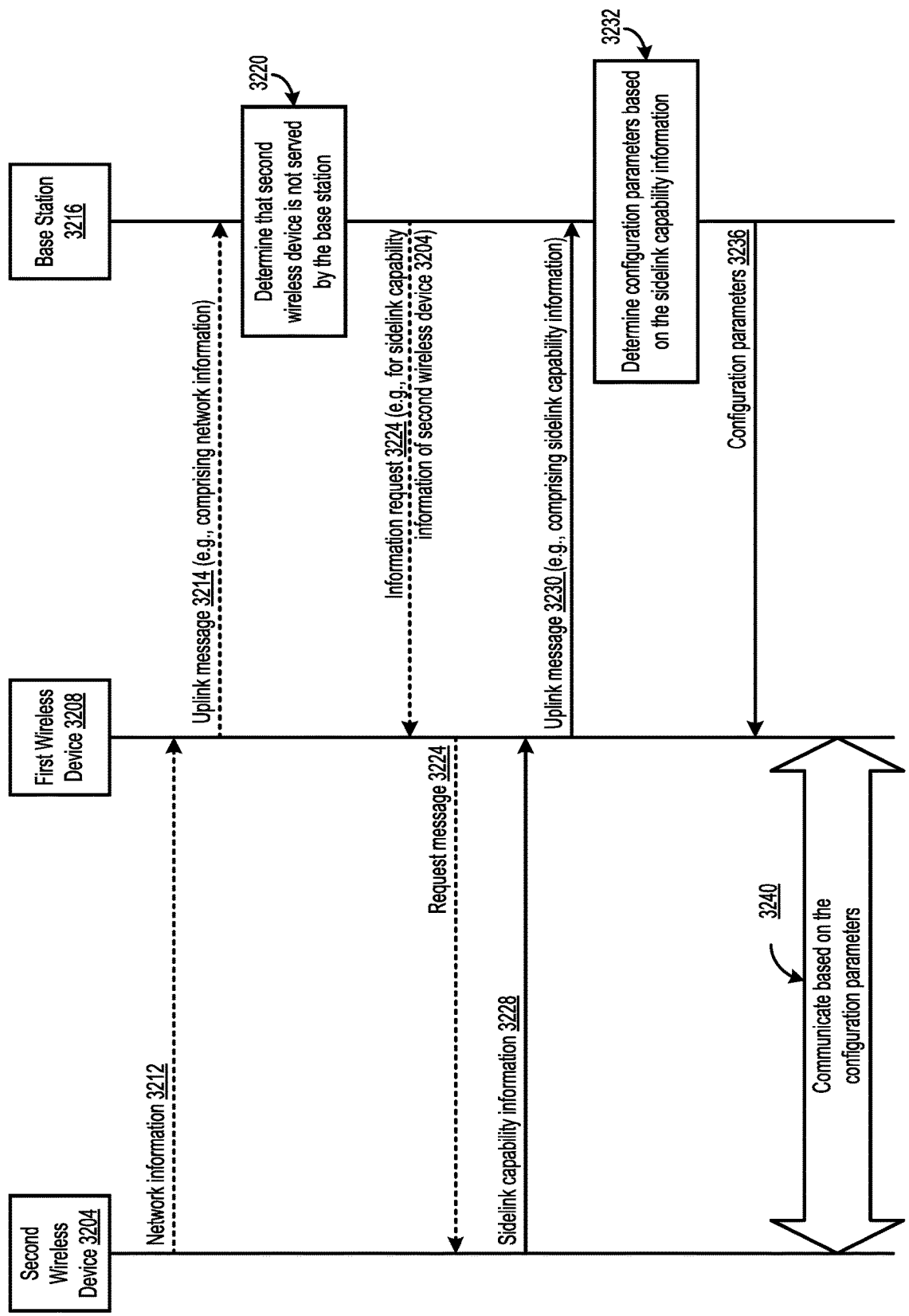
FIG. 32 shows an example procedure for sidelink communications between two wireless devices.

FIG. 32 shows an example procedure for sidelink communications between two wireless devices. The example procedure may used in various communication environments shown in FIGS. 25-31. For example, a first wireless device 3208, a second wireless device 3304, and a base station 3216 may correspond to the first wireless device, the second wireless device, and the base station/first base station, respectively, as described with reference to FIGS. 25-31.

The first wireless device 3208 may receive, from the second wireless device 3204, network information 3212 of the second wireless device 3204. The first wireless device 3208 may send, to the base station 3216, an uplink message 3214 comprising the network information 3212 of the second wireless device 3204. The network information 3212 may comprise an indication of a serving cell and/or a serving base station of the second wireless device 3204. At step 3220, the base station 3216 may determine, based on the network information 3212, that the second wireless device 3204 is not served by base station 3206. The base station 3216 may send, to the first wireless device 3208, an information request 3224 (e.g., an RRC information request message), for example, based on determining that the base station 3216 does not serve the second wireless device 3204. The information request 3224 may be a request for sidelink capability information of the second wireless device 3204. The first wireless device 3208 may send a request message 3224 to the second wireless device 3204 requesting the sidelink capability information of the second wireless device 3204. The second wireless device 3204 may send, to the first wireless device 3208, sidelink capability information 3228 of the second wireless device 3204, for example, based on/in response to receiving the information request 3224.

The base station 3216 may receive, from the first wireless device 3208, at least one uplink message 3230 (e.g., uplink RRC message) comprising the sidelink capability information 3228 of the second wireless device 3204. The first wireless device 3208 may communicate with the second wireless device 3204 via a sidelink communication channel. At step 3232, the base station 3216 may determine configuration parameters 3236 for sidelink communication between the first wireless device 3208 and the second wireless device 3204, for example, based on the sidelink capability information 3228 of the second wireless device 3204. The base station 3216 may send, to the first wireless device 3208, the configuration parameters 3236. The first base station 3216 may send, to another base station, a message comprising the sidelink capability information 3228 of the second wireless device 3204. The other base station may be at least one of: a target base station for a handover of the first wireless device 3208; a secondary base station of the first wireless device 3208; and/or the like. At step 3240, the first wireless device 3208 and the second wireless device 3204 may communicate based on the configuration parameters 3236. The first wireless device 3208 may use reception/transmission schemes based on the configuration parameters 3236, for example, for sidelink communications with the second wireless device 3204.

In at least some wireless communications, a first base station (e.g., the first base station 2504) may receive sidelink capability information via a second base station (e.g., the second base station 2508). The first base station may request and receive the sidelink capability information via the second base station, for example, if a reliability of a channel (e.g., a sidelink channel) between a first wireless device (e.g., the first wireless device 2512) and a second wireless device (e.g., the second wireless device 2516) is low. The first base station may request and receive the sidelink capability information via the second base station, for example, if the first base station does not serve the second wireless device.

FIG. 33 shows an example procedure for sidelink communications between two wireless devices. The example procedure may be used by a first base station 3304 to request and receive sidelink capability information via a second base station 3316. The example procedure may used in various communication environments shown in FIGS. 25-31. For example, the first base station 3304, the second base station 3316, a first wireless device 3308, and a second wireless device 3312 may correspond to the first base station, the second base station, the first wireless device, and the second wireless device, respectively, as described with reference to FIGS. 25-31.

The second wireless device 3320 may send, to the first wireless device 3308, network information 3320 associated with the second wireless device 3312. The first base station 3304 may receive, from the first wireless device 3308, an uplink message 3322 comprising the network information 3320 associated with the second wireless device 3312. The network information 3320 may indicate at least one of: a serving cell of the second wireless device 3312, a serving base station (e.g., the second base station 3316) of the second wireless device 3312, a resource pool, a zone; and/or the like. At step 3324, the first base station 3304 may determine/identify, based on the network information 3320, the second base station 3316 that serves the second wireless device 3312. The first base station 3304 may send, to the second base station 3316, a request 3328 for sidelink capability information of the second wireless device. The second base station 3316 may send (e.g., based on/in response to the request 3328) an information request 3332 to the second wireless device 3312. The second base station 3316 may receive (e.g., based on the information request 3332) sidelink capability information 3336 of the second wireless device 3312. The first base station 3304 may receive, from the second base station 3316, a message 3338 comprising the sidelink capability information 3336 of the second wireless device 3312. At step 3340, the first base station 3304 may determine, based on the sidelink capability information 3336 of the second wireless device 3316, configuration parameters 3344 for sidelink communication between the first wireless device 3308 and the second wireless device 3312. The first base station 3304 may send, to the first wireless device 3308, the configuration parameters 3344. At step 3348, the first wireless device 3308 and the second wireless device 3312 may communicate based on the configuration parameters 3344. The first wireless device 3308 may use reception/transmission schemes based on the configuration parameters 3344, for example, for sidelink communications with the second wireless device 3312.

Figure 34:
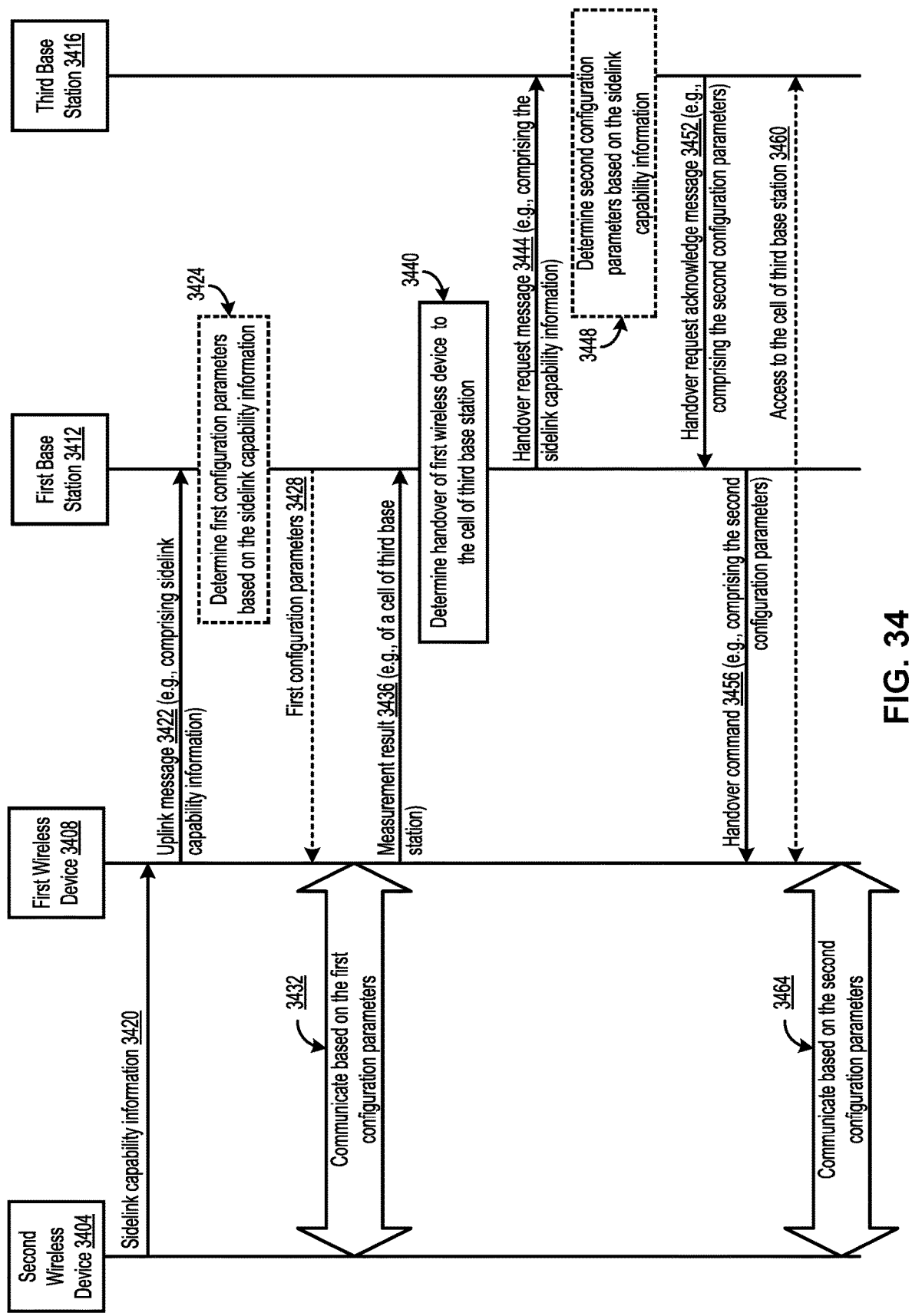
FIG. 34 shows an example procedure for sidelink communications comprising a wireless device handover.

FIG. 34 shows an example procedure for sidelink communications comprising a wireless device handover. The example procedure may used in various communication environments shown in FIGS. 25-31. For example, a first wireless device 3408, a second wireless device 3404, and a first base station 3412 may correspond to the first wireless device, the second wireless device, and the base station/first base station, respectively, as described with reference to FIGS. 25-31. The first wireless device 3408 may be served by the first base station 3412 and the second wireless device 3404 may be served by a second base station. The example procedure may comprise a handover of the first wireless device 3408 from the first base station 3412 to a third base station 3416.

The second wireless device 3404 may send, to the first wireless device 3408, sidelink capability information 3420 of the second wireless device 3404. The first base station 3412 may receive, from the first wireless device 3408, at least one uplink message 3422 (e.g., uplink RRC message) comprising the sidelink capability information 3420 of the second wireless device 3404. Alternatively, the first base station 3412 may receive, from the second base station, at least one message comprising sidelink capability information 3420 of the second wireless device 3404. At step 3424, the first base station 3412 may determine, based on the sidelink capability information 3420, first configuration parameters 3428 for sidelink communication between the first wireless device 3408 and the second wireless device 3404. The first base station 3412 may send, to the first wireless device 3408, first configuration parameters 3428. At step 3432, the first wireless device 3408 and the second wireless device 3404 may communicate via a sidelink communication channel based on the first configuration parameters 3428.

The first base station 3412 may receive, from the first wireless device 3408, measurement results 3436 of a cell of the third base station 3416. At step 3440, the first base station 3412 may determine to handover the first wireless device 3408 to the cell of the third base station 3416, for example, based on the measurement results 3436. The first base station 3412 may send, to the third base station 3416, a handover request message 3444 (e.g., via the direct interface and/or the indirect interface) for the first wireless device 3408. The handover request message 3444 may comprise the sidelink capability information 3420 of the second wireless device 3404 (e.g., as received from the first wireless device 3408 and/or from the second base station). The third base station 3416 may determine, based on the sidelink capability information 3420, second configuration parameters for sidelink communication between the first wireless device 3408 and the second wireless device 3404. The first base station 3412 may receive, from the third base station 3416, a handover request acknowledge message 3452 comprising the second configuration parameters for sidelink communication between the first wireless device 3408 and the second wireless device 3404. The first base station 3412 may send, to the first wireless device 3408, a handover command 3456 comprising the second configuration parameters. At step 3460, the first wireless device 3408 may access the cell of the third base station 3460 based on the handover command 3456. For example, the first wireless device 3408 may send/receive one or more messages to/from the third base station 3416. At step 3464, the first wireless device 3408 and the second wireless device 3404 may communicate via a sidelink communication channel based on the second configuration parameters 3464.

Figure 35:
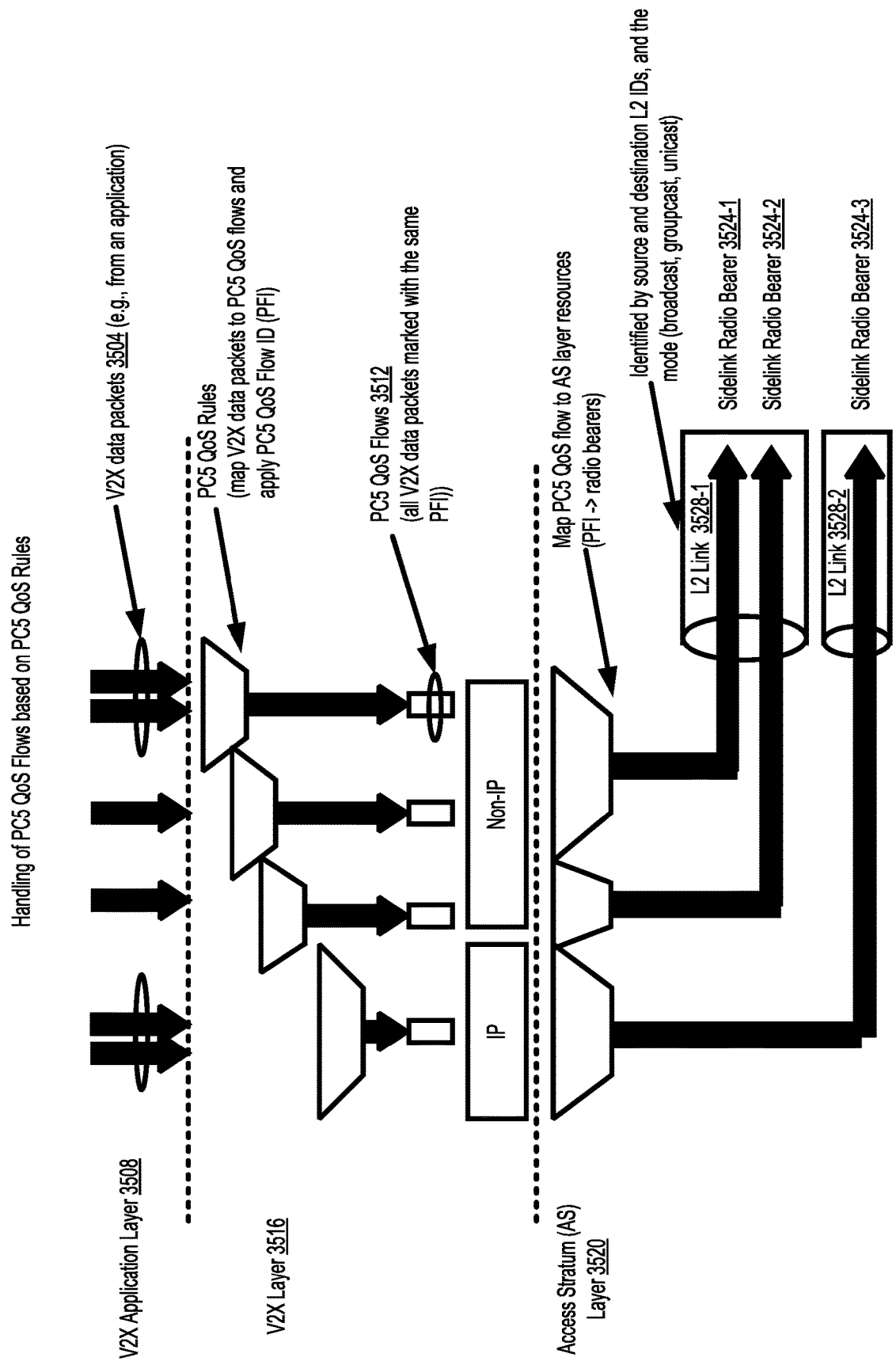
FIG. 35 shows an example mapping of data packets, from an application layer to sidelink radio bearers, for sidelink transmissions from a wireless device.

FIG. 35 shows an example mapping of data packets, from an application layer to sidelink radio bearers, for sidelink transmissions from a wireless device. The example mapping may be based on QoS parameters received from another wireless device and/or a base station. The example mapping may be determined by the wireless device based on QoS configuration information from a base station (e.g., indicated in a system information block or a dedicated RRC message). The example mapping may be used for QoS flows corresponding to a PC5 interface between two wireless devices (e.g., PC5 QoS flows). The data packets may be V2X data packets 3512 associated with an application (from a V2X application layer 3508) and may correspond to V2X communications between two wireless devices. The V2X data packets 3512 may be mapped to PC5 QoS flows 3512 in a V2X layer 3516 based on PC5 QoS rules indicated by the QoS parameters. Mapping the V2X data packets 3512 to the PC5 QoS flows 3512 may comprise applying PFIs associated with the PC5 QoS flows 3512 to the V2X data packets 3512. The V2X data packets 3508 may be mapped to the PC5 QoS flows 3512 based on whether the data packets are IP data packets or non-IP data packets.

The PC5 QoS flows 3512 may be mapped to access stratum (AS) layer resources in an AS layer 3520. The AS layer resources may be associated with corresponding sidelink radio bearers 3524. The PC5 QoS flows 3512 may be mapped to the AS layer resources based on the PFIs associated with the V2X data packets 3512. For example, a PFI may be associated with an AS layer resource/sidelink radio bearer.

The sidelink radio bearers 3524 may be mapped to one or more L2 links 3528. Each L2 link may correspond to (e.g., be indicated/identified by) a source L2 indicator/identifier (ID), a destination L2 indicator/ID, and a transmission mode (e.g., unicast transmission, multicast/groupcast transmission, or broadcast transmission). Each L2 link may be associated with one or more sidelink radio bearers for transmission.

Figure 36:
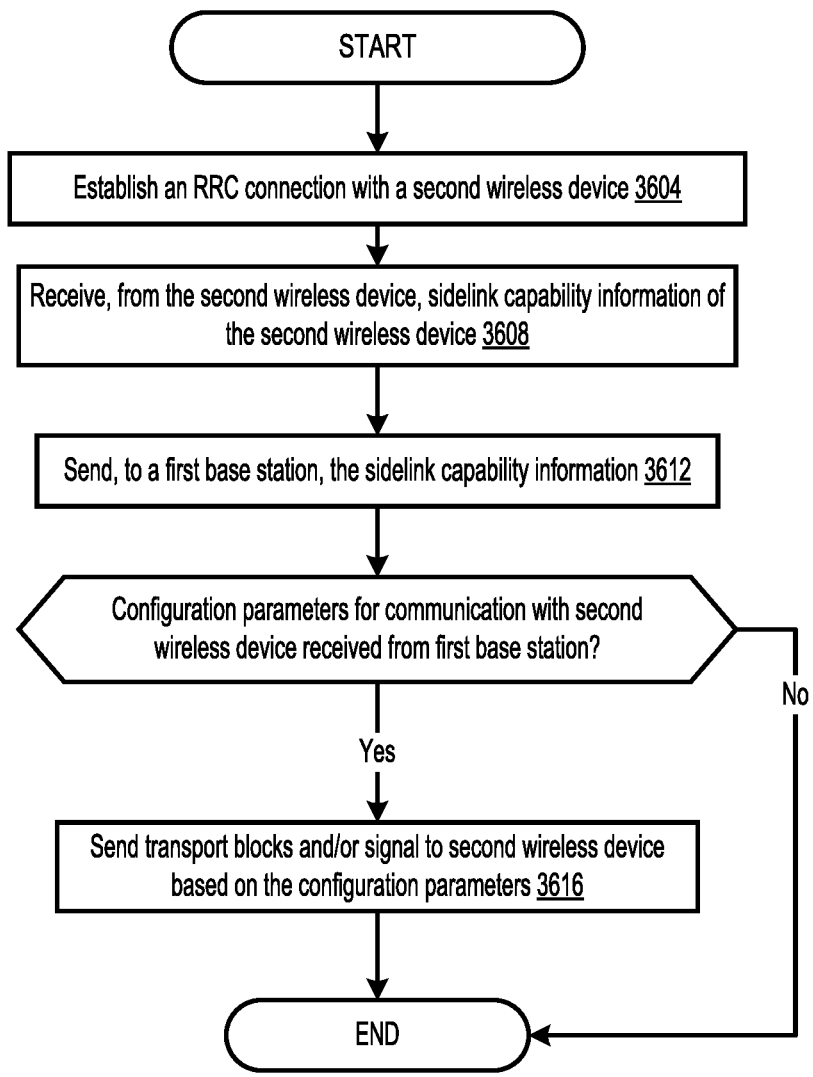
FIG. 36 shows an example method for sidelink communications between wireless devices.

FIG. 36 shows an example method for sidelink communications between a first wireless device and the second wireless device. At step 3604, the first wireless device may establish an RRC connection (e.g., a PC5-RRC connections) with the second wireless device. At step 3608, the first wireless device may receive, from the second wireless device, at least one sidelink message comprising sidelink capability information of the second wireless device. At step 3612, the first wireless device may send, to a first base station (e.g., a base station serving the first wireless device), at least one uplink RRC message comprising the sidelink capability information of the second wireless device. The first wireless device may receive, from the first base station, configuration parameters for sidelink communication between the first wireless device and the second wireless device. The configuration parameters may be based on the sidelink capability information of the second wireless device. At step 3616, the first wireless device may send/transmit, to the second wireless device, data (e.g., transport blocks and/or signals) based on the configuration parameters, for example, if the first wireless device receives configuration parameters from the base station.

The first wireless device may receive, from the first base station, an RRC information request message for the sidelink capability information of the second wireless device. The sending the at least one uplink RRC message (e.g., comprising the sidelink capability information of the second wireless device) may be based on the RRC information request message. The RRC information request message may comprise at least one of: a wireless device indicator/identifier of the second wireless device, a destination indicator/identifier indicating the second wireless device, a bearer indicator/identifier of a sidelink bearer associated with the second wireless device, a logical channel indicator/identifier of a sidelink logical channel associated with the second wireless device, a QoS flow indicator/identifier of a sidelink QoS flow associated with the second wireless device, a session indicator/identifier of a sidelink session associated with the second wireless device, and/or the like (e.g., for selective sidelink capability information and/or destination identification).

The first wireless device may receive, from the second wireless device, network information of the second wireless device. The network information may comprise at least one of: a cell indicator/identifier of a serving cell of the second wireless device; a base station indicator/identifier of a serving base station of the second wireless device; a resource pool indicator/index of a resource pool that the second wireless device uses; a zone indicator/identifier of a zone in which the second wireless device is located; an indicator of a synchronization reference source (e.g., comprising at least one of: a base station, a GNSS (e.g., GPS, GLONASS, Galileo, Beidou.), etc.) that the second wireless device uses for sidelink communication; priority information of synchronization reference sources at the serving cell of the second wireless device; and/or the like. The first wireless device may send, to the first base station, the network information of the second wireless device. The RRC information request message may be based on the network information. The first base station may send the RRC information request message, to the first wireless device, requesting sidelink capability information of the second wireless device, for example, if first base station determines (e.g., based on the network information) that the second wireless device is not served by the first base station.

The first wireless device may send, to the second wireless device, a sidelink information request message for the sidelink capability information. The at least one sidelink message (e.g., comprising the sidelink capability information) may be based on the sidelink information request message. The first wireless device may send, to the second wireless device, the sidelink information request message based on an RRC information request message from the first base station. The sidelink information request message may comprise at least one of: a wireless device indicator/identifier of the second wireless device, a destination indicator/identifier indicating the second wireless device, and/or the like.

The first wireless device may establish a PC5-RRC connection with the second wireless device. The at least one sidelink message may be associated with the PC5-RRC connection. The at least one sidelink message may be at least one of: a PC5-RRC message (e.g., PC5-RRC configuration message, PC5-RRC UE information message, etc.); a direct communication request message; a capability information message; and/or the like.

The second wireless device may determine the sidelink capability information based on a base station (e.g., a second base station) or a cell that serves the second wireless device and/or that the second wireless device camps on. The second wireless device may determine the sidelink capability information based on pre-configured parameters. The sidelink capability information may indicate/comprise at least one of: a cell indicator/identifier of a serving cell of the second wireless device; a base station indicator/identifier of a serving base station of the second wireless device; a resource pool that the second wireless device uses; a zone of the second wireless device; a synchronization reference source that the second wireless device uses for sidelink communication, the synchronization reference source (e.g., comprising at least one of: a base station, a GNSS (e.g., GPS, GLONASS, Galileo, Beidou), etc.); priority information of synchronization reference sources at the serving cell of the second wireless device; and/or the like.

The sidelink capability information of the second wireless device may indicate at least one of: whether the second wireless device supports sidelink multiple carrier operation (e.g., sidelink carrier aggregation, sidelink multiple carriers, sidelink multi-carrier); a supported/operating sidelink RAT (e.g., LTE, 5G, etc.); an available band (e.g., based on band(s) being currently used and/or supported band combination); whether the second wireless device supports an unlicensed band (e.g., unlicensed spectrum); a supported MCS (e.g., 64 QAM, 256 QAM, 1024 QAM, etc.); a synchronization reference source (e.g., base station, satellite, GNSS, etc.); and/or the like.

The sidelink capability information of the second wireless device may indicate at least one of: a supported band combination (e.g., supported band grouping for simultaneous use, and/or currently band(s) being currently used); a list of supported bands; a measurement capability (e.g., whether the second wireless device supports CBR measurement, as indicated by higher layer parameter sl-CongestionControl; etc.); a sidelink MIMO capability (e.g., a number of supported MIMO layers for spatial multiplexing in sidelink reception/transmission, beamforming); a sidelink MIMO capability per band (e.g., as indicated by higher layer parameter MIMO-ParametersPerBand); a supported numerology/TTI; a supported sidelink slot format; a maximum number of transport block bits in one TTI (e.g., if 16 QAM reception is supported); a device type (e.g., whether battery consumption optimization is needed at the second wireless device); a wireless device category; whether the second wireless device supports an aperiodic CSI reporting; a supported bandwidth class (e.g., a number of aggregated resource blocks within a fully allocated aggregated channel bandwidth, number of contiguous component carrier, whether multiple carrier operation is supported); and/or the like.

The first wireless device may receive, from a third wireless device, second sidelink capability information of the third wireless device. The at least one uplink RRC message may comprise the second sidelink capability information. The configuration parameters for the sidelink communication between the first wireless device and the second wireless device may be based on the second sidelink capability information. The first wireless device may multicast data (e.g., transport blocks and/or signals) to the second wireless device and the third wireless device based on the configuration parameters.

The at least one uplink RRC message may comprise sidelink capability information of the second wireless device indicating a capability of the second wireless device that may be different from a capability of the first wireless device. The first wireless device may forward/indicate, to the first base station, a capability of the second wireless device, for example, if the capability of the second wireless device is different from a capability of the first wireless device (e.g., if the second wireless device is associated with less capable features than the first wireless device or if the second wireless device had other differences in capabilities relative to the first wireless device). The first wireless device may not forward/indicate, to the first base station, a capability of the second wireless device, for example, if the capability of the second wireless device is the same (or substantially the same) as a capability of the first wireless device or if the second wireless device has a higher capability (e.g., more advanced capability) than the first wireless device.

The receiving the configuration parameters may comprise receiving the configuration parameters via at least one of: at least one RRC configuration message, at least one MAC CE, at least one PDCCH transmission (e.g., DCI), and/or the like. The configuration parameters may be associated with at least one of: transmissions from the first wireless device to the second wireless device, transmissions from the second wireless device to the first wireless device (e.g., a HARQ feedback), and/or the like.

The first wireless device may establish one or more sidelink radio bearers between the first wireless device and the second wireless device. The first wireless device may send, to the second wireless device, an RRC bearer configuration request requesting the one or more sidelink radio bearers, for example, for establishing the one or more sidelink radio bearers. The RRC bearer configuration request may comprise QoS parameters of the one or more sidelink radio bearers. The first wireless device may receive, from the second wireless device, an RRC bearer configuration response indicating configuration of the one or more sidelink radio bearers. The first wireless device may send, to the first base station, a sidelink bearer configuration request indicating the one or more sidelink radio bearers, for example, for establishing the one or more sidelink radio bearers. The sidelink bearer configuration request may comprise QoS parameters of the one or more sidelink radio bearer. The first wireless device may receive, from the first base station, a sidelink bearer configuration response comprising configuration parameters for the one or more sidelink radio bearers.

FIG. 37 shows an example method for determining configuration parameters at a base station for sidelink communications between two wireless devices. At step 3704, a first base station may receive, from a first wireless device, network information of a second wireless device. The first base station may serve the first wireless device. At step 3708, the first base station may determine, based on the network information, whether the first base station serves the second wireless device. The base station may determine, based on the network information, whether a second base station serves the second wireless device, for example, if the first base station does not serve the second wireless device. At step 3720, the first base station may send to the second base station or to the first wireless device an information request for the second wireless device, for example, if the second base station serves the second wireless device. The information request may be a request for sidelink capability information of the second wireless device. At step 3724, the first base station may receive, from the second base station or the second wireless device, the sidelink capability information of the second wireless device.

At step 3728, the first base station may send, to the first wireless device, an information request for the second wireless device, for example, if neither the first base station nor the second base station serves the second wireless device. At step 3732, the first base station may receive, from the first wireless device, the sidelink capability information of the second wireless device.

At step 3736, the first base station may determine configuration parameters for communication between the first wireless device and the second wireless device. The first base station may determine the configuration parameters based on the received sidelink capability information at step 3724 or at step 3732. The first base station need not require sidelink capability information of the second wireless device from the first wireless device or the second base station to determine the configuration parameters, for example, if the first base station serves the second wireless device. At step 3740, the first base station may send, to the first wireless device, the configuration parameters. the first wireless device may use the configuration parameters to communicate with the second wireless device via a sidelink communication channel.

Figure 38:
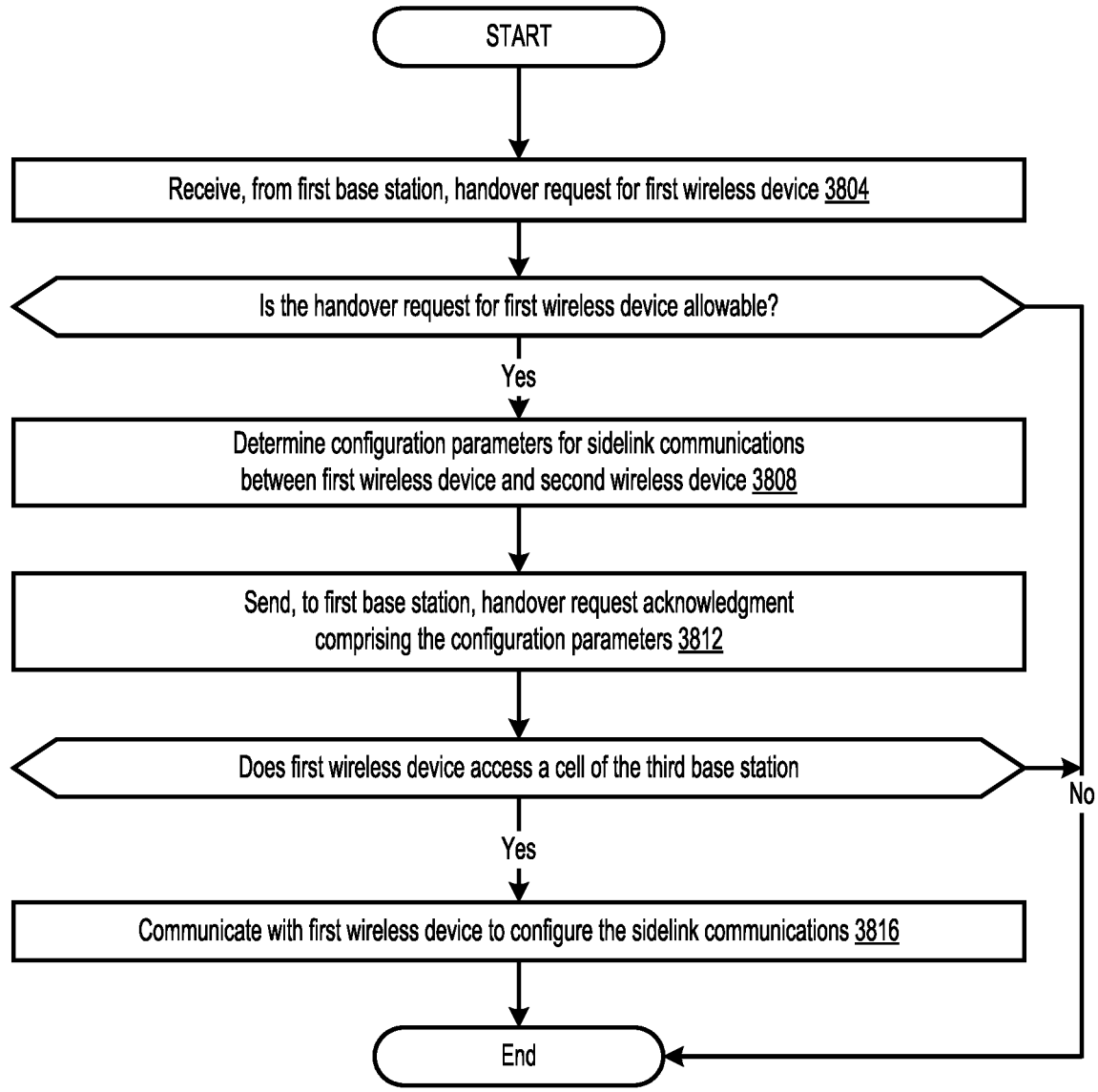
FIG. 38 shows an example method for determining configuration parameters for sidelink communications in a handover procedure.

FIG. 38 shows an example method for determining configuration parameters in a handover procedure. A first base station may receive, from a first wireless device, measurement results of a cell of a third base station. The first base station may determine, based on the measurement results, to handover the first wireless device to the cell of the third base station. At step 3808, the third base station may receive, from the first base station, a handover request (e.g., via a direct interface (e.g., handover request message) and/or an indirect interface (e.g., handover required message and/or handover request message)) for the first wireless device. The handover request may comprise the sidelink capability information of the second wireless device (e.g., received at the first base station from the first wireless device and/or from a second base station). The handover request may comprise an indication of a destination and/or peer node corresponding to sidelink communication of the first wireless device. At step 3808, the third base station may determine configuration parameters for sidelink communications between the first wireless device and the second wireless device based on the sidelink capability information of the second wireless device.

The third base station may send, to the first base station, a handover request acknowledgement (e.g., via the direct interface (e.g., handover request acknowledge message) and/or the indirect interface (e.g., handover command message and/or handover request acknowledge message)) comprising configuration parameters for sidelink communication between the first wireless device and the second wireless device. The configuration parameters may be based on the sidelink capability information of the second wireless device. The first base station may send, to the first wireless device, a handover command comprising the configuration parameters. The first wireless device may access (e.g., by performing a random access procedure) the cell of the third base station based on the handover command. At step 3816, the third base station may communicate with the first wireless device to configure the sidelink communications between the first wireless device and the second wireless device if the first wireless device accesses the cell of the third base station. The first wireless device may communicate with the second wireless device at the cell of the third base station based on the configuration parameters for sidelink communication between the first wireless device and the second wireless device.

A first wireless device may perform a method comprising multiple operations. The first wireless device may receive, from a second wireless device, at least one sidelink message comprising sidelink capability information associated with the second wireless device. The first wireless device may transmit, by the first wireless device to a base station, at least one uplink radio resource control message comprising the sidelink capability information associated with the second wireless device. The first wireless device may receive, from the base station, configuration parameters for sidelink communication between the first wireless device and the second wireless device. The first wireless device may transmit, to the second wireless device and based on the configuration parameters, at least one transport block. The first wireless device may also perform one or more additional operations. The first wireless device may receive, from the base station, a radio resource control information request message for the sidelink capability information associated with the second wireless device, wherein the transmitting the at least one uplink radio resource control message is based on the radio resource control information request message. The first wireless device may transmit, to the second wireless device, a sidelink information request message for the sidelink capability information, wherein the receiving the at least one sidelink message is based on the sidelink information request message. The sidelink capability information associated with the second wireless device indicates at least one of: whether a multiple carrier sidelink operation is supported; a sidelink radio access technology; an available band; whether an unlicensed spectrum is supported; or a supported modulation coding scheme (MCS). The at least one uplink radio resource control message may comprise capability information associated with the second wireless device, wherein the capability information associated the second wireless device may be different from capability information associated with the first wireless device. The sidelink capability information associated with the second wireless device may comprise a synchronization reference source of the second wireless device, wherein the configuration parameters for sidelink communication between the first wireless device and the second wireless device may be based on the sidelink capability information and the synchronization reference source. The first wireless device may receive, from the second wireless device, a response to the at least one transport block. The configuration parameters may be associated with at least one of: transmissions of the first wireless device to the second wireless device; or a transmission of a hybrid automatic repeat request (HARQ) feedback from the second wireless device to the first wireless device. The first wireless device may establish one or more sidelink radio bearers between the first wireless device and the second wireless device. The receiving the configuration parameters may comprise receiving the configuration parameters via at least one of: at least one radio resource control configuration (RRC) message; a medium access control element (MAC CE); or a physical downlink control channel (PDCCH). The first wireless device may receive, from the base station, a handover command comprising second configuration parameters for sidelink communication between the first wireless device and the second wireless device. The first wireless device may transmit, to the second wireless device and based on the second configuration parameters, at least one second transport block. The receiving the at least one sidelink message may be based on establishing a radio resource control configuration (RRC) connection with the second wireless device. The first wireless device may receive, from the base station, a radio resource control information request message for the sidelink capability information associated with the second wireless device, wherein the radio resource control information request message may comprise at least one of: a wireless device identifier of the second wireless device; a destination identifier indicating the second wireless device; a bearer identifier of a sidelink bearer associated with the second wireless device; a logical channel identifier of a sidelink logical channel associated with the second wireless device; a quality of service (QoS) flow identifier of a sidelink QoS flow associated with the second wireless device; or a session identifier of a sidelink session associated with the second wireless device. The first wireless device may receive, from the second wireless device, network information of the second wireless device, wherein the network information may comprise at least one of: a cell identifier of a serving cell of the second wireless device; a base station identifier of a serving base station of the second wireless device; a resource pool index of a resource pool that the second wireless device uses; a zone identifier of a zone where the second wireless device is located in; or priority information of synchronization reference sources at the serving cell of the second wireless device. The first wireless device may send, to the base station, the network information of the second wireless device. The first wireless device may receive, from the base station, a radio resource control information request message for the sidelink capability information associated with the second wireless device, wherein the radio resource control information request message is based on the network information. The first wireless device may receive, from the base station, a radio resource control information request message for the sidelink capability information associated with the second wireless device. The first wireless device may transmit, to the second wireless device based on the radio resource control information request message, a sidelink information request message for the sidelink capability information. The first wireless device may transmit, to the second wireless device, a sidelink information request message for the sidelink capability information, wherein the sidelink information request message may comprise at least one of: a wireless device identifier of the second wireless device; or a destination identifier indicating the second wireless device. The at least one sidelink message may be at least one of: a PC5 radio resource control message; a direct communication request message; or a capability information message. The sidelink capability information associated with the second wireless device may indicate at least one of: a cell of a serving cell of the second wireless device; a base station of a serving base station of the second wireless device; a resource pool that the second wireless device uses; a zone of the second wireless device; or priority information of synchronization reference sources at the serving cell of the second wireless device. The sidelink capability information associated with the second wireless device may indicate at least one of: a supported frequency range; a supported band combination; a measurement capability of the second wireless device; whether the second wireless device supports multiple panels; a sidelink multiple-input and multiple-output capability; whether the second wireless device supports sidelink multiple bandwidth parts; whether the second wireless device supports sidelink multiple active bandwidth parts; a supported numerology; a sidelink slot format; a maximum number of transport block bits in one transmission time interval (TTI); whether the second wireless device supports an extended cyclic prefix; whether the second wireless device supports simultaneously transmission and reception on a sidelink bandwidth part and an uplink bandwidth part; whether the second wireless device supports packet duplication; a device type; a user equipment category; whether the second wireless device supports an aperiodic channel status information (CSI) reporting; whether the second wireless device supports a periodic CSI reporting; or a supported bandwidth. The first wireless device may send, to the second wireless device, a radio resource control bearer configuration request requesting one or more sidelink radio bearers, the radio resource control bearer configuration request comprising quality of service (QoS) parameters of the one or more sidelink radio bearer. The first wireless device may receive, by the first wireless device from the second wireless device, a radio resource control bearer configuration response indicating configuration of the one or more sidelink radio bearers. The first wireless device may send, to the base station, a sidelink bearer configuration request indicating one or more sidelink radio bearers, the sidelink bearer configuration request comprising quality of service (QoS) parameters of the one or more sidelink radio bearer. The first wireless device may receive, from the base station, a sidelink bearer configuration response comprising configuration parameters for the one or more sidelink radio bearers. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a second wireless device configured to send the at least one sidelink message. A computer-readable medium may store instructions that, when executed, cause performance of the described method, additional operations and/or include the additional elements.

A first wireless device may perform a method comprising multiple operations. The first wireless device may receive, from a base station, configuration parameters for sidelink communication. The first wireless device may send, to a second wireless device, at least one sidelink message comprising sidelink capability information associated with the first wireless device. The first wireless device may receive, from the second wireless device and based on configuration parameters of the second wireless device that are based on the sidelink capability information, at least one transport block. The first wireless device may perform one or more additional operations. The first wireless device may receive, from the second wireless device, a sidelink information request message for the sidelink capability information, wherein transmitting the at least one sidelink message may be based on the sidelink information request message. The sidelink capability information associated with the first wireless device may comprise an indication of whether the first wireless device supports at least one of: a multiple carrier sidelink operation; a sidelink radio access technology; an available band; an unlicensed spectrum; or a supported modulation coding scheme (MCS). The at least one sidelink message may comprise capability information associated with the first wireless device, wherein the capability information associated the first wireless device may be different from capability information associated with the second wireless device. The sidelink capability information associated with the first wireless device may comprise a synchronization reference source of the first wireless device, wherein the receiving the at least one transport block may be based on the synchronization reference source. The first wireless device may transmit, to the second wireless device, a response to the at least one transport block. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a second wireless device configured to send the at least one transport block. A computer-readable medium may store instructions that, when executed, cause performance of the described method, additional operations and/or include the additional elements.

A base station may perform a method comprising multiple operations. The base station may receive, from a first wireless device, at least one uplink radio resource control message comprising sidelink capability information associated with a second wireless device. The base station may, based on the sidelink capability information, determine configuration parameters for sidelink communication between the first wireless device and the second wireless device. The base station may transmit, to the first wireless device, the configuration parameters. The base station may also perform one or more additional operations. The base station may transmit, to the first wireless device, a radio resource control information request message for the sidelink capability information associated with the second wireless device, wherein the receiving the at least one uplink radio resource control message may be based on the radio resource control information request message. The sidelink capability information associated with the second wireless device may comprise an indication of whether the second wireless device supports at least one of: a multiple carrier sidelink operation; a sidelink radio access technology; an available band; an unlicensed spectrum; or a supported modulation coding scheme (MCS). The at least one uplink radio resource control message may comprise capability information associated with the second wireless device, wherein the capability information associated the second wireless device may be different from capability information associated with the first wireless device. The sidelink capability information associated with the second wireless device may comprise a synchronization reference source of the second wireless device, wherein the configuration parameters for sidelink communication between the first wireless device and the second wireless device may be further based on the synchronization reference source. The base station may send, to a second base station, the sidelink capability information associated with the second wireless device, wherein the second base station may comprise at least one of: a target base station for a handover of the first wireless device; or a secondary base station of the first wireless device. The base station may determine, based on the at least one uplink radio resource control message, a second base station associated with the second wireless device. The base station may transmit, to the second base station, a request for sidelink capability information associated with the second wireless device. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send the at least one transport block. A computer-readable medium may store instructions that, when executed, cause performance of the described method, additional operations and/or include the additional elements.

A first wireless device may perform a method comprising multiple operations. The first wireless device may receive, from a second wireless device, at least one sidelink message comprising sidelink capability information associated with the second wireless device, wherein the sidelink capability information may indicate whether the second wireless device supports sidelink multiple carriers. The first wireless device may send, to a base station, at least one uplink radio resource control message comprising the sidelink capability information associated with the second wireless device. The first wireless device may receive, from the base station, configuration parameters for sidelink communication between the first wireless device and the second wireless device, wherein the configuration parameters may indicate: first sidelink radio resources of a first carrier; and second sidelink radio resources of a second carrier. The first wireless device may transmit, to the second wireless device: first transport blocks via the first sidelink radio resources of the first carrier; and second transport blocks via the second sidelink radio resources of the second carrier. The sidelink capability information may comprise band combination information indicating one or more bands that are allowed to be simultaneously used for sidelink communication with the second wireless device. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A first wireless device may perform a method comprising multiple operations. The first wireless device may receive, from a second wireless device, at least one sidelink message comprising sidelink capability information associated with the second wireless device, wherein the sidelink capability information indicates a sidelink radio access technology of the second wireless device. The first wireless device may send, to a base station, at least one uplink radio resource control message comprising the sidelink capability information associated with the second wireless device. The first wireless device may receive, from the base station, configuration parameters for sidelink communication between the first wireless device and the second wireless device, wherein the configuration parameters may be compatible with the sidelink radio access technology of the second wireless device. The first wireless device may transmit, to the second wireless device, transport blocks based on the configuration parameters. The sidelink radio access technology may indicate at least one of: a long-term evolution (LTE) access technology; a new radio access technology; or a wireless local area network technology. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A first wireless device may perform a method comprising multiple operations. The first wireless device may receive, from a second wireless device, at least one sidelink message comprising sidelink capability information associated with the second wireless device, wherein the sidelink capability information may indicate at least one first band that is available for sidelink communication between the first wireless device and the second wireless device. The first wireless device may send, to a base station, at least one uplink radio resource control message comprising the sidelink capability information associated with the second wireless device. The first wireless device may receive, from the base station, configuration parameters for sidelink communication between the first wireless device and the second wireless device, wherein the configuration parameters may indicate sidelink radio resources of the at least one first band. The first wireless device may transmit, to the second wireless device, transport blocks via the sidelink radio resources of the at least one first band. The second wireless device may determine the at least one first band based on at least one second band that the second wireless device uses for communication with a third network node. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A first wireless device may perform a method comprising multiple operations. The first wireless device may receive, from a second wireless device, at least one sidelink message comprising sidelink capability information associated with the second wireless device, wherein the sidelink capability information may indicate whether the second wireless device supports unlicensed bands. The first wireless device may send, to a base station, at least one uplink radio resource control message comprising the sidelink capability information associated with the second wireless device. The first wireless device may receive, from the base station, configuration parameters for sidelink communication between the first wireless device and the second wireless device, wherein the configuration parameters may indicate sidelink radio resources of an unlicensed band. The first wireless device may transmit, to the second wireless device, transport blocks via the sidelink radio resources of the unlicensed band. The sidelink capability information may indicate whether the second wireless device supports at least one of: a subframe/slot structure for unlicensed spectrum; or a listen-before-talk operation. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A first wireless device may perform a method comprising multiple operations. The first wireless device may receive, from a second wireless device, at least one sidelink message comprising sidelink capability information associated with the second wireless device, wherein the sidelink capability information may indicate at least one modulation coding scheme level that the second wireless device supports. The first wireless device may send, to a base station, at least one uplink radio resource control message comprising the sidelink capability information associated with the second wireless device. The first wireless device may receive, from the base station, configuration parameters for sidelink communication between the first wireless device and the second wireless device, wherein the configuration parameters may indicate sidelink radio resources configured to use the at least one modulation coding scheme level. The first wireless device may transmit, to the second wireless device, transport blocks via the sidelink radio resources based on the at least one modulation coding scheme level. The at least one modulation coding scheme level may comprises at least one of: quadrature phase shift keying (QPSK); 16 quadrature amplitude modulation (QAM); 64 QAM; 256 QAM; or 1024 QAM. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A first wireless device may perform a method comprising multiple operations. The first wireless device may receive, from a second wireless device, at least one sidelink message comprising sidelink capability information associated with the second wireless device, wherein the sidelink capability information may indicate a synchronization reference source of the second wireless device. The first wireless device may send, to a base station, at least one uplink radio resource control message comprising the sidelink capability information associated with the second wireless device. The first wireless device may receive, from the base station, configuration parameters for sidelink communication between the first wireless device and the second wireless device, wherein the configuration parameters may indicate sidelink radio resources determined based on the synchronization reference source. The first wireless device may send, to the second wireless device via the sidelink radio resources, transport blocks. The first wireless device may receive, from the second wireless device via the sidelink radio resources, HARQ feedback messages The synchronization reference source may comprise at least one of: a base station; a satellite; or a global navigation satellite system (GNSS). The sidelink capability information may indicate a priority of synchronization reference sources of the second wireless device. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A first base station may perform a method comprising multiple operations. The first base station may receive, from a first wireless device, device information of a second wireless device, the device information indicating at least one of: a serving cell; a serving base station; a resource pool; or a zone. The first base station may determine, based on the device information, a second base station that serves the second wireless device. The first base station may send, to the second base station, request for sidelink capability information associated with the second wireless device. The first base station may receive, from the second base station, the sidelink capability information associated with the second wireless device. The first base station may determine, based on the sidelink capability information, configuration parameters for sidelink communication between the first wireless device and the second wireless device. The first base station may send, to the first wireless device, the configuration parameters. A base station may comprise one or more processors; and memory storing instructions that, when executed by the one or more processors, cause the base station to perform the described method, additional operations and/or include the additional elements. A system may comprise a first base station configured to perform the described method, additional operations and/or include the additional elements; and a second base station configured to send the sidelink capability information. A computer-readable medium may store instructions that, when executed, cause performance of the described method, additional operations and/or include the additional elements.

A first base station may perform a method comprising multiple operations. The first base station may receive, from a first wireless device, at least one uplink radio resource control message comprising sidelink capability information associated with a second wireless device. The first base station may receive, from the first wireless device, measurement results of a cell of a second base station. The first base station may determine to handover the first wireless device to the cell of the second base station. The first base station may send, to the second base station, a handover request message for the first wireless device, wherein the handover request message comprises the sidelink capability information associated with the second wireless device. The first base station may receive, from the second base station, a handover request acknowledge message comprising second configuration parameters for sidelink communication between the first wireless device and the second wireless device, wherein the second configuration parameters may be based on the sidelink capability information associated with the second wireless device. The first base station may send, to the first wireless device, a handover command comprising the second configuration parameters. The first base station may send, to the first wireless device, configuration parameters for sidelink communication between the first wireless device and the second wireless device, wherein the configuration parameters may be based on the sidelink capability information associated with the second wireless device. A base station may comprise one or more processors; and memory storing instructions that, when executed by the one or more processors, cause the base station to perform the described method, additional operations and/or include the additional elements. A system may comprise a first base station configured to perform the described method, additional operations and/or include the additional elements; and a second base station configured to send the handover request acknowledgment message. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
  receiving, by a first wireless device from a second wireless device, at least one sidelink message comprising sidelink capability information associated with at least one of transmission or reception at the second wireless device;
  transmitting, by the first wireless device to a base station, at least one uplink radio resource control message comprising the sidelink capability information associated with at least one of transmission or reception at the second wireless device, wherein the sidelink capability information is different from capability information associated with the first wireless device;

receiving, by the first wireless device from the base station, configuration parameters for a transmission from the first wireless device to the second wireless device, wherein the configuration parameters for the transmission are based on the sidelink capability information associated with at least one of transmission or reception at the second wireless device; and transmitting, by the first wireless device to the second wireless device and based on the configuration parameters, at least one transport block.

2. The method of claim 1, further comprising receiving, by the first wireless device from the base station, a radio resource control information request message for the sidelink capability information associated with at least one of transmission or reception at the second wireless device, wherein the transmitting the at least one uplink radio resource control message is based on the radio resource control information request message.

3. The method of claim 1, further comprising transmitting, by the first wireless device to the second wireless device, a sidelink information request message for the sidelink capability information, wherein the receiving the at least one sidelink message is based on the sidelink information request message.

4. The method of claim 1, wherein the sidelink capability information associated with at least one of transmission or reception at the second wireless device indicates at least one of:

whether a multiple carrier sidelink operation is supported;
a sidelink radio access technology;
an available band;
whether an unlicensed spectrum is supported; or
a supported modulation coding scheme (MCS).

5. The method of claim 1, wherein the sidelink capability information associated with at least one of transmission or reception at the second wireless device comprises a synchronization reference source of the second wireless device, and wherein the configuration parameters for the transmission from the first wireless device to the second wireless device are based on the sidelink capability information and the synchronization reference source.

6. The method of claim 1, further comprising:
receiving, by the first wireless device from the second wireless device, a response to the at least one transport block.

7. A first wireless device comprising:
one or more processors; and
memory storing instructions that, when executed by the one or more processors, configure the first wireless device to:
receive, from a second wireless device, at least one sidelink message comprising sidelink capability information associated with at least one of transmission or reception at the second wireless device;
transmit, to a base station, at least one uplink radio resource control message comprising the sidelink capability information associated with at least one of transmission or reception at the second wireless device, wherein the sidelink capability information is different from capability information associated with the first wireless device;
receive, from the base station, configuration parameters for a transmission from the first wireless device to the second wireless device, wherein the configuration parameters for the transmission are based on the sidelink capability information associated with at least one of transmission or reception at the second wireless device; and
transmit, to the second wireless device and based on the configuration parameters, at least one transport block.

8. The first wireless device of claim 7, wherein the instructions, when executed by the one or more processors, further configure the first wireless device to receive, from the base station, a radio resource control information request message for the sidelink capability information associated with at least one of transmission or reception at the second wireless device, wherein the at least one uplink radio resource control message is transmitted based on the radio resource control information request message.

9. The first wireless device of claim 7, wherein the instructions, when executed by the one or more processors, further configure the first wireless device to transmit, to the second wireless device, a sidelink information request message for the sidelink capability information, wherein the at least one sidelink message is received based on the sidelink information request message.

10. The first wireless device of claim 7, wherein the sidelink capability information associated with at least one of transmission or reception at the second wireless device indicates at least one of:

whether a multiple carrier sidelink operation is supported;
a sidelink radio access technology;
an available band;
whether an unlicensed spectrum is supported; or
a supported modulation coding scheme (MCS).

11. The first wireless device of claim 7, wherein the sidelink capability information associated with at least one of transmission or reception at the second wireless device comprises a synchronization reference source of the second wireless device, and wherein the configuration parameters for the transmission from the first wireless device to the second wireless device are based on the sidelink capability information and the synchronization reference source.

12. The first wireless device of claim 7, wherein the instructions, when executed by the one or more processors, further configure the first wireless device to:
receive, from the second wireless device, a response to the at least one transport block.

13. A non-transitory computer-readable medium storing instructions that, when executed, configure a first wireless device to:
receive, from a second wireless device, at least one sidelink message comprising sidelink capability information associated with at least one of transmission or reception at the second wireless device;
transmit, to a base station, at least one uplink radio resource control message comprising the sidelink capability information associated with at least one of transmission or reception at the second wireless device, wherein the sidelink capability information is different from capability information associated with the first wireless device;
receive, from the base station, configuration parameters for a transmission from the first wireless device to the second wireless device, wherein the configuration parameters for the transmission are based on the sidelink capability information associated with at least one of transmission or reception at the second wireless device; and transmit, to the second wireless device and based on the configuration parameters, at least one transport block.

14. The non-transitory computer-readable medium of claim 13, wherein the instructions, when executed, further configure the first wireless device to receive, from the base station, a radio resource control information request message for the sidelink capability information associated with at least one of transmission or reception at the second wireless device, wherein the at least one uplink radio resource control message is transmitted based on the radio resource control information request message.

15. The non-transitory computer-readable medium of claim 13, wherein the instructions, when executed, further configure the first wireless device to transmit, to the second wireless device, a sidelink information request message for the sidelink capability information, wherein the at least one sidelink message is received based on the sidelink information request message.

16. The non-transitory computer-readable medium of claim 13, wherein the sidelink capability information associated with at least one of transmission or reception at the second wireless device indicates at least one of:
whether a multiple carrier sidelink operation is supported;
a sidelink radio access technology;
an available band;
whether an unlicensed spectrum is supported; or
a supported modulation coding scheme (MCS).

17. The non-transitory computer-readable medium of claim 13, wherein the sidelink capability information associated with at least one of transmission or reception at the second wireless device comprises a synchronization reference source of the second wireless device, and wherein the configuration parameters for the transmission from the first wireless device to the second wireless device are based on the sidelink capability information and the synchronization reference source.

18. The non-transitory computer-readable medium of claim 13, wherein the instructions, when executed, further configure the first wireless device to:
receive, from the second wireless device, a response to the at least one transport block.

19. A system comprising:
a first wireless device comprising:
one or more processors; and
memory storing instructions; and
a base station comprising:
one or more processors; and
memory storing instructions,
wherein the instructions stored in the memory of the first wireless device, when executed by the one or more processors of the first wireless device, configure the first wireless device to:
receive, from a second wireless device, at least one sidelink message comprising sidelink capability information associated with at least one of transmission or reception at the second wireless device;
transmit, to the base station, at least one uplink radio resource control message comprising the sidelink capability information associated with at least one of transmission or reception at the second wireless device, wherein the sidelink capability information is different from capability information associated with the first wireless device;
receive, from the base station, configuration parameters for a transmission from the first wireless device to the second wireless device, wherein the configuration parameters for the transmission are based on the sidelink capability information associated with at least one of transmission or reception at the second wireless device; and
transmit, to the second wireless device and based on the configuration parameters, at least one transport block, and
wherein the instructions stored in the memory of the base station, when executed by the one or more processors of the base station, configure the base station to:
receive, from the first wireless device, the at least one uplink radio resource control message; and
transmit, to the first wireless device, the configuration parameters.

20. The system of claim 19, wherein the instructions stored in the memory of the first wireless device, when executed by the one or more processors of the first wireless device, further configure the first wireless device to receive, from the base station, a radio resource control information request message for the sidelink capability information associated with at least one of transmission or reception at the second wireless device, wherein the at least one uplink radio resource control message is transmitted based on the radio resource control information request message.

21. The system of claim 19, wherein the instructions stored in the memory of the first wireless device, when executed by the one or more processors of the first wireless device, further configure the first wireless device to transmit, to the second wireless device, a sidelink information request message for the sidelink capability information, wherein the at least one sidelink message is received based on the sidelink information request message.

22. The system of claim 19, wherein the sidelink capability information associated with at least one of transmission or reception at the second wireless device indicates at least one of:
whether a multiple carrier sidelink operation is supported;
a sidelink radio access technology;
an available band;
whether an unlicensed spectrum is supported; or
a supported modulation coding scheme (MCS).

23. The system of claim 19, wherein the sidelink capability information associated with at least one of transmission or reception at the second wireless device comprises a synchronization reference source of the second wireless device, and wherein the configuration parameters for the transmission from the first wireless device to the second wireless device are based on the sidelink capability information and the synchronization reference source.

24. The system of claim 19, wherein the instructions stored in the memory of the first wireless device, when executed by the one or more processors of the first wireless device, further configure the first wireless device to:
receive, from the second wireless device, a response to the at least one transport block.

* * * * *

UNITED STATES PATENT AND TRADEMARK OFFICE
CERTIFICATE OF CORRECTION

PATENT NO. : 11,678,327 B2
APPLICATION NO. : 16/993855
DATED : June 13, 2023
INVENTOR(S) : Park et al.

It is certified that error appears in the above-identified patent and that said Letters Patent is hereby corrected as shown below:

On the Title Page

Page 2, Column 2, Other Publications, Line 37:
Delete "2019, 2019," and insert --2019,-- therefor In the Drawings Sheet 25 of 39 Fig. 24, Reference Numeral 2420, Line 2:
Delete "2420" and insert --2424-- therefor In the Specification Column 12, Detailed Description, Line 2:
Delete "laters" and insert --layers-- therefor Column 12, Detailed Description, Line 37:
Delete "223" and insert --212-- therefor Column 13, Detailed Description, Line 65:
After "commands", insert --.-- therefor Column 38, Detailed Description, Line 6:
Delete "1320" and insert --1331-- therefor Column 38, Detailed Description, Line 7:
Delete "1320" and insert --1331-- therefor Column 42, Detailed Description, Line 51:
Delete "pucch-Resourceid)," and insert --pucch-ResourceId),-- therefor Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,678,327 B2

Column 47, Detailed Description, Line 35:
After "running", insert --.-- therefor Column 50, Detailed Description, Line 12:
After "channel", insert --.-- therefor Column 55, Detailed Description, Line 24:
After "channel", insert --.-- therefor Column 56, Detailed Description, Line 34:
Delete "2424," and insert --2324,-- therefor Column 56, Detailed Description, Line 37:
Delete "2420" and insert --2320-- therefor Column 56, Detailed Description, Line 38:
Delete "2424" and insert --2324-- therefor Column 58, Detailed Description, Line 34:
Delete "2504" and insert --2512-- therefor Column 58, Detailed Description, Line 37:
Delete "2504" and insert --2512-- therefor Column 60, Detailed Description, Line 11:
Delete "1516" and insert -- 2516 -- therefor Column 60, Detailed Description, Line 16:
Delete "1516" and insert --2516-- therefor Column 66, Detailed Description, Line 42:
Delete "2504." and insert --2512.-- therefor Column 66, Detailed Description, Line 64:
Delete "2512" and insert --2516-- therefor Column 67, Detailed Description, Line 2:
Delete "2512," and insert --2516,-- therefor Column 67, Detailed Description, Line 3:
Delete "2512." and insert --2516.-- therefor Column 67, Detailed Description, Line 10:
Delete "2516" and insert --2512-- therefor

CERTIFICATE OF CORRECTION (continued)
U.S. Pat. No. 11,678,327 B2

Column 68, Detailed Description, Line 39:
Delete "2512." and insert --2516.-- therefor Column 68, Detailed Description, Line 51:
Delete "2512" and insert --2516-- therefor Column 70, Detailed Description, Line 13:
Delete "2512" and insert --2504-- therefor Column 71, Detailed Description, Line 29:
Delete "2512." and insert --2516.-- therefor Column 80, Detailed Description, Line 2:
Delete "3512" and insert --3504-- therefor Column 80, Detailed Description, Line 5:
Delete "3512" and insert --3504-- therefor Column 80, Detailed Description, Line 7:
Delete "3512" and insert --3504-- therefor Column 80, Detailed Description, Line 10:
Delete "3512." and insert --3504.-- therefor Column 80, Detailed Description, Line 10:
Delete "3508" and insert --3504-- therefor Column 80, Detailed Description, Line 19:
Delete "3512." and insert --3504.-- therefor Column 93, Detailed Description, Line 46:
Delete "Lab VIEWMathScript." and insert --LabVIEWMathScript.-- therefor Column 94, Detailed Description, Lines 49-50:
After "manner", insert --.-- therefor